US012083849B2

(12) United States Patent
Potter et al.

(10) Patent No.: US 12,083,849 B2
(45) Date of Patent: Sep. 10, 2024

(54) TORSION AXLE SUSPENSION SYSTEM APPARATUS AND METHOD

(71) Applicant: Yanmar Compact Equipment North America, Inc., Grand Rapids, MN (US)

(72) Inventors: Alex Potter, Grand Rapids, MN (US); William Allan Wake, Remer, MN (US); Cary Safe, Grand Rapids, MN (US); Daniel K. Gilbert, Grand Rapids, MN (US)

(73) Assignee: Yanmar Compact Equipment North America, Inc., Grand Rapids, MN (US)

( * ) Notice: Subject to any disclaimer, the term of this patent is extended or adjusted under 35 U.S.C. 154(b) by 0 days.

(21) Appl. No.: 18/057,115

(22) Filed: Nov. 18, 2022

(65) Prior Publication Data
US 2024/0166014 A1     May 23, 2024

(51) Int. Cl.
    *B60G 21/05*     (2006.01)
(52) U.S. Cl.
    CPC ........ *B60G 21/052* (2013.01); *B60G 2200/21* (2013.01); *B60G 2204/1434* (2013.01); *B60G 2204/4302* (2013.01); *B60G 2206/013* (2013.01); *B60G 2206/20* (2013.01); *B60G 2206/73* (2013.01); *B60G 2300/04* (2013.01); *B60G 2300/32* (2013.01)
(58) Field of Classification Search
    CPC .............. B60G 21/052; B60G 2200/21; B60G 2204/1434; B60G 2204/4302; B60G 2206/013; B60G 2206/20; B60G 2206/73; B60G 2300/04; B60G 2300/32
    USPC .................................................. 280/124.106
    See application file for complete search history.

(56) References Cited

U.S. PATENT DOCUMENTS

| 3,208,168 | A | | 9/1965 | Henschen | |
|---|---|---|---|---|---|
| 3,436,069 | A | | 4/1969 | Henschen | |
| 4,966,386 | A | * | 10/1990 | Werdich | B60G 11/225 267/281 |
| 5,326,128 | A | * | 7/1994 | Cromley, Jr. | B60G 3/145 301/128 |
| 6,247,547 | B1 | | 6/2001 | Lemke et al. | |

(Continued)

OTHER PUBLICATIONS

Universal Group, Power 10 Flexiride Brochure, 2018, Pennsauken, NJ.

*Primary Examiner* — Paul N Dickson
*Assistant Examiner* — Caitlin Anne Miller
(74) *Attorney, Agent, or Firm* — Taylor English Duma LLP

(57) ABSTRACT

A torsion axle assembly for supporting of a vehicle body on an undercarriage, including an elongated inner member having an inner member longitudinal axis; a torsion arm interconnected with the elongated inner member and the undercarriage; an elongated enclosure interconnected with the vehicle body and having an interior space; and resilient polymeric material residing within the interior space to support the elongated inner member within the interior space, such that the inner member longitudinal axis resides at an unloaded camber angle to an elongated enclosure longitudinal axis when none of the weight of the vehicle body is borne by the torsion axle assembly and at a loaded camber angle when the weight of the vehicle body is borne by the torsion axle assembly, such that the unloaded camber angle is greater than the loaded camber angle. A vehicle having such a torsion axle assembly and a method are disclosed.

47 Claims, 35 Drawing Sheets

(56) References Cited

U.S. PATENT DOCUMENTS

| | | |
|---|---|---|
| 6,435,291 B2 | 8/2002 | Lemke et al. |
| 6,435,292 B2 | 8/2002 | Lemke et al. |
| 6,447,073 B1 | 9/2002 | Goettker |
| 6,497,460 B2 | 12/2002 | Lemke et al. |
| 6,588,778 B1 * | 7/2003 | McLaughlin ........... B60B 35/04 |
| | | 280/124.13 |
| 6,752,411 B2 * | 6/2004 | Few ....................... B60G 17/02 |
| | | 280/124.167 |
| 6,905,130 B2 * | 6/2005 | Few ....................... B60G 17/02 |
| | | 280/124.167 |
| 7,188,915 B2 | 3/2007 | Lemke et al. |
| 8,360,179 B2 * | 1/2013 | Daniels .............. B62D 55/1083 |
| | | 180/9.5 |
| 8,573,336 B2 * | 11/2013 | Arulraja ............... B62D 55/108 |
| | | 180/9.5 |
| 8,757,650 B2 * | 6/2014 | Revelino .................. B60G 5/01 |
| | | 280/684 |
| 9,085,209 B2 | 6/2015 | VanDenberg et al. |
| 9,199,522 B2 * | 12/2015 | Beck .................... B60G 11/183 |
| 2010/0259026 A1 * | 10/2010 | Patmont ................. B62K 25/16 |
| | | 280/124.169 |
| 2013/0062854 A1 * | 3/2013 | Gorrell .................... B60G 9/02 |
| | | 280/124.169 |

* cited by examiner

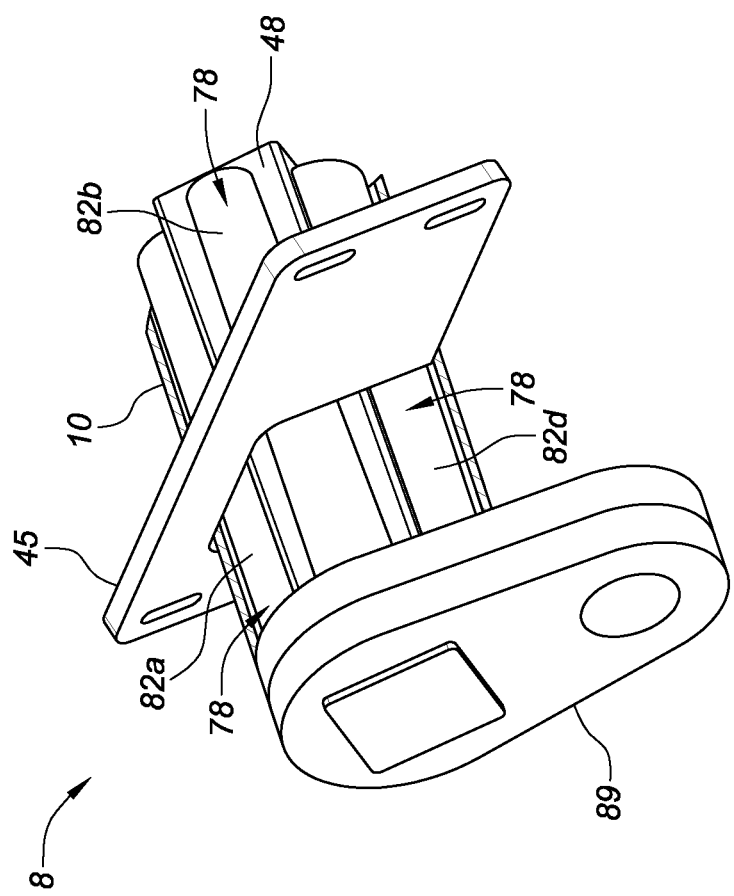

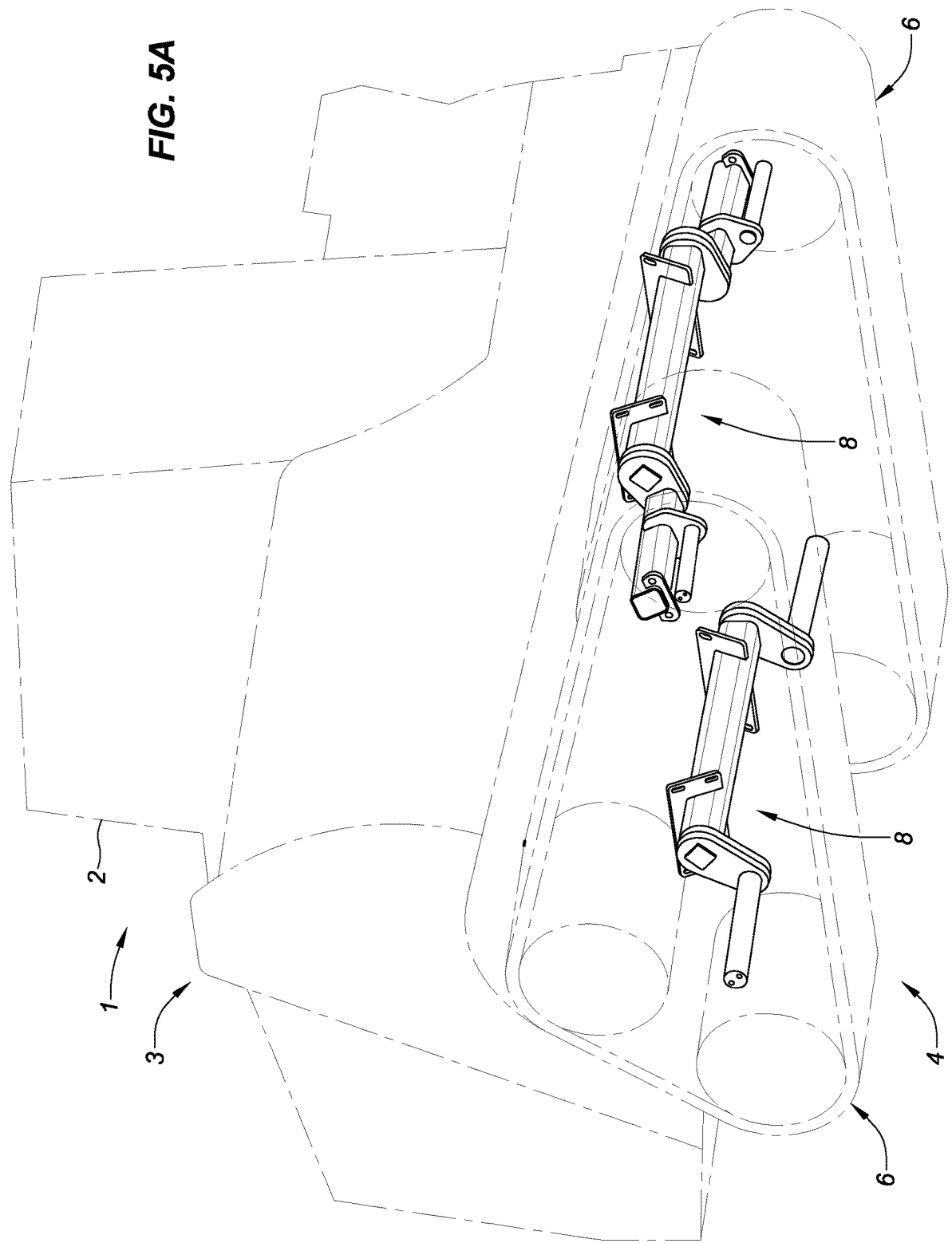

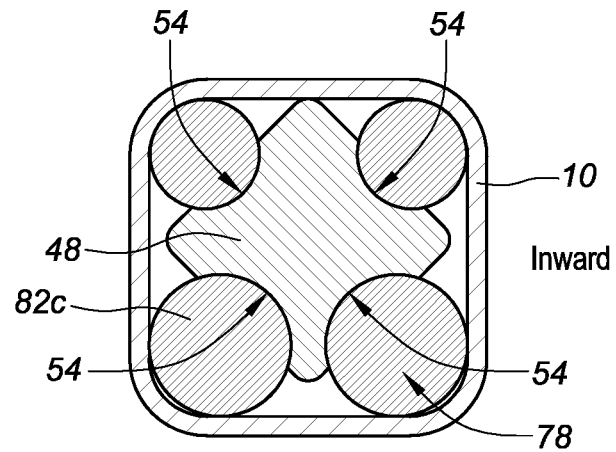
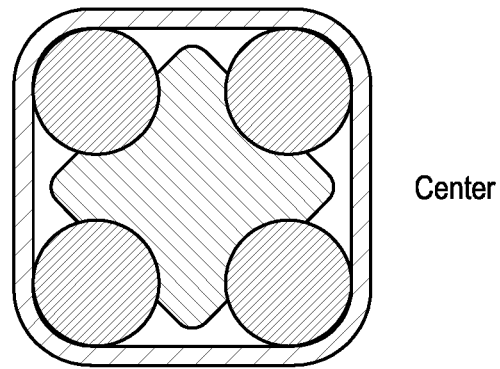
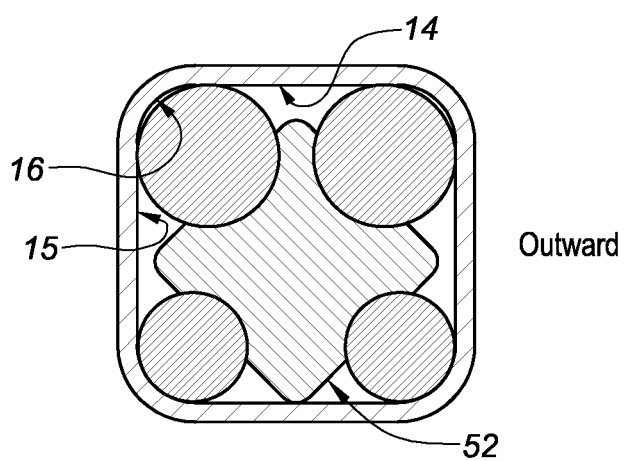
FIG. 12

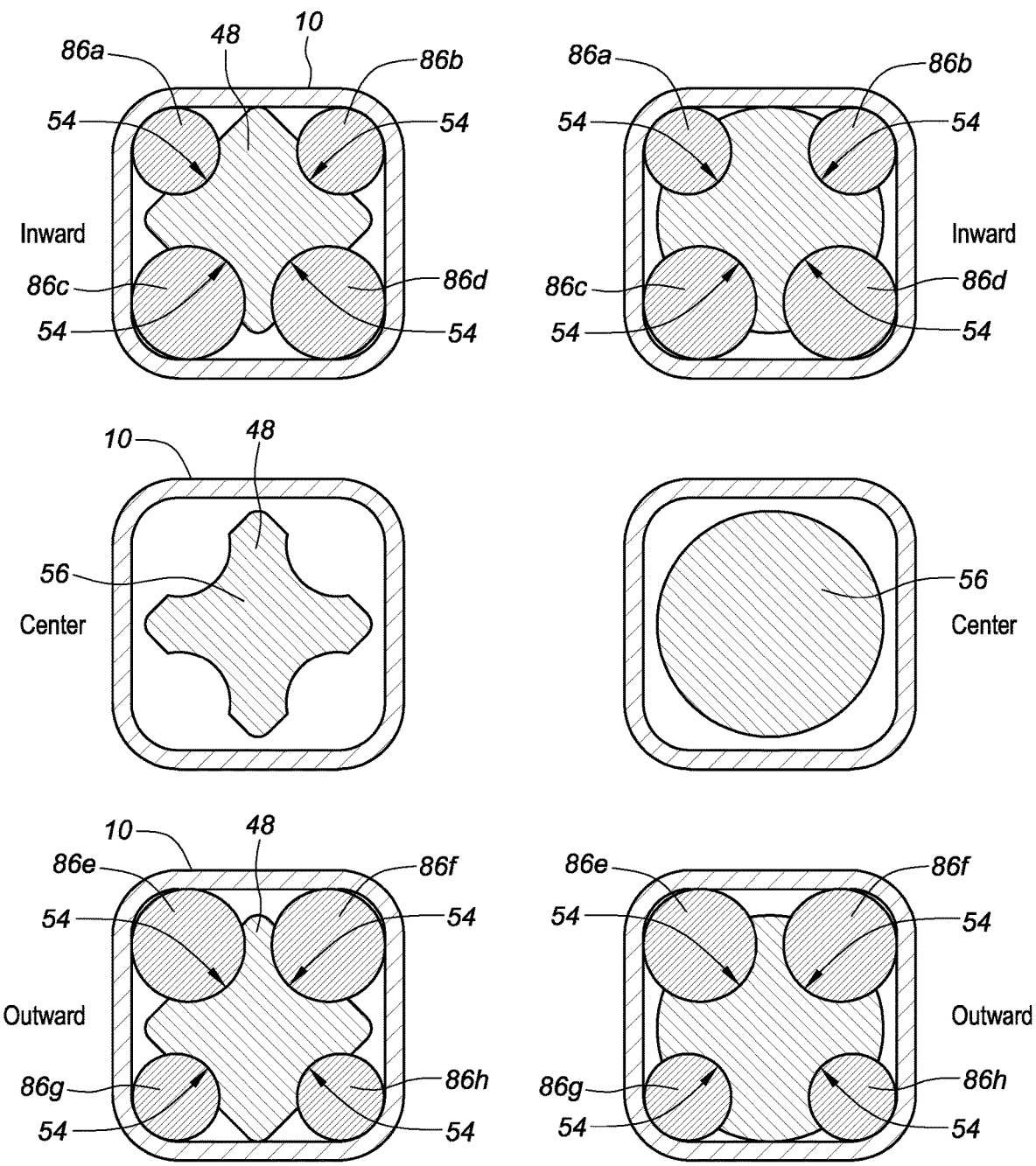
*FIG. 13*    *FIG. 14*

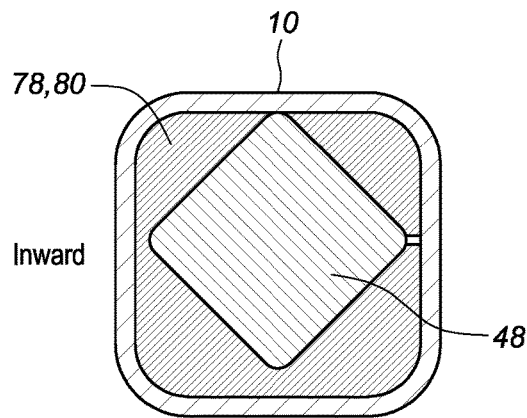
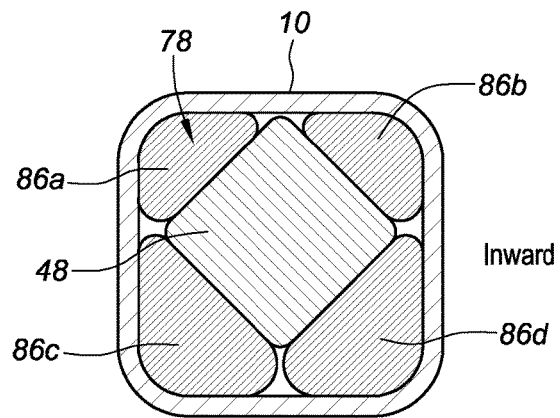
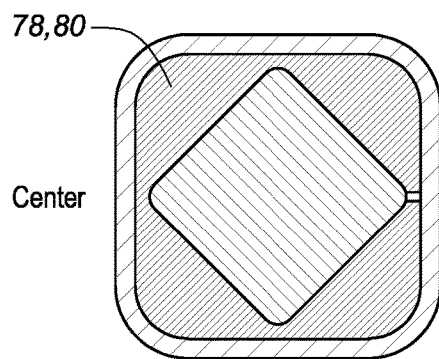
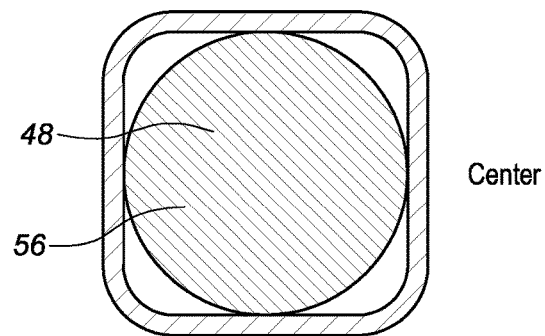
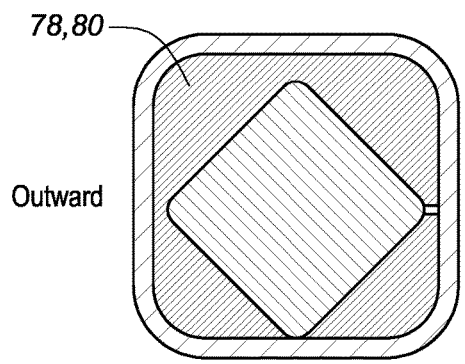
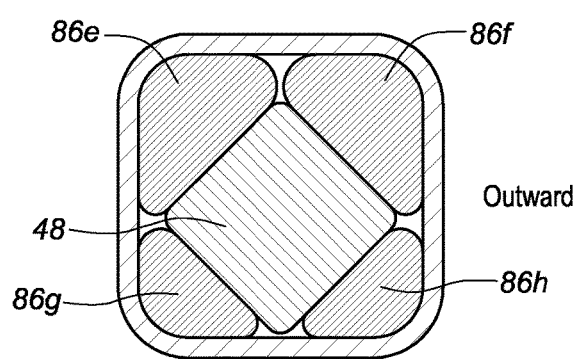
FIG. 17
FIG. 18A

TORSION AXLE SUSPENSION SYSTEM APPARATUS AND METHOD

RELATED APPLICATIONS

None.

FIELD OF THE INVENTION

The invention relates to suspension systems for tracked or wheeled vehicles or trailers. More particularly, the invention relates to torsion axle suspensions for vehicles and trailers. Suspension system apparatus, methods of fabrication, and methods of use are also provided.

DESCRIPTION OF THE RELATED ART

Wheeled and tracked vehicles and trailers incorporate a variety of suspension systems, including leaf-spring suspension and torsion axle suspension systems, to accommodate varying terrain and modulate the motion of the vehicle. In some torsion axle suspension systems, a generally square outer tube contains a generally square inner bar, with 4 cylindrical rubber torsion cords in between the inner bar and the outer tube. The torsion axle suspension systems have been used on vehicles such as trailers and compact track loaders, for example, to provide independent suspension between the vehicle frame and body, and the wheels or tracks, and to accommodate varying terrain, to reduce shocks and vibration of the frame and other elements of the vehicle body, operator, or cargo. In some torsion axle suspension systems, a torsion arm attached to the inner bar is attached to the undercarriage and can rotate in response to the weight of the vehicle and to bumps and vibrations as the vehicle traverses irregular terrain. Some prior torsion axle suspension systems are disclosed in U.S. Pat. No. 7,188,915 by Lemke et al., and in U.S. Pat. No. 4,966,386 to Werdich, for example.

Typically, the torsion axle suspension system is in two half-axle assemblies, one arranged at each end of a single outer tube that extends substantially from one side of the vehicle to the other side of the vehicle. The torsion axle suspension system may be connected to an undercarriage with a track or wheel on each side of the vehicle, with a torsion arm on each side. For vehicles with significant weight, the inner bar may be cambered, with the lateral portions lower (i.e. closer to the ground) and the medial portions higher, so that when the vehicle weight is applied to the suspension system, the inner bars are approximately horizontal, and the torsion arms are approximately vertical (when viewed from the front or rear of the vehicle). In these systems, when the torsion axle is in a normally loaded configuration with the vehicle weight applied, the inner bar of each half-axle is therefore skewed or cambered with respect to the outer tube, so that the lateral portion of the inner bar is raised, and the medial portion of the inner bar is lowered, with respect to the outer tube. In this normal loaded configuration, the torsion cords are unevenly loaded, with the lateral portions of the upper torsion cords being compressed more than the medial portions of the upper torsion cords, and with the medial portions of the lower torsion cords being compressed more than the lateral portions of the lower torsion cords. When irregular terrain causes the inner bars and torsion arms to move from this normal loaded configuration, the inner bar moves within the outer tube, further compressing or decompressing the torsion cords to accommodate the additional movement and applied forces. However, the uneven loading of the torsion cords is not desired and may result in increased fatigue and earlier component failure. To reduce such failure, larger torsion axles with larger torsion cords may be used to accommodate the vehicle weight and any additional loading due to irregular terrain. The additional size, weight, and cost for larger torsion axles is undesirable. In some torsion axle suspension systems, the torsion cords are configured and cooled or frozen prior to assembly; the cold torsion cords temporarily hold their shape so that the torsion cords and elongated inner bar can then be forced into the outer tube to assemble each half-axle. There is need for improved torsion axle suspension systems to address these and other problems with prior systems.

The present inventions provide improvements that address limitations associated with the prior art.

SUMMARY OF THE INVENTION

A torsion axle assembly is provided for supporting a vehicle body on an undercarriage. The torsion axle assembly preferably includes: (a) an elongated inner member having an inward end, an outward portion and an outer engaging surface, the elongated inner member having an inner member longitudinal axis extending through the inward end and the outward portion; (b) a torsion arm having an axle attachment point for interconnecting with the elongated inner member and an undercarriage attachment point for interconnecting with the undercarriage; the torsion arm having a torsion arm longitudinal axis extending from the axle attachment point to the undercarriage attachment point; (c) an elongated enclosure for interconnection to the vehicle body, the elongated enclosure having an inward portion and an open outward end, the elongated enclosure having an inner engaging surface at least partially defining an interior space, the interior space having extending from the open outward end to the inward portion, the elongated enclosure further including an enclosure longitudinal axis extending through the inward portion and the open outward end; and wherein the open outward end is configured to receive the elongated inner member so that the elongated inner member resides at least partially within the interior space; and (d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle. The unloaded camber angle is preferably from about 0.25 to about 10 degrees and the resilient polymeric material preferably includes a plurality of torsion cords each having a larger cross-sectional area proximate one end of the respective torsion cord and a smaller cross-sectional area proximate the other end of the respective torsion cord, wherein the plurality of torsion cords include at least one upper torsion cord positioned generally upward from the inner member longitudinal axis of the respective elongated inner member, the upper torsion cord having the larger cross-sectional area located proximate the outward portion, and at least one lower torsion cord positioned generally downward from the inner member longitudinal axis of the respective elongated inner member, the lower torsion cord having the larger cross-sectional area located proximate the inward end and the torsion cords are preferably conical.

In preferred embodiments of the present invention, the resilient polymeric material includes material selected from the group consisting of natural rubber, latex, synthetic rubber, fiber-reinforced rubber, elastomeric polymer, and rubber composite material. The resilient polymeric material is preferably a unitary member which is located around the elongated inner member within the interior space and the resilient polymeric material preferably includes a plurality of separate segments, arranged along the elongated inner member so that at least one of the plurality of separate segments is located closer to the inward end, and at least one other of the plurality of separate segments is located closer to the outward portion. In further alternate embodiments of the present invention, the undercarriage is preferably selected from a group consisting of an undercarriage including wheels and an undercarriage including tracks and the vehicle body is preferably a part of a vehicle selected from a group consisting of a self-powered vehicle and a trailer. In further alternate embodiments, the torsion axle assembly further includes an undercarriage attachment mechanism for attachment of the undercarriage to the torsion arm at the undercarriage attachment point, wherein the undercarriage attachment mechanism is selected from a group consisting of a beam mechanism and a torsion axle mechanism.

In a preferred embodiment of the present invention, a vehicle used for transporting cargo is provided, the vehicle comprising: a vehicle body, an undercarriage and a suspension system interconnecting the undercarriage to the vehicle body; wherein the suspension system includes a torsion axle assembly for supporting the vehicle body on the undercarriage, wherein the vehicle body has a measurable weight; and wherein the torsion axle assembly includes: (a) an elongated inner member having an inward end, an outward portion, and an outer engaging surface, the elongated inner member also having an inner member longitudinal axis extending from the inward end to the outward portion; (b) a torsion arm having an axle attachment point for interconnecting with the elongated inner member and an undercarriage attachment point for interconnecting with an undercarriage attachment mechanism for attachment to the undercarriage; the torsion arm having a torsion arm longitudinal axis extending from the axle attachment point to the undercarriage attachment point; (c) an elongated enclosure for interconnection to the vehicle body, the elongated enclosure having an inward portion and an open outward end, the elongated enclosure having an inner engaging surface at least partially defining an interior space, the interior space having extending from the open outward end to the inward portion, the elongated enclosure further including an enclosure longitudinal axis extending through the inward portion and the open outward end; and wherein the open outward end is configured to receive the elongated inner member so that the elongated inner member resides at least partially within the interior space; and (d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle.

In another preferred embodiment of the present invention, a method of supporting a vehicle body on an undercarriage is provided, wherein the vehicle body has a measurable weight, the method comprising the step of: providing a vehicle body, an undercarriage and a suspension system interconnecting the undercarriage to the vehicle body; wherein the suspension system includes the torsion axle assembly for supporting the vehicle body on the undercarriage that is described above and in the further disclosure found herein.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described preferred embodiments of the present invention.

BRIEF DESCRIPTION OF THE DRAWINGS

In the drawings, which illustrate non-limiting and non-exhaustive embodiments of the present invention, like reference characters refer to like and corresponding parts throughout the various views unless otherwise specified;

FIG. 3 is a perspective view of the portion of the torsion axle suspension system of FIG. 1, the portion being circled on FIG. 1 and representing a "half axle" which would support one side of a vehicle body on an undercarriage;

FIG. 5A is a perspective view of the torsion axle suspension system of FIG. 1, shown installed for use on a vehicle, in this example the vehicle is a compact track loader machine, with the torsion axle suspension system accommodating the weight of the vehicle body, and schematically illustrating the vehicle body and the undercarriage;

FIG. 12 is a schematic illustration showing section views taken at inward, center, and outward portions of an example configuration of the torsion axle suspension system that includes an elongated inner member having longitudinal concave recesses which engage torsion cords, similar to the views of FIG. 7C;

FIG. 13 is a schematic illustration showing section views taken at inward, center, and outward portions of an example configuration of the torsion axle suspension system that includes segmented or discontinuous torsion cords, and an elongated inner member having longitudinal concave recesses which engage the torsion cords, similar to the views of FIGS. 7C and 12;

FIG. 14 is a schematic illustration showing section views taken at inward, center, and outward portions of an example configuration of the torsion axle suspension system that includes segmented or discontinuous torsion cords, and an elongated inner member having longitudinal concave recesses which engage the torsion cords and a central protrusion separating the torsion cord segments, similar to the views of FIGS. 7C, 12 and 13;

FIG. 17 is a schematic illustration showing section views taken at inward, center, and outward portions of an example configuration of a portion of a torsion axle suspension system having a single torsion cord which extends around the perimeter of the elongated inner member;

FIG. 18A is a schematic illustration showing section views taken at inward, center, and outward portions of an example configuration of a portion of a torsion axle suspension system having segmented or discontinuous torsion cords, and an elongated inner member having a central protrusion;

DETAILED DESCRIPTION OF THE PREFERRED EMBODIMENTS

Figure 1:
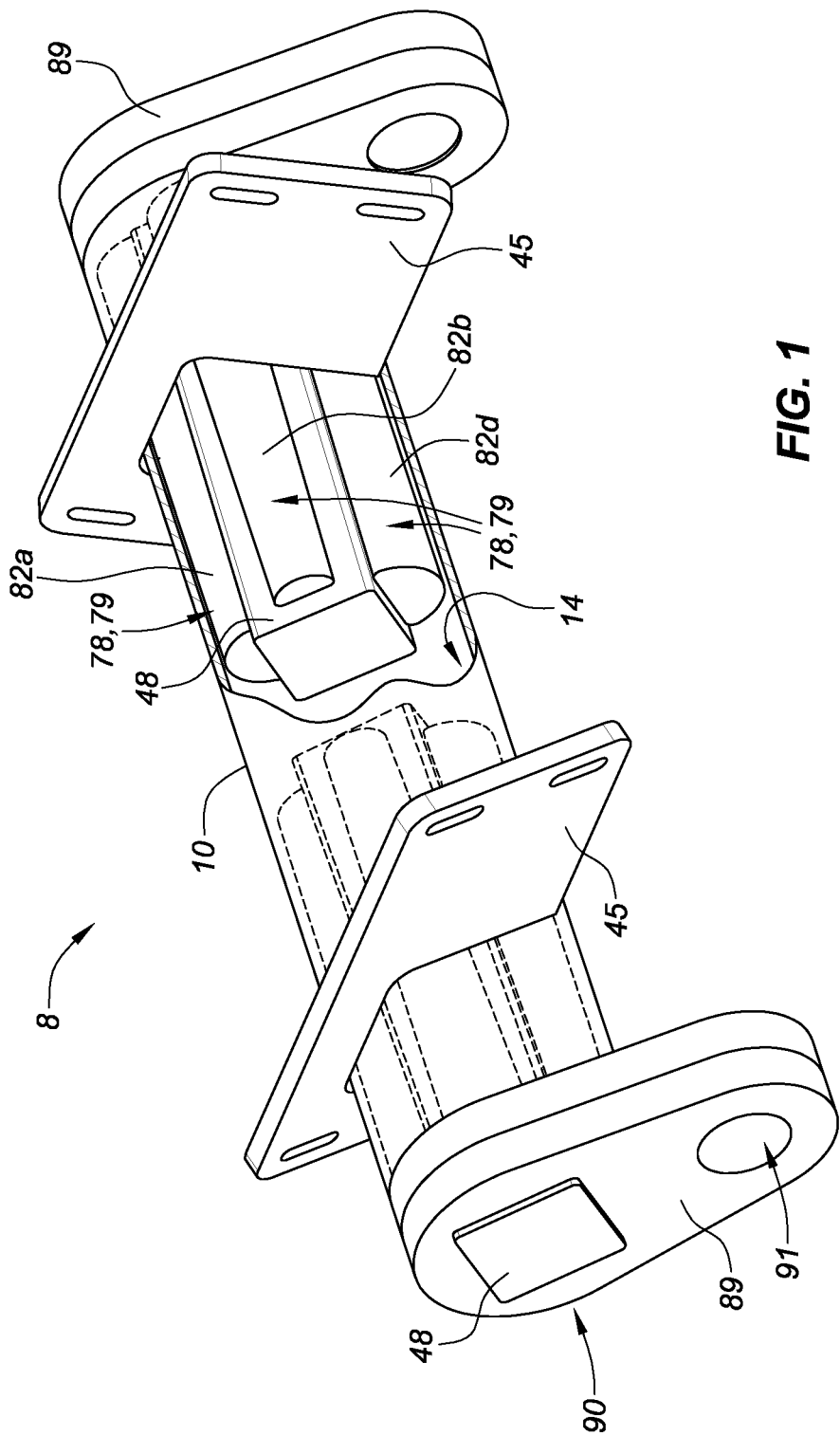
FIG. 1 is a perspective view of a torsion axle suspension system of the present invention, illustrated in an "unloaded" configuration not supporting the weight of a vehicle body, and in this example the torsion axle is cambered, with the elongated inner member being skewed within the elongated enclosure, shown in partial cutaway to illustrate underlying elements.

Referring now to the drawings illustrating preferred embodiments of the present invention, a torsion axle suspension system 8 preferably includes an inner bar or elongated inner member 48 having an inward end 49 and an outward portion 50 and an engaging outer surface or outer engaging surface 52 and an inner member longitudinal axis 51 extending from the inward end 49 to the outward portion 50; an outer tube or elongated enclosure 10 having an engaging inner surface or inner engaging surface 14 at least partially defining an interior space 18, the interior space 18 including an interior space inward portion 19*a* and an interior space outward portion 19*b*. The elongated enclosure also preferably includes an inward portion 11 and an outward end or open outward end 12 and an enclosure longitudinal axis 13 extending from the inward portion 11 to the open outward end 12, with the open outward end 12 configured to receive the elongated inner member 48 so that the elongated inner member 48 at least partially resides within the interior space 18; resilient material 78 about the elongated inner member 48 and supporting the elongated inner member 48 within the interior space 18, with the resilient material 78 engaging the engaging inner surface 14 and the engaging outer surface 52; wherein when the elongated inner member 48 is secured to an undercarriage 4, and the torsion axle suspension system 8 is in an unloaded configuration (FIGS. 1-3, for example) in which the torsion axle suspension system 8 is not supporting the vehicle body weight 3 of the vehicle body 2, the inner member longitudinal axis 51 is oriented at an unloaded camber angle A1 with respect to the enclosure longitudinal axis 13; and wherein when the elongated inner member 48 is secured to an undercarriage 4, and the torsion axle suspension system 8 is in a loaded configuration (FIGS. 5A-6D, for example) in which the torsion axle suspension system 8 is supporting the vehicle body weight 3 of the vehicle body 2, the resilient material 78 is elastically deformed, and the inner member longitudinal axis 51 is oriented at a loaded camber angle A2 with respect to the enclosure longitudinal axis 13, wherein the loaded camber angle A2 is smaller than the unloaded camber angle A1. As used herein, the movement of the elongated inner member 48 with respect to the elongated enclosure 10 wherein the orientation varies from unloaded camber angle A1 to loaded camber angle A2 or other angles as may occur as the vehicle traverses uneven terrain is generally referred to herein as "pivoting" of the elongated inner member 48 to distinguish from other movements described herein.

The resilient material 78 preferably includes a polymeric material that can elastically deform and accommodate the load applied when the torsion axle suspension system 8 is supporting the vehicle body weight 3; more preferably, the resilient material 78 is selected from the group consisting of a natural rubber, latex, synthetic rubber, fiber-reinforced rubber, elastomeric polymer, rubber composite material, and combinations thereof. More preferably, the resilient material 78 is EPDM meeting specification ASTM D2000 M4AA 817 A13 B13 G21 Z1 Z2, with Z1: 75 5 Shore A and Z2: 200% Modulus 1500 PSI minimum. The resilient material 78 is configured asymmetrically, with a greater amount of resilient material 78 located at some points in the torsion axle suspension system 8, and lesser amount of resilient material 78 located at other points in the torsion axle suspension system 8, as further illustrated and described herein. In preferred embodiments, the resilient material 78 includes a greater amount of resilient material 78 located below the inner member longitudinal axis 51 proximate the inward end 49 of the elongated inner member 48, and a lesser amount of resilient material 78 located above the inner member longitudinal axis 51 proximate the inward end 49 of the elongated inner member 48, and a lesser amount of resilient material 78 located below the inner member longitudinal axis 51 proximate the outward portion 50 of the elongated inner member 48, and a greater amount of resilient material 78 located above the inner member longitudinal axis 51 proximate the outward portion 50 of the elongated inner member 48. In some embodiments, the resilient material 78 is a single contiguous piece of resilient material 80 that is configured with greater and lesser amounts of resilient material 78 in different locations as just described. In other embodiments, the resilient material 78 is configured as a plurality of pieces of resilient material, such as a plurality of stepped or tapered or conical torsion cords 82. In one preferred embodiment, the resilient material 78 includes conical torsion cords 82*a*, 82*b*, 82*c*, 82*d* (FIGS. 4A, 4D-4G).

In some embodiments, the resilient material 78 varies in size along the length of the elongated inner member 48 and has a cross-sectional shape that is selected from the group consisting of circular, elliptical, polygonal, and rounded polygonal.

In some embodiments, the resilient material 78 is bonded to the elongated inner member 48. In some embodiments, the resilient material 78 is bonded to the elongated enclosure 10. In some embodiments, the resilient material 78 is adjacent to the elongated inner member 48 and the elongated enclosure 10 but bonded to neither. The bonding of the resilient material 78 is chosen to facilitate assembly and disassembly, as desired.

Conical torsion cords 82a, 82b, 82c, 82d each have a larger end 83a having a greater amount of resilient material 78, and a smaller end 83b having a lesser amount of resilient material 78. Preferably, when the elongated inner member 48 and the conical torsion cords 82a, 82b, 82c, 82d reside within the interior space 18, the conical torsion cords 82c, 82d are located below the inner member longitudinal axis 51 ("lower torsion cords"), and oriented with the larger end 83a proximate the inward end 49 of the elongated inner member 48, and with the smaller end 83b proximate the outward portion 50 of the elongated inner member 48.I In contrast, the conical torsion cords 82a, 82b are preferably located above the inner member longitudinal axis 51 ("upper torsion cords"), and oriented with the larger end 83a proximate the outward portion 50 of the elongated inner member 48, and with the smaller end 83b proximate the inward end 49 of the elongated inner member 48. With the conical torsion cords 82a, 82b, 82c, 82d being configured and arranged as just described, and the torsion axle suspension system 8 in an unloaded configuration in which the torsion axle suspension system 8 is not supporting the vehicle body weight 3 of the vehicle body 2, the inner member longitudinal axis 51 is oriented at an unloaded camber angle A1 with respect to the enclosure longitudinal axis 13. This unloaded camber angle A1 is sometimes referred to as a "camber" or "camber angle" by those skilled in the art.

Figure 9B:
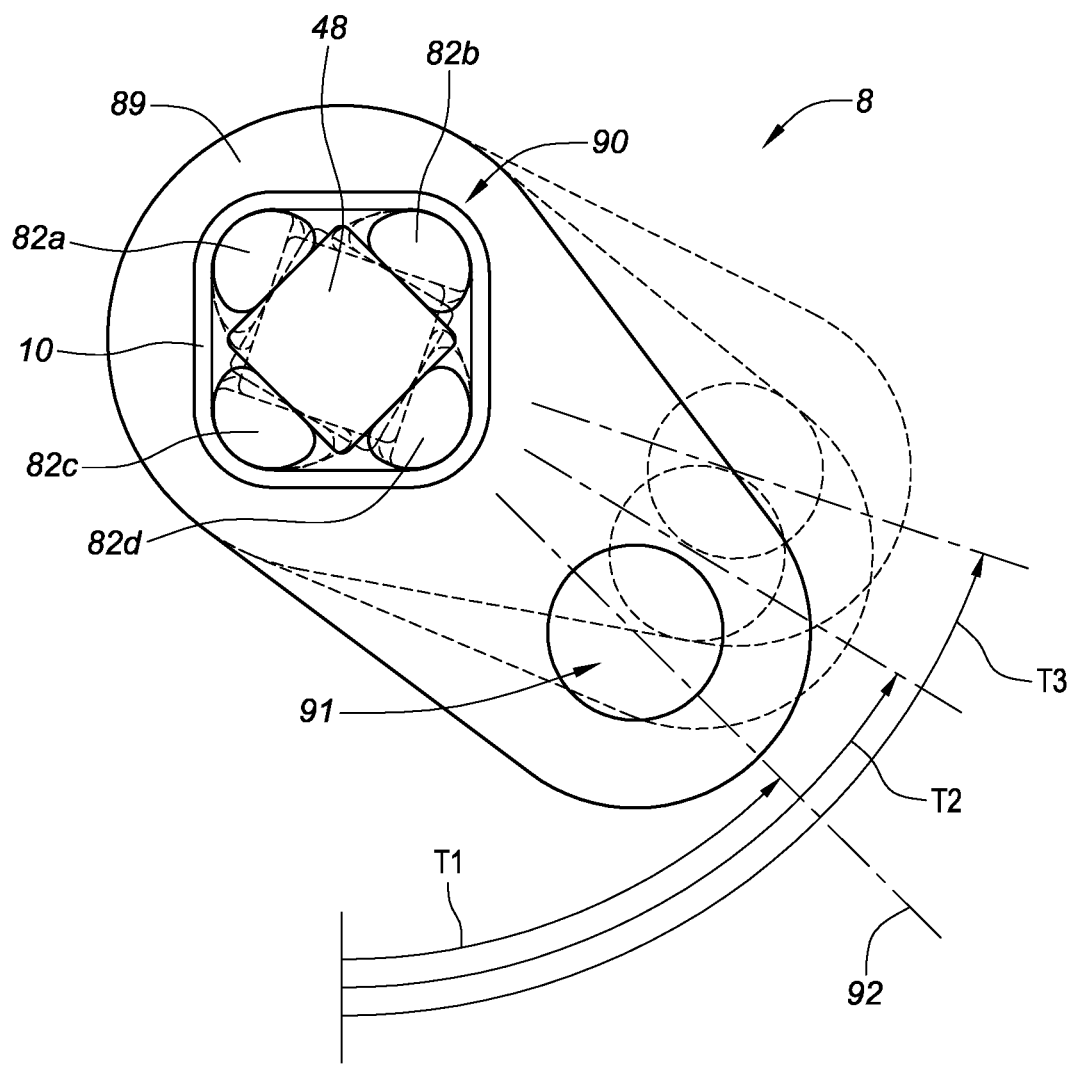
FIG. 9 is a schematic illustration showing a left side view of the torsion axle suspension system of FIG. 1, showing the elongated inner member orientation and torsion arm angle varying with applied load, and corresponding deformation of the torsion cords.

The torsion axle suspension system 8 preferably includes a torsion arm 89 secured to the outward portion 50 of the elongated inner member 48 at an axle attachment point 90. The torsion arm 89 is preferably configured for attachment to the undercarriage 4 at an undercarriage attachment point 91. The torsion axle 89 preferably includes a torsion arm longitudinal axis 92 extending from the axle attachment point 90 to the undercarriage attachment point 91 (FIG. 9). In an unloaded configuration in which the torsion axle suspension system 8 is not supporting the vehicle body weight 3 of the vehicle body 2, the undercarriage attachment point 91 is oriented at an unloaded torsion angle T1 from the axle attachment point 90 relative to vertical (FIG. 9). When the torsion axle suspension system 8 is in a loaded configuration in which the torsion axle suspension system 8 is supporting the vehicle body weight 3 of the vehicle body 2 on the undercarriage 4, the resilient material 78 is elastically deformed and the elongated inner member 48 and the torsion arm 89 rotate about the inner member longitudinal axis 51 so that the undercarriage attachment point 91 is oriented at a loaded torsion angle T2 from the axle attachment point 90 relative to vertical. As the vehicle 1 including the vehicle body 2 and the undercarriage 4 traverses varying terrain, the elongated inner member 48 and the torsion arm 89 rotate to accommodate the terrain and to reduce shocks and vibration of the vehicle 1 and any operator or cargo carried by the vehicle 1. As used herein, the movement of the elongated inner member 48 and the torsion arm 89 with respect to the elongated enclosure 10 wherein the orientation varies from the unloaded torsion angle T1 to loaded torsion angle T2 or overloaded torsion angle T3 or other angles as may occur as the vehicle traverses uneven terrain is generally referred to herein as "rotating" of the elongated inner member 48 to distinguish from other movements described herein. For further clarification, varying camber, in which the inner member longitudinal axis 51 itself reorients and varies from camber angle A1, A2, etc. is generally referred to herein as "pivoting" of the inner member 48, whereas reorientation of the inner member 48 about the inner member longitudinal axis 51 so that the torsion arm 89 and corresponding torsion angle varies from T1, T2, etc. is generally referred to as "rotating" of the inner member 48. We note that both movements may occur independently, or simultaneously, as the inner member 48 pivots and rotates in response to varying terrain and loading. Further, in embodiments that include more than one half-axle or more than one torsion axle suspension system 8, as will typically the case, such as on either side of the vehicle 1, or at the front and rear of the vehicle 1, the pivoting and rotating movements can all occur independently in response to varying terrain and loading. Some embodiments may include 2, 4, 6, or more torsion axle suspension systems 8, wherein for example, a plurality of the torsion axle suspension systems provide independent movements, providing independent suspension for 4 quadrants of the vehicle (i.e. left front, right front, left rear, right rear) between the vehicle body 2 and the wheel undercarriage mechanism 5 or track undercarriage mechanism 6, for example.

In some embodiments, the undercarriage 4 includes a plurality of tracked or wheeled portions, such as track undercarriage mechanisms 6 located on opposite sides of the vehicle 1. Preferably, the torsion axle suspension system 8 includes mirror image structures including an elongated inner member 48, an elongated enclosure 10, and resilient material 78, and torsion arm 89, such as described above, for supporting the vehicle 1 on each of the two track undercarriage mechanisms 6. Preferably, such a dual-sided torsion axle suspension system 8 is provided proximate the front of the vehicle and a second dual-sided torsion axle suspension system 8 is provided proximate the rear of the vehicle, so that the vehicle body 2 is supported by the two track undercarriage mechanisms 6 at both the front and rear. Thus, some preferred embodiments include four elongated inner members 48, with corresponding elongated enclosures 10 and resilient material 78 and torsion arms 89 (FIGS. 5A-6C).

Figure 2A:
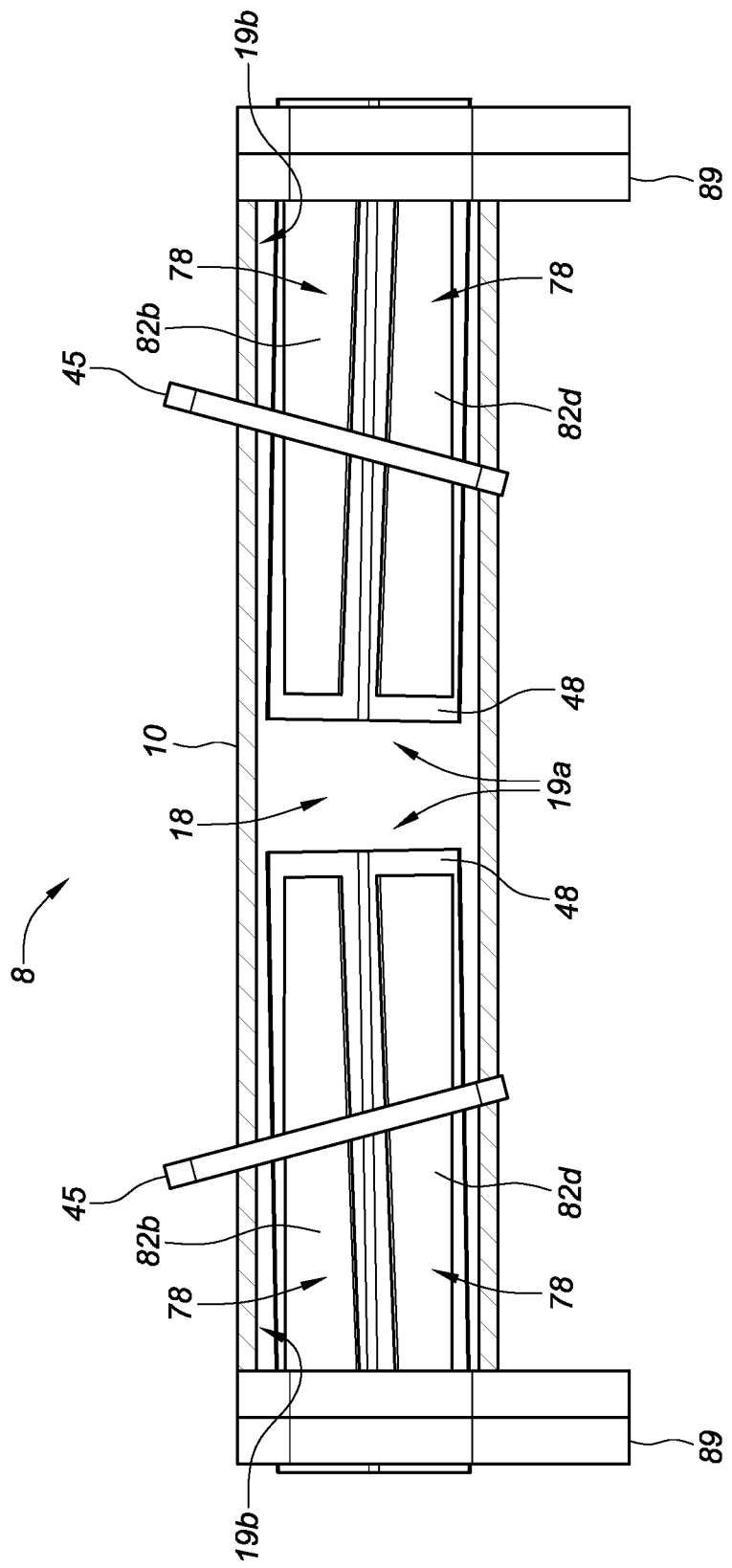
FIG. 2A is a front view of the torsion axle suspension system of FIG. 1, with the elongated enclosure sectioned to illustrate underlying elements.
Figure 2B:
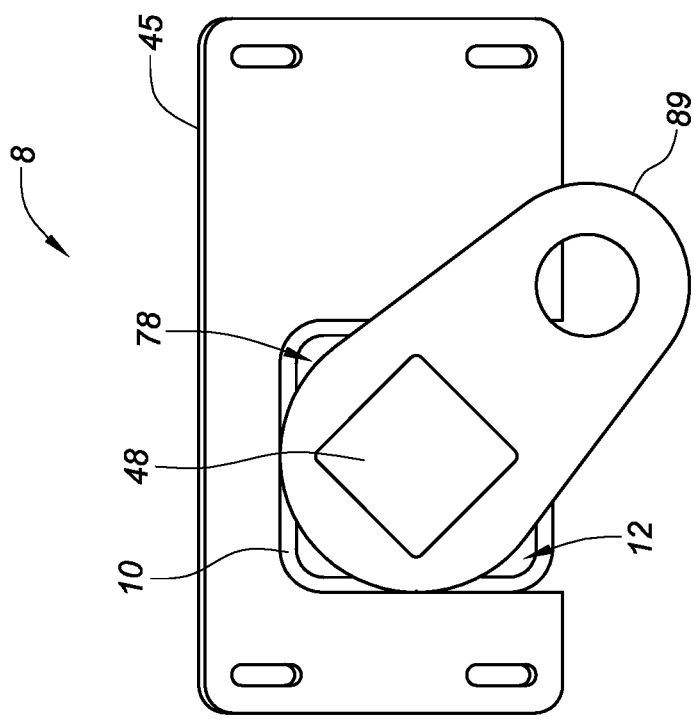
FIG. 2B is a left side view of the torsion axle suspension system of FIG. 1.
Figure 2C:
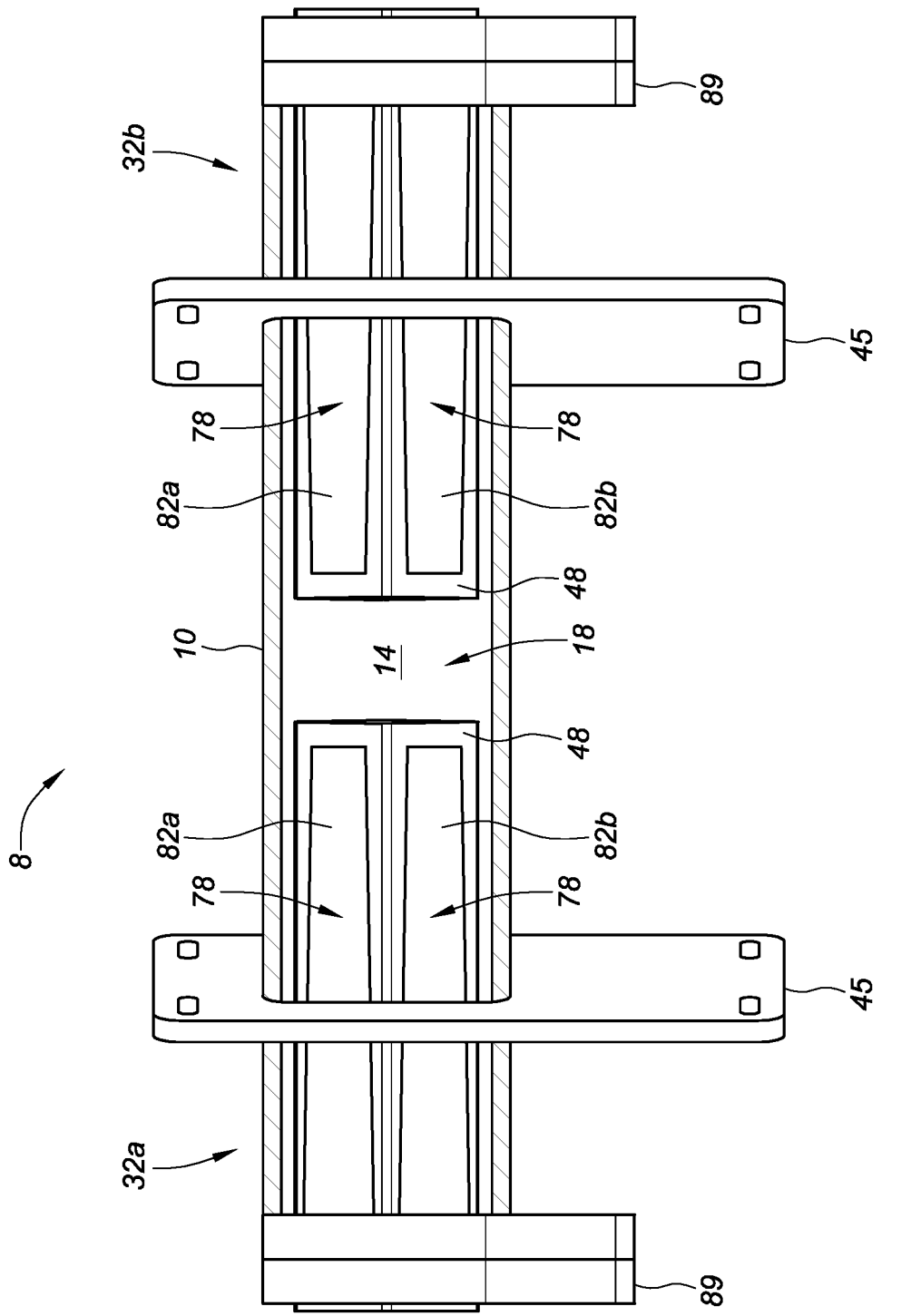
FIG. 2C is a top view of the torsion axle suspension system of FIG. 1.
Figure 4A:
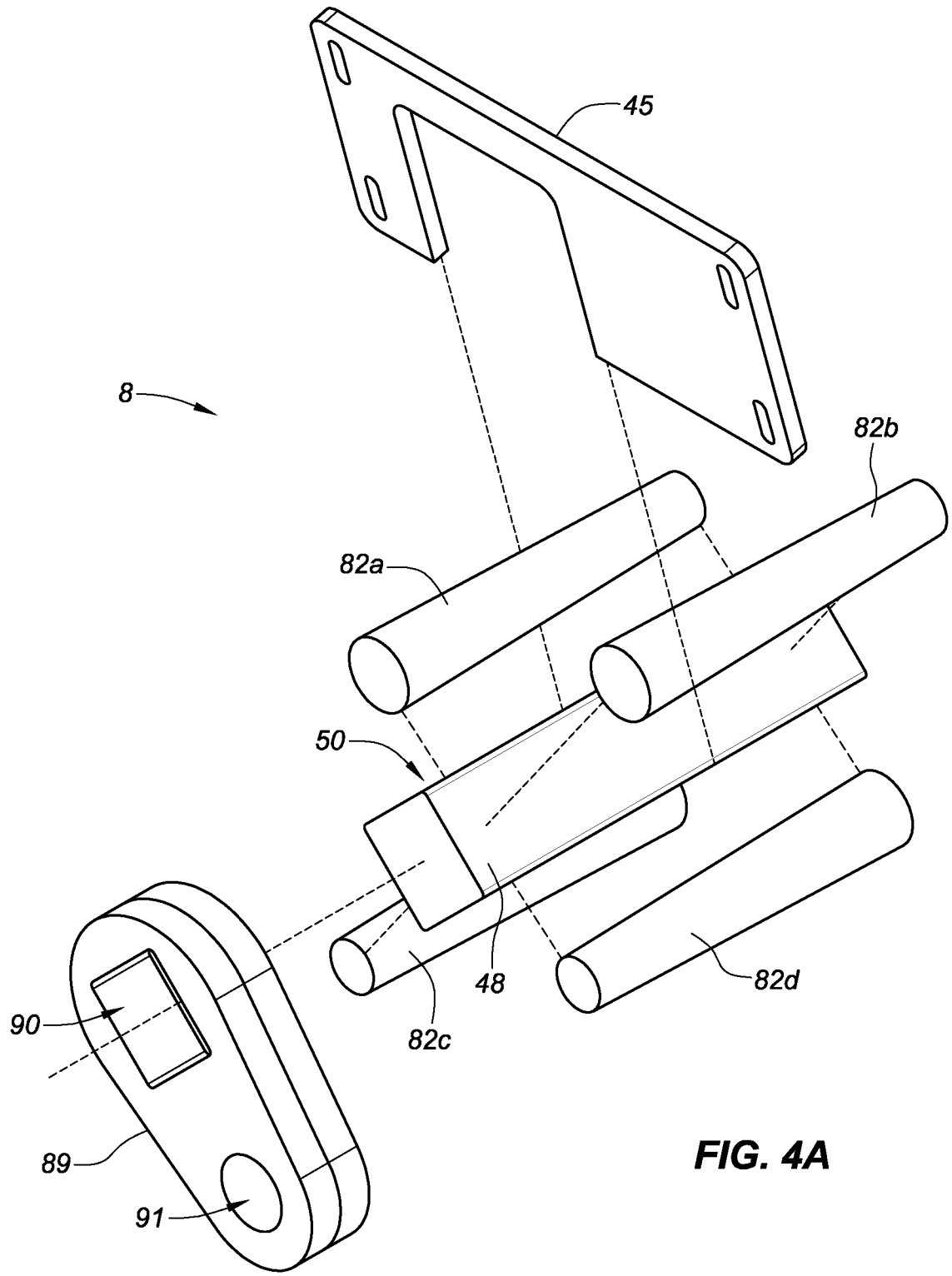
FIG. 4A is an exploded view of the portion of the torsion axle suspension system encircled on FIG. 3, and indicating the elongated enclosure, the elongated inner member, the resilient material, which in this example includes first, second, third, and fourth torsion cords, the torsion arm, and the mounting bracket.
Figure 4B:
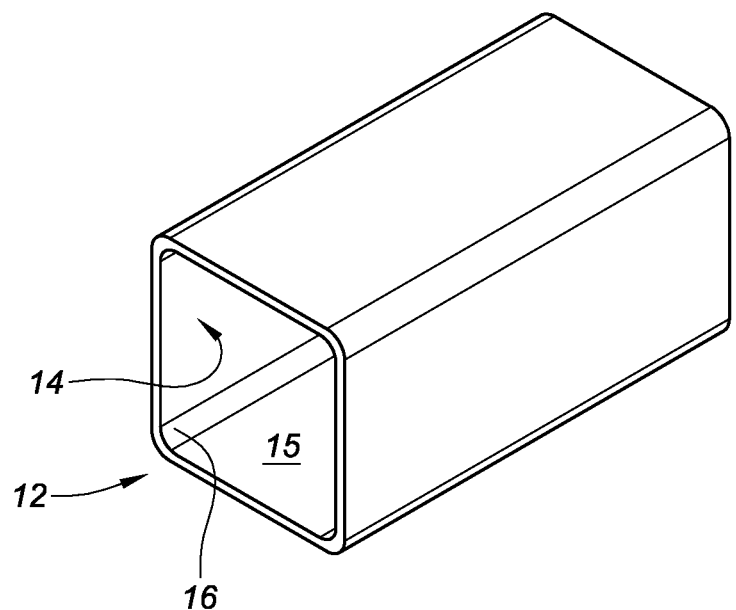
FIG. 4B is a perspective view of the elongated enclosure of FIG. 4A.
Figure 4C:
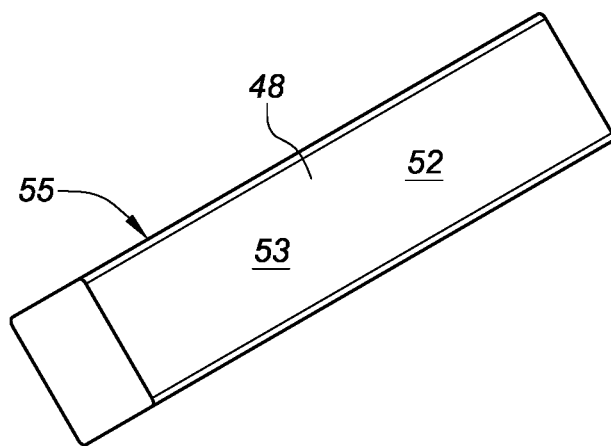
FIG. 4C is a perspective view of the elongated inner member of FIG. 4A.
Figure 4D:
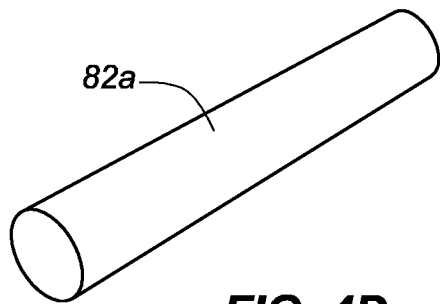
FIG. 4D is a perspective view of the first torsion cord of FIG. 4A.
Figure 4E:
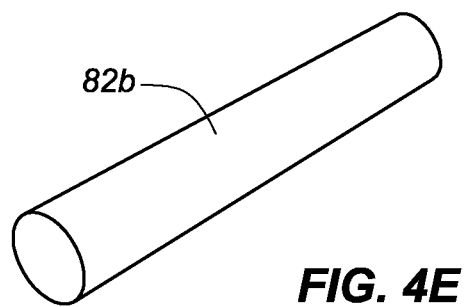
FIG. 4E is a perspective view of the second torsion cord of FIG. 4A.
Figure 4F:
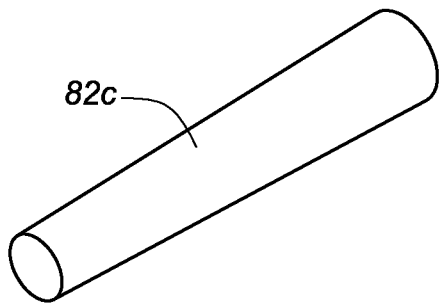
FIG. 4F is a perspective view of the third torsion cord of FIG. 4A.
Figure 4G:
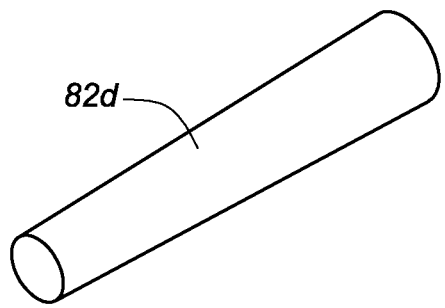
FIG. 4G is a perspective view of the fourth torsion cord of FIG. 4A.
Figure 4H:
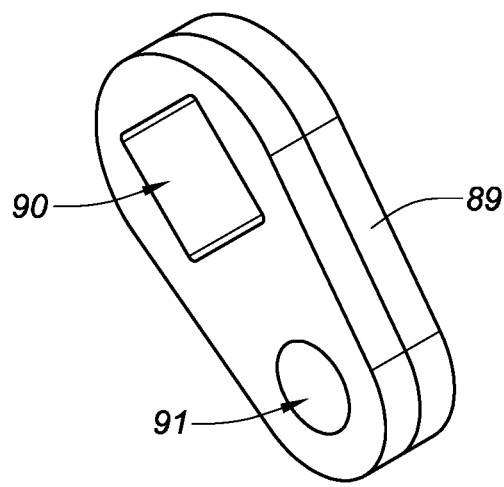
FIG. 4H is a perspective view of the torsion arm of FIG. 4A.
Figure 5B:
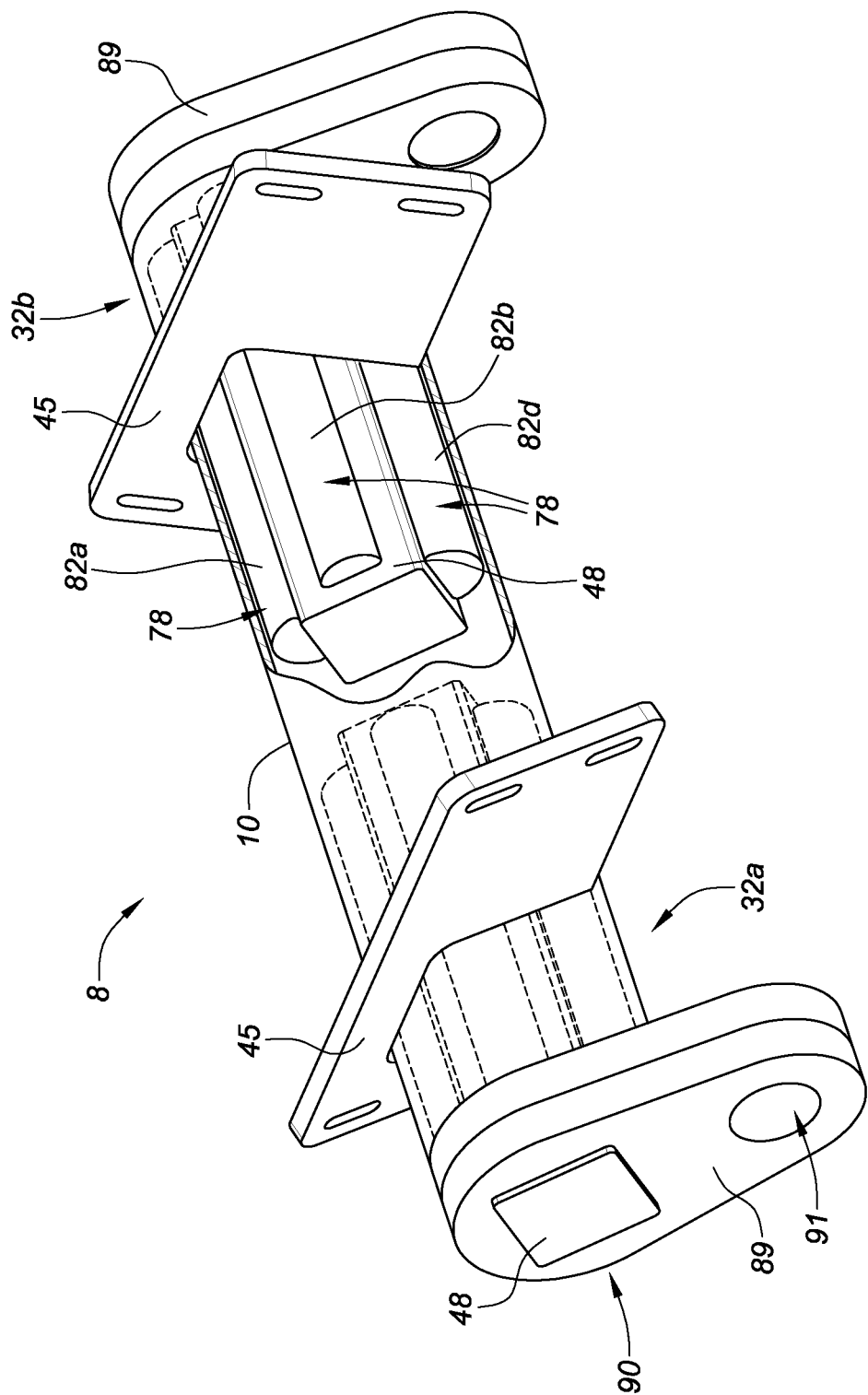
FIG. 5B is a perspective view of a portion of the torsion axle suspension system of FIG. 1, shown in partial cutaway to illustrate underlying elements.
Figure 5C:
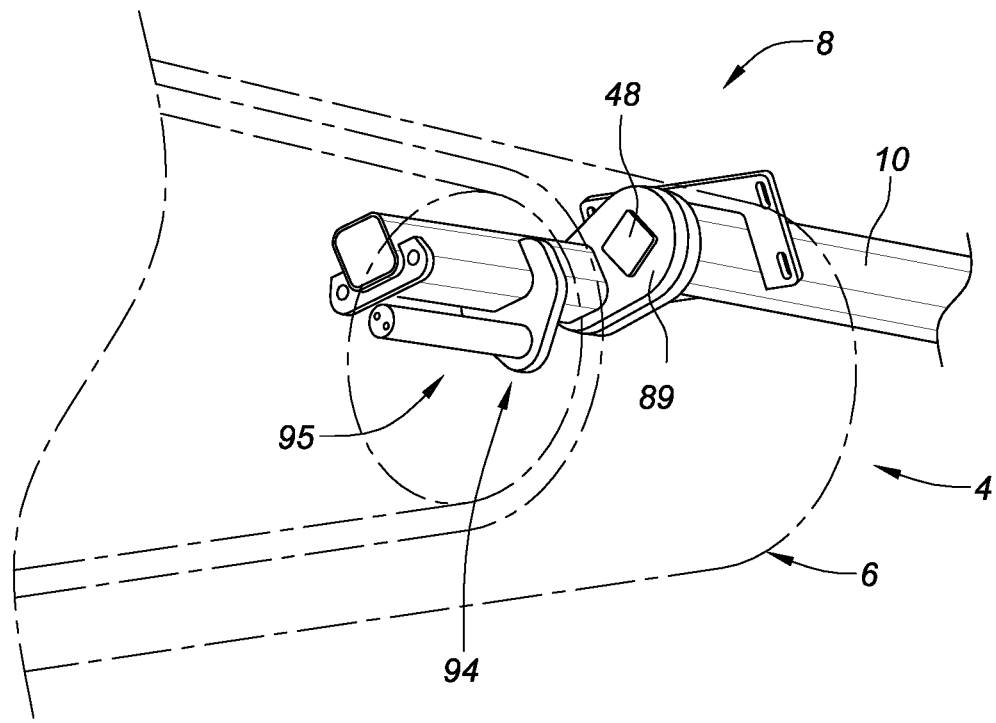
FIG. 5C is a perspective view of a portion of the torsion axle suspension system of FIG. 5A, shown installed for use on a vehicle, secured to the undercarriage by a secondary torsion axle mechanism.
Figure 5D:
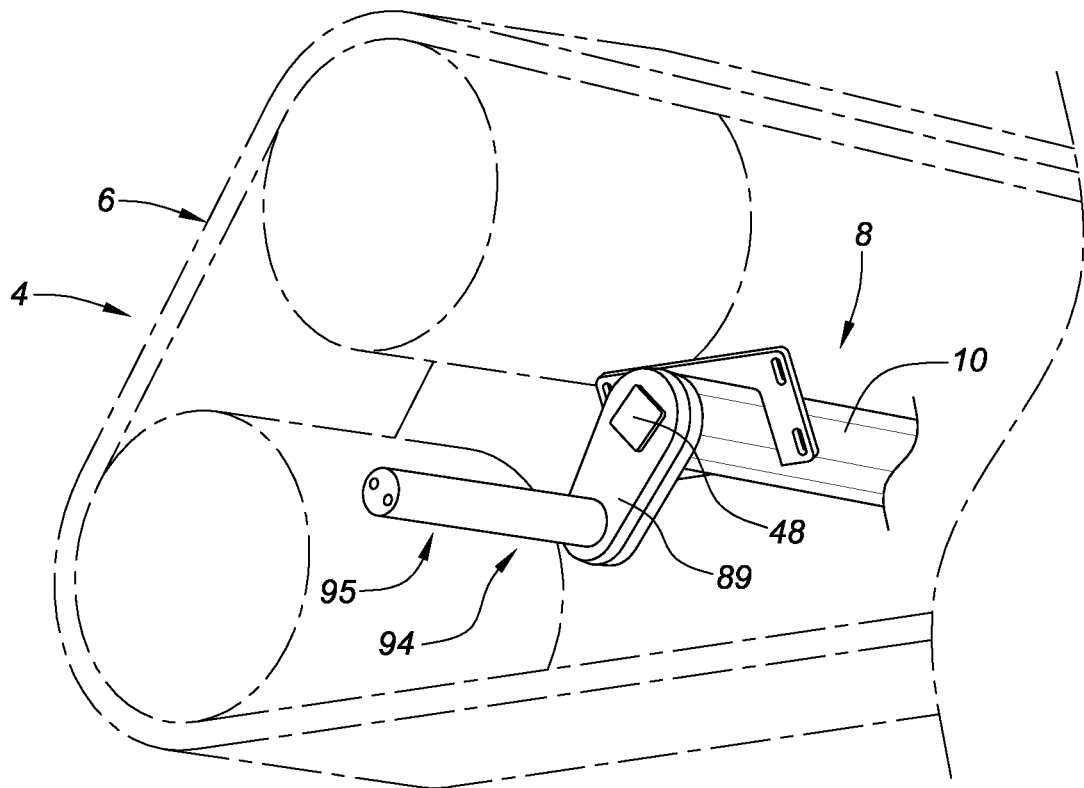
FIG. 5D is a perspective view of a portion of the torsion axle suspension system of FIG. 5A, shown installed for use on a vehicle, secured to the undercarriage by a round axle mechanism.
Figure 6A:
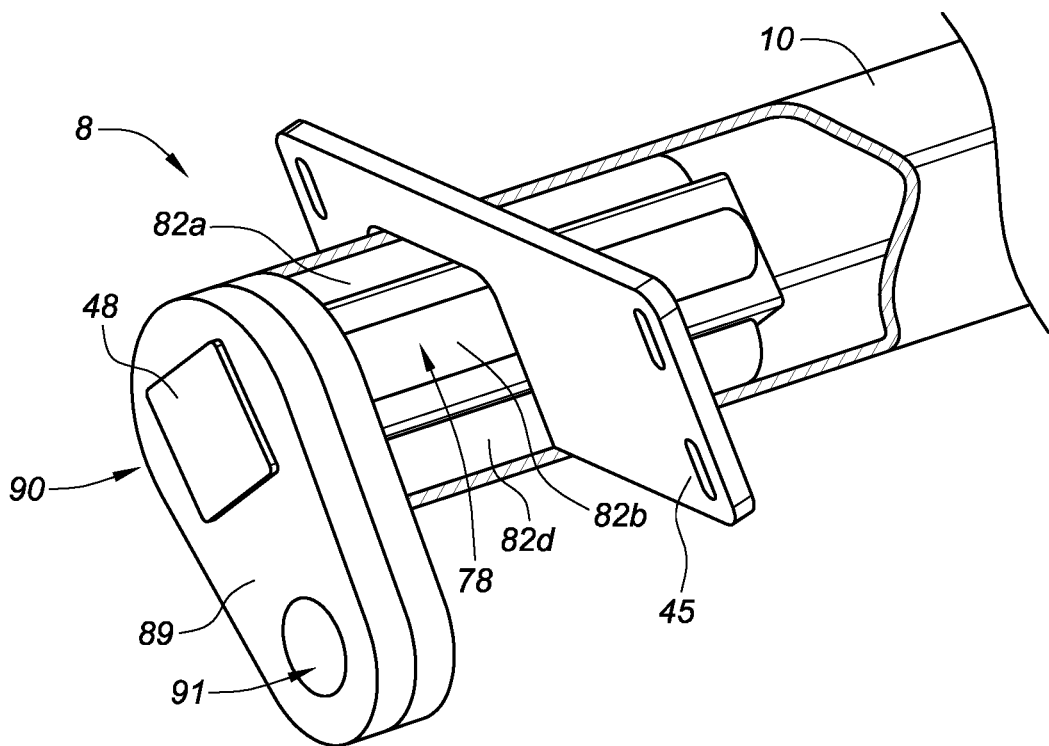
FIG. 6A is a perspective view of a "half axle" portion of the torsion axle suspension system of FIG. 1, illustrated in the configuration in which the torsion axle suspension system is accommodating the weight of the vehicle body as in FIG. 5A.
Figure 6B:
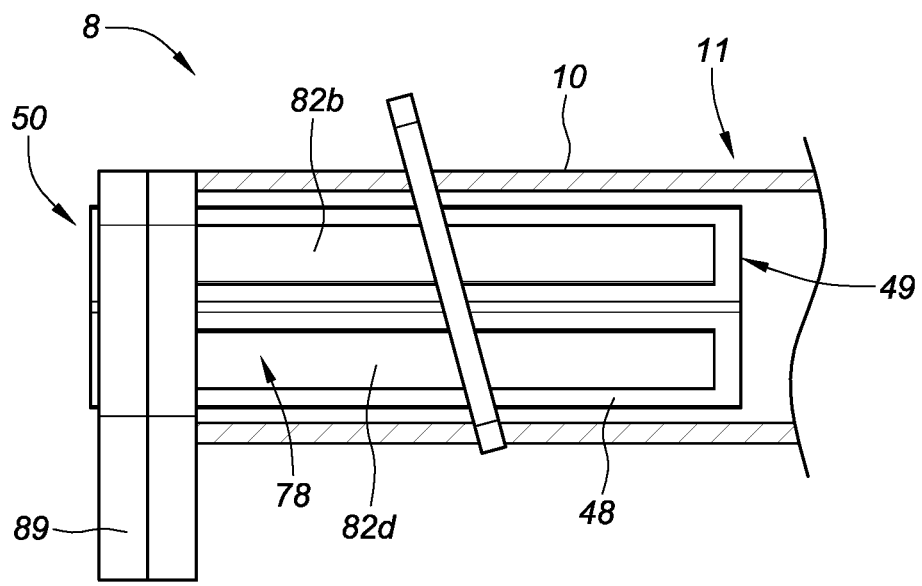
FIG. 6B is a front view of the torsion axle suspension system of FIG. 5A.
Figure 6C:
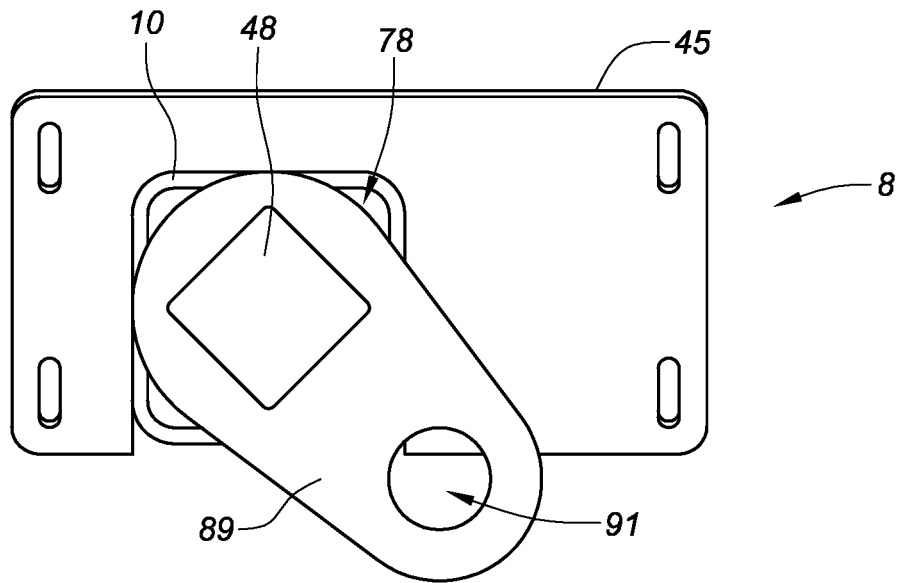
FIG. 6C is a left side view of the torsion axle suspension system of FIG. 5A.
Figure 6D:
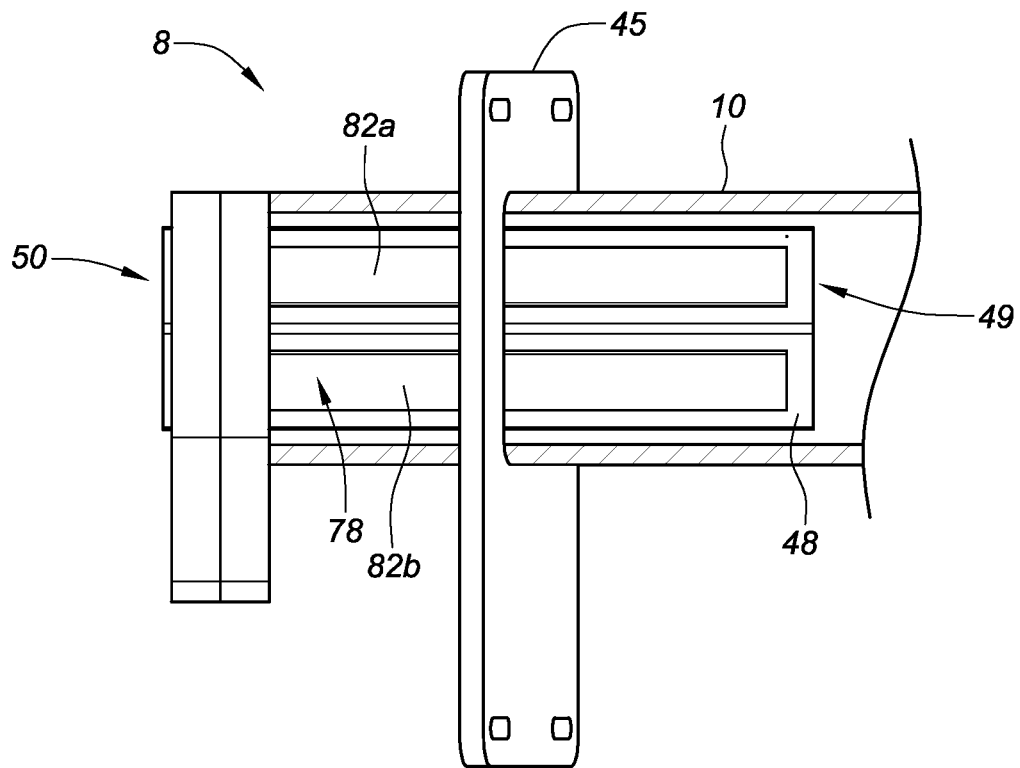
FIG. 6D is a top view of the torsion axle suspension system of FIG. 5A.

An example of a dual-sided torsion axle suspension system 8 is illustrated in FIGS. 1-2C. In this example, a single contiguous elongated enclosure 10 extends to enclose two opposing half-axles, each including elongated inner member 48, torsion arm 89, and torsion cords 82. FIG. 1 shows an example of such a torsion axle suspension system 8 in a perspective view illustrating both opposing half-axles, with a portion of the elongated enclosure 10 shown in cutaway view to illustrate underlying components. Some components that are hidden from view in FIG. 1 are shown with dashed lines to indicate their position. Front, left side, and top views of this example dual-sided torsion axle suspension system 8 are shown in FIGS. 2A, 2B, and 2C, respectively. A portion of the torsion axle suspension system 8 including one half axle is illustrated in a perspective view in FIG. 3, and is shown in an exploded view in FIG. 4A, and in separate views illustrating the elongated enclosure 10, the elongated inner member 48, the torsion cords 82a, 82b, 82c, 82d, and torsion arm 89, in FIGS. 4B, 4C, 4D, 4E, 4F, 4G, and 4H, respectively. The elongated enclosure 10 includes a high-strength material, such as a high-strength or reinforced polymer or metal; preferably, the elongated enclosure 10 includes a metal material. More preferably, the elongated enclosure 10 includes steel. The elongated inner member 48 includes a high-strength material, such as a high-strength or reinforced polymer or metal material; preferably, the elongated inner member 48 includes a metal material. More preferably, the elongated inner member 48 includes steel.

The torsion axle suspension system 8, which is illustrated in an unloaded configuration in FIG. 1 and elsewhere herein, is shown in a loaded configuration in FIGS. 5A-5D, with the torsion axle suspension system 8 attached to the vehicle body 2 by mounting brackets 45 and supporting the vehicle body weight 3 of the vehicle body 2 on the undercarriage 4, which in this example includes a pair of opposing track undercarriage mechanisms 6. The example illustrated in FIG. 5A includes two elongated enclosures 10, one proximate the front of the vehicle body 2 and the front of the track undercarriage mechanisms 6, and one proximate the rear of the vehicle body 2 and the rear of the track undercarriage mechanisms 6. In this example, each of the two elongated enclosures 10 accommodate a first half-axle 32a and a second half-axle 32b that are mirror images of one another. In the example illustrated in FIG. 5A, the torsion axle suspension system 8 proximate the front of the vehicle 2 is attached to the undercarriage 4 by the secondary torsion axle mechanisms 95, as further illustrated in the view of a portion of the torsion axle suspension system 8 in FIG. 5C, and the torsion axle suspension system 8 proximate the rear of the vehicle 2 is attached to the undercarriage 4 by beam mechanisms such as round beam mechanisms 96, as further illustrated in the view of a portion of the torsion axle suspension system 8 in FIG. 5D.

A portion of the torsion axle suspension system 8 is shown in further detail in a loaded configuration in FIGS. 6A-6D, which illustrate in perspective, front, left side, and top views the elongated enclosure 10, elongated inner member 48, torsion arm 89, mounting bracket 45, and resilient material 78, which in this example includes conical torsion cords 82a, 82b, 82c, 82d.

Figure 7A:
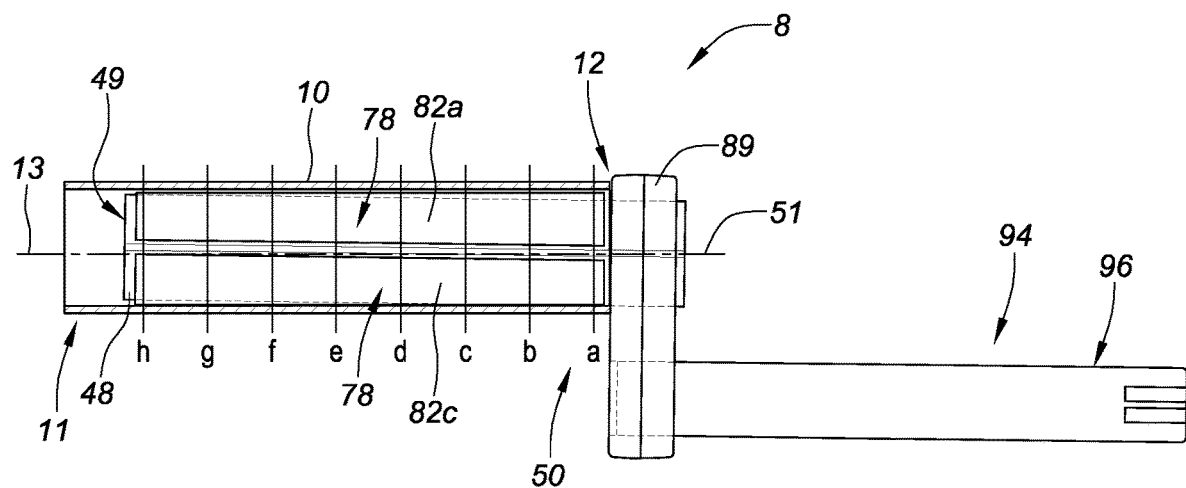
FIG. 7A is a schematic rear view of the portion of the torsion axle suspension system of FIG. 6A, showing section planes at locations along the length of the elongated inner member, in an unloaded configuration similar to that of FIG. 1.
Figure 7B:
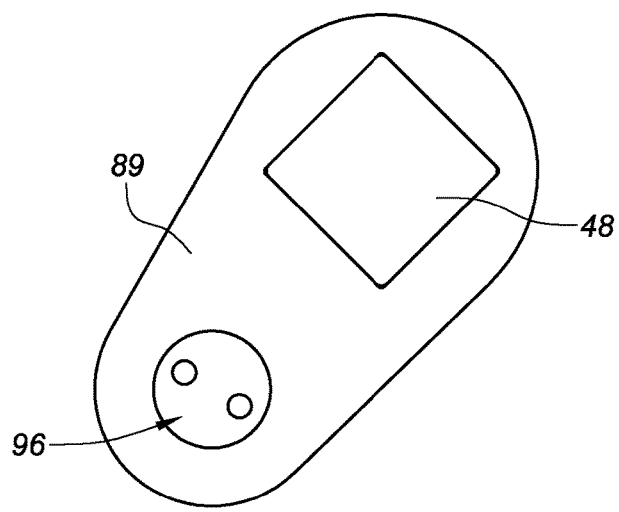
FIG. 7B is a schematic right side view of a portion of the torsion axle suspension system illustrated in FIG. 7A showing the torsion arm.
Figure 7C:
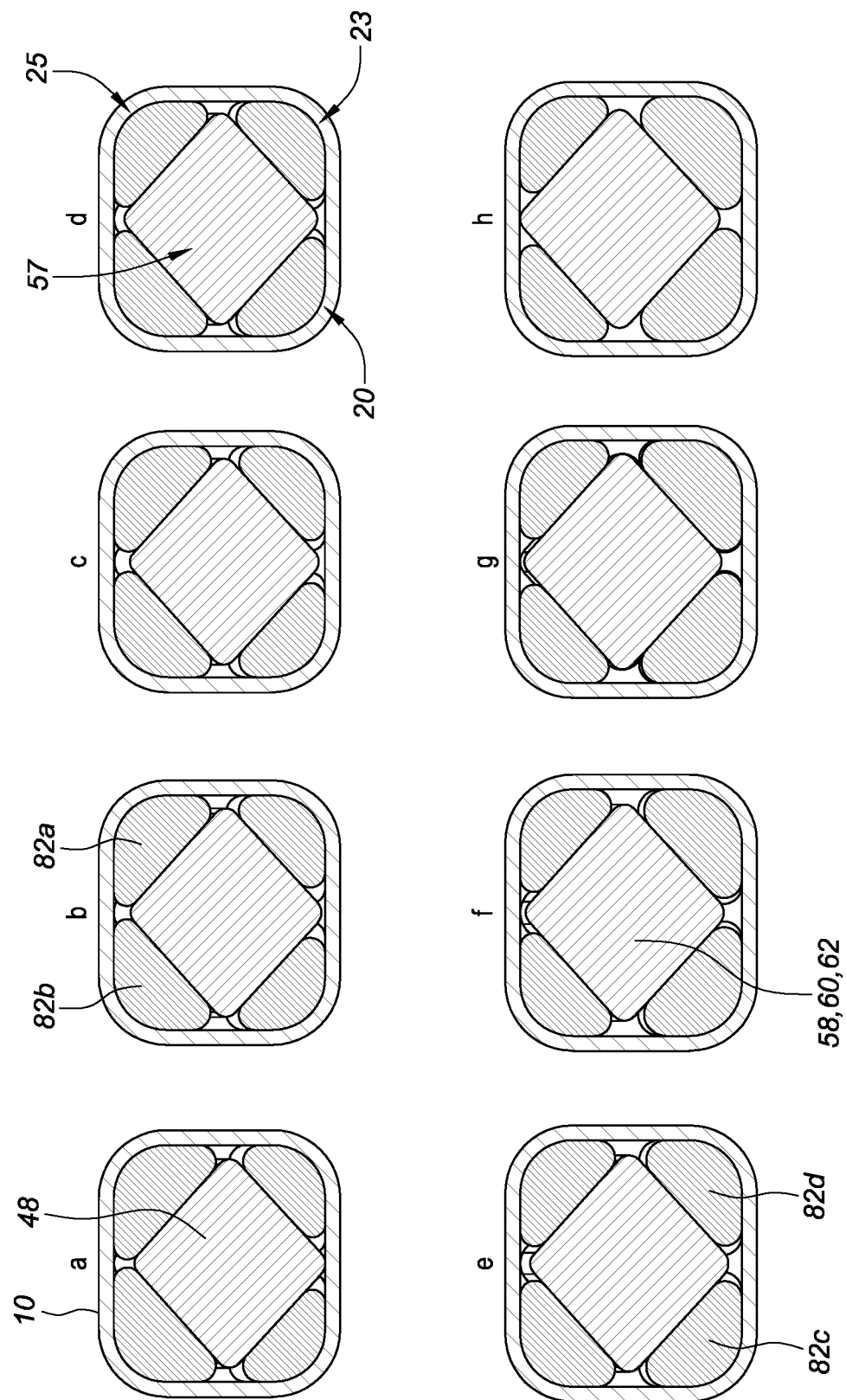
FIG. 7C is a schematic illustration showing the multiple views at clipping planes a-h as indicated on FIG. 7A.

A portion of a preferred embodiment of the torsion axle suspension system 8 that includes four conical torsion cords 82a-82d is further schematically illustrated in an unloaded configuration in FIGS. 7A-7C. FIG. 7A shows a schematic view from the rear indicating the general shape and orientation of the torsion cords 82a-82d and defining 8 section planes or clipping planes along the elongated inner member 48. FIG. 7B schematically illustrates a view of a portion of the torsion axle suspension system of FIG. 7A that includes the torsion arm 89, viewed from a direction perpendicular to the torsion arm 89. FIG. 7C illustrates cross sections at each of the 8 section planes indicated on FIG. 7A. As can be seen on FIG. 7C, there is greater amount of resilient material 78 proximate the outward portion of the elongated inner member 48 above the elongated member longitudinal axis 51, as can be seen with the conical torsion cords 82c, 82d that are located above the inner member longitudinal axis 51 and oriented with the respective larger ends 83a proximate the outward portion 50 of the elongated inner member 48 as seen in the view of section plane a. Also seen on FIG. 7C, there is lesser amount of resilient material 78 proximate the outward portion 50 of the elongated inner member 48 below the elongated member longitudinal axis 51, as can be seen with the conical torsion cords 82c, 82d that are located below the inner member longitudinal axis 51 and oriented with the respective smaller ends 83b proximate the outward portion 50 of the elongated inner member 48 as seen in the view of section plane a. Conversely, proximate the inward end 49 of the elongated inner member 48 as seen in the view of section plane h on FIG. 7C, there is greater amount of resilient material 78 proximate the inward end 49 of the elongated inner member 48 below the elongated member longitudinal axis 51, as can be seen with the conical torsion cords 82c, 82d that are located below the inner member longitudinal axis 51 and oriented with the respective larger ends 83a proximate the inward end 49 of the elongated inner member 48 as seen in the view of section plane h. Also seen on FIG. 7C, there is lesser amount of resilient material 78 proximate the inward end 49 of the elongated inner member 48 above the elongated member longitudinal axis 51, as can be seen with the conical torsion cords 82a, 82b that are located above the inner member longitudinal axis 51 and oriented with the respective smaller ends 83b proximate the inward end 49 of the elongated inner member 48 as seen in the view of section plane h. The intervening section planes b-g shown on FIG. 7C illustrate a progression of the amount of resilient material 78 in the torsion cords 82a, 82b decreasing from the outward portion 50 of the elongated inner member 48 towards the inward end 49 of the elongated inner member 48, and a progression of the amount of resilient material 78 in the torsion cords 82c, 82d increasing from the outward portion 50 of the elongated inner member 48 towards the inward end 49 of the elongated inner member 48. As can also be seen on FIG. 7A, in the illustrated configuration in which the torsion axle suspension system 8 is in an unloaded configuration in which the torsion axle suspension system 8 is not supporting the vehicle body weight 3 of the vehicle body 2, the inner member longitudinal axis 51 is oriented at an unloaded camber angle A1 with respect to the enclosure longitudinal axis 13. Preferably, in the unloaded configuration, the inward end 49 of the elongated inner member 48 is higher than the outward portion 50 of the elongated inner member 48, such as illustrated in FIGS. 7A-7C, and the unloaded camber angle A1 is considered to be positive. Also, as illustrated on FIG. 7B, the elongated inner member 48 is preferably oriented so that, in this example, rounded corners of the elongated inner member 48 are approximately towards the top, bottom, front, and rear of the elongated enclosure, and the torsion arm 89 is oriented at an unloaded torsion angle T1 from the vertical.

Figure 8A:
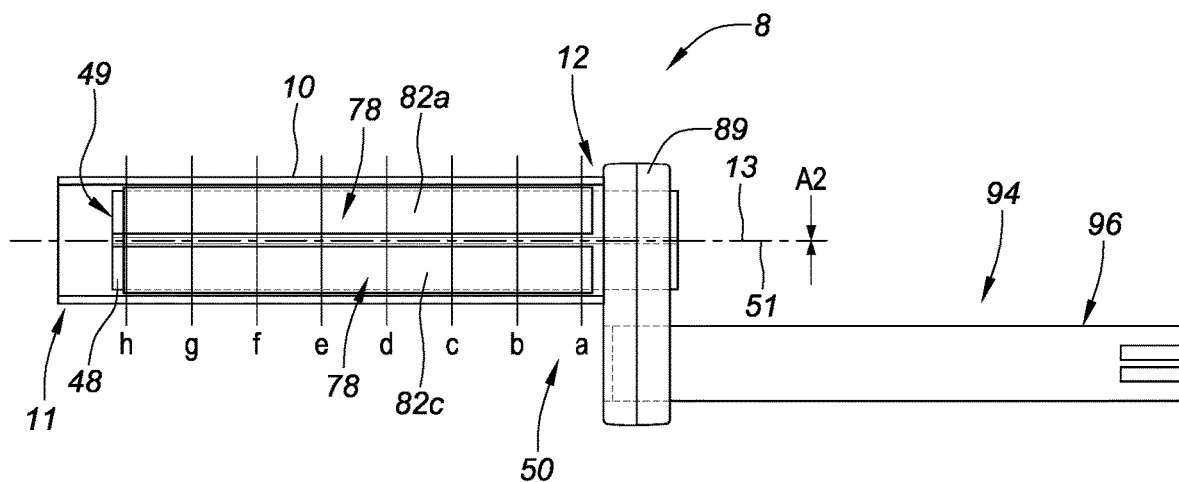
FIG. 8A is a rear view similar to that of FIG. 7A of the portion of the torsion axle suspension system of FIG. 6A, showing section planes at locations along the length of the elongated inner member, in a loaded configuration similar to that of FIG. 4.
Figure 8B:
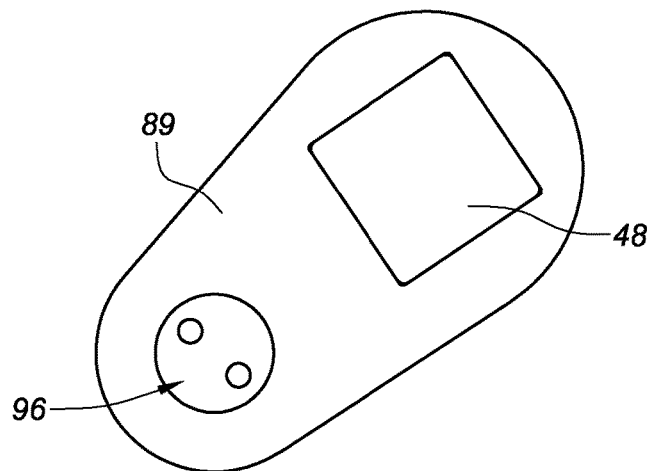
FIG. 8B is a schematic right side view of a portion of the torsion axle suspension system illustrated in FIG. 8A showing the torsion arm.
Figure 8C:
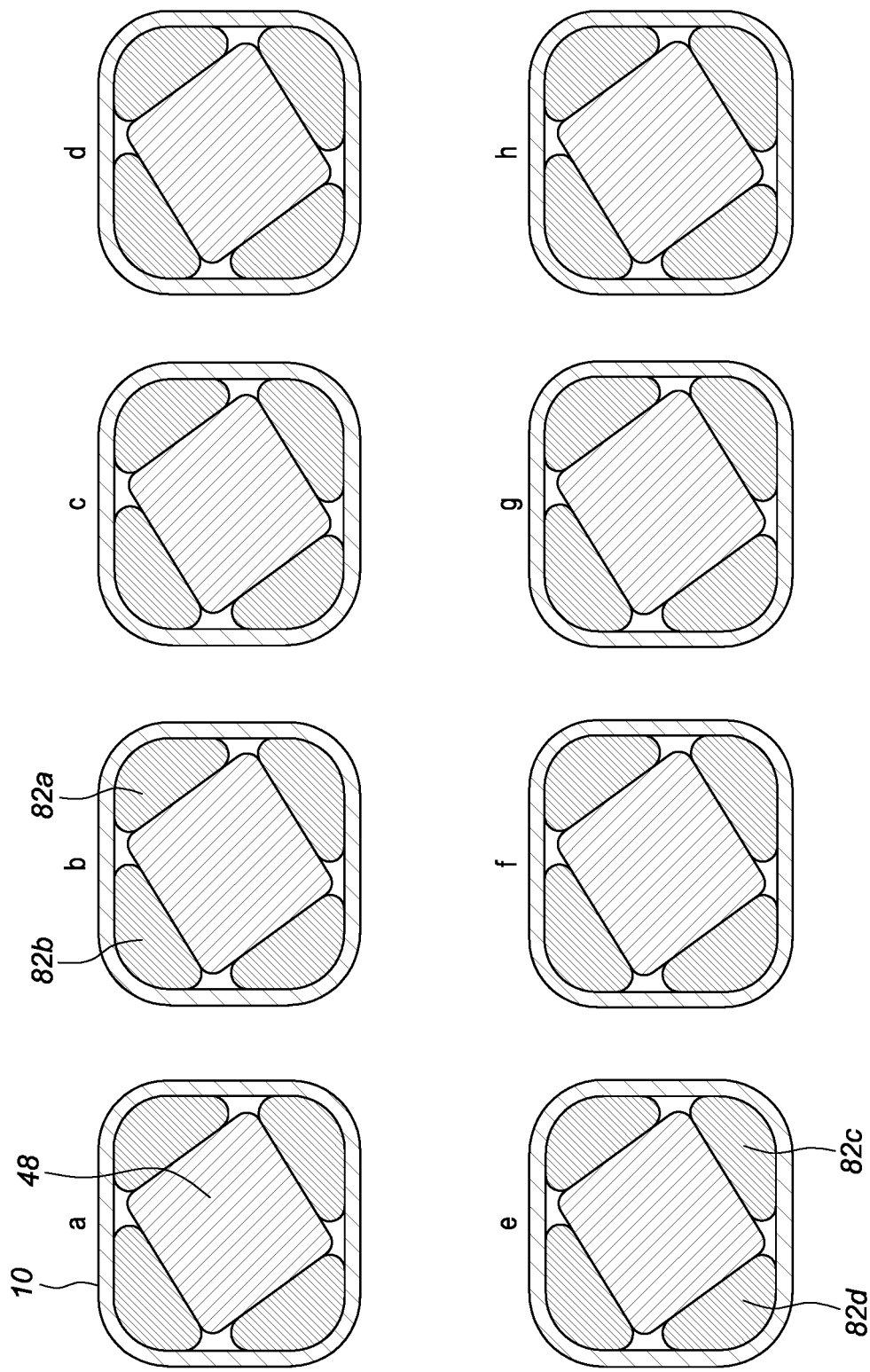
FIG. 8C is a schematic illustration showing the multiple views at clipping planes a-h as indicated on FIG. 7A.

FIGS. 8A-8D are similar views as those of FIGS. 7A-7D, and schematically illustrate the same portion of the torsion axle suspension system 8 but in a loaded configuration in which the torsion axle suspension system 8 is supporting the vehicle body weight 3 of the vehicle body 2, the resilient material 78 is elastically deformed, and the elongated inner member 48 orients so that the inner member longitudinal axis 51 is oriented at a loaded camber angle A2 with respect to the enclosure longitudinal axis 13. This loaded camber angle A2 is generally smaller than the unloaded camber angle A1; preferably, the inner member longitudinal axis 51 is approximately horizontal in the loaded configuration, and the loaded camber angle A2 is approximately zero. In the loaded configuration, the resilient material 78 is deformed, and in this example, the views of each of the cross sections a-h on FIG. 8C are similar. Also, as illustrated on FIG. 8B, as the resilient material 78 is elastically deformed, the elongated inner member 48 and the torsion arm 89 rotate about the inner member longitudinal axis 51, so that the torsion arm 89 is oriented at a loaded torsion angle T2 from the vertical.

Figure 22A:
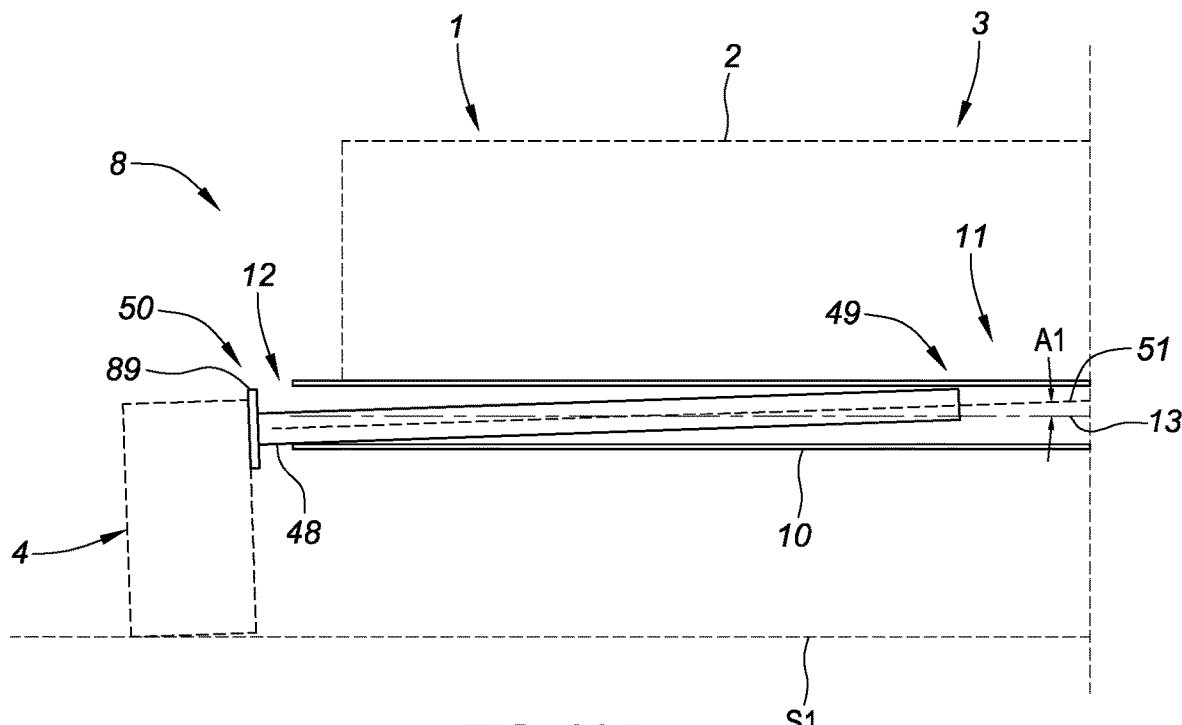
FIG. 22A is a schematic illustration showing some elements of the torsion axle suspension system, in an unloaded configuration with positive camber, showing the inner longitudinal axis higher proximate the inward end of the elongated inner member than proximate the outward portion of the elongated inner member.
Figure 22B:
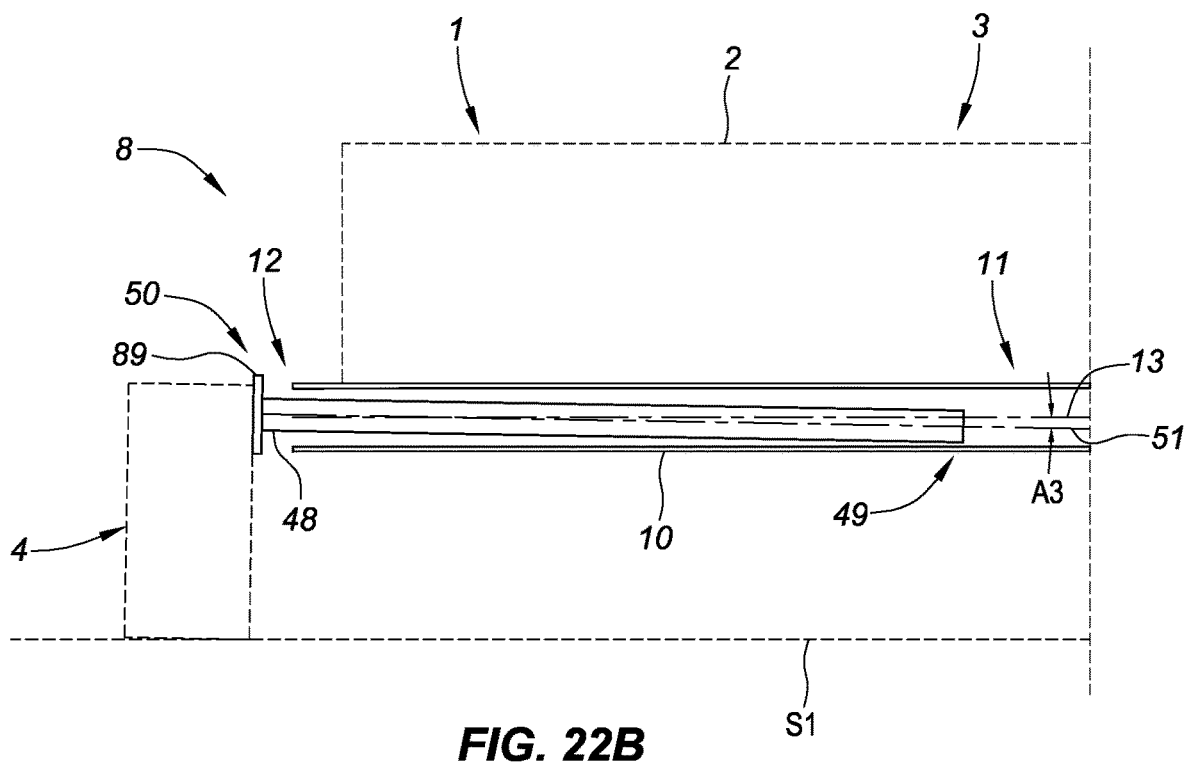
FIG. 22B is a schematic illustration showing some elements of a torsion axle, in a shock or overloaded configuration, showing the inner longitudinal axis lower proximate the inward end of the elongated inner member than proximate the outward portion of the elongated inner member.

When the vehicle is carrying additional load, or experiencing a "shock load" or overload due to irregular terrain, the resilient material 78 can be further elastically deformed, and the inward end 49 of the elongated inner member 48 can be lower than the outward portion 50 of the elongated inner member 48; in these situations the overloaded camber angle A3 is considered to be negative (see FIG. 22B). In such shock load conditions, the elongated inner member 48 and the torsion arm 89 rotate further about the inner member longitudinal axis 51, so that the torsion arm 89 is oriented at an overloaded torsion angle T3 that is further from the vertical (see FIG. 9).

The deformation of the resilient material 78 and rotation of the elongated inner member 48 and the torsion arm 89 is further shown in FIG. 9, which schematically illustrates the orientation of the elongated inner member 48 and the torsion arm 89 in the unloaded configuration (solid outline), and the loaded configuration (dashed outline), and also in a shock or extreme overload configuration (dashed outline) such as might occur as the vehicle 1 traverses varying terrain. FIG. 9 also schematically illustrates deformation of the resilient material 78 in response to these example loading conditions and the corresponding rotation of the elongated inner member 48 and the torsion arm 89, with three corresponding torsion angles T1, T2, T3.

Figure 10A:
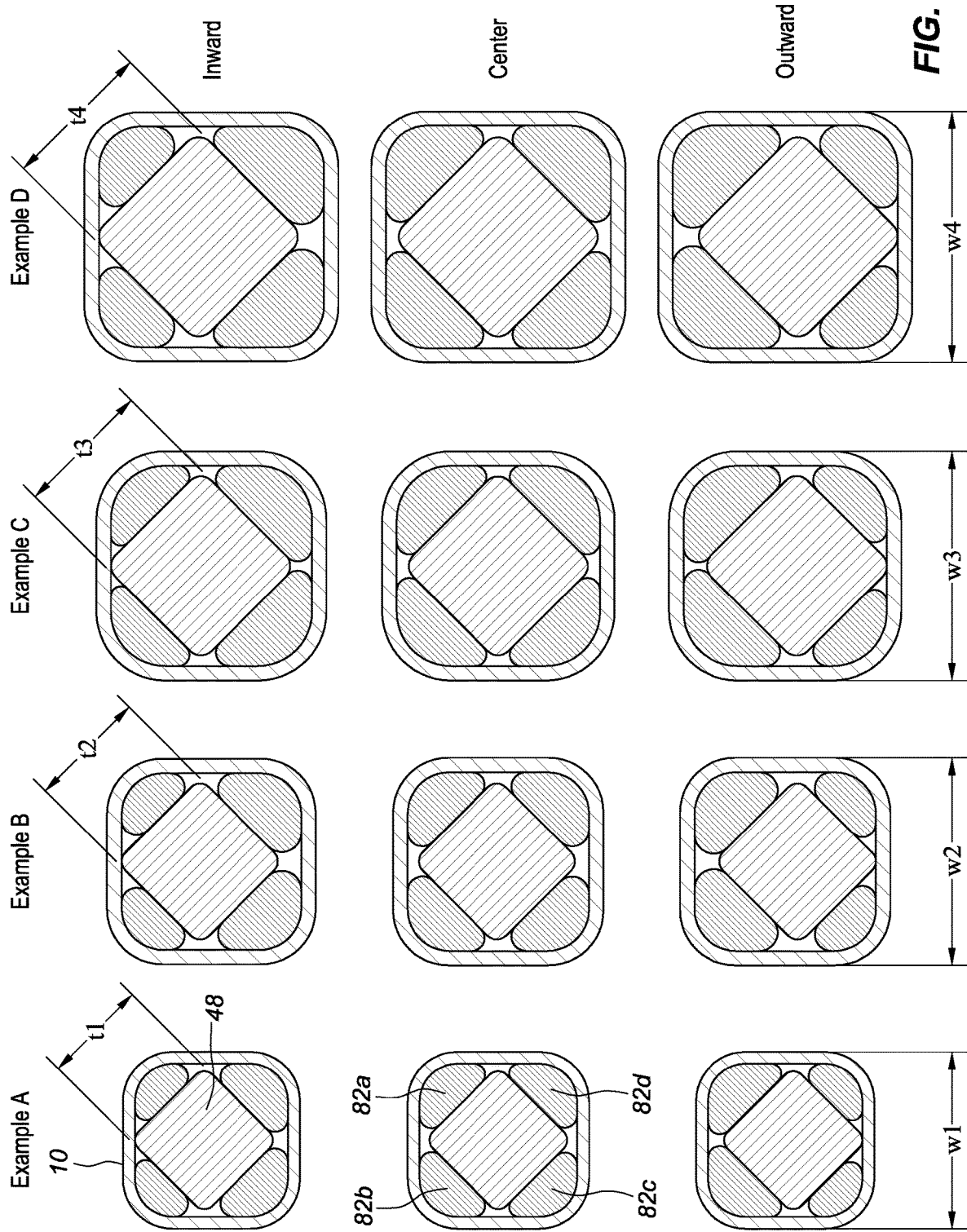
FIG. 10A is a schematic illustration showing section views taken at inward, center, and outward portions of various sizes of the torsion axle suspension system of FIG. 1 similar to the views of FIG. 7C, showing the scaleability of the torsion axle suspension system to accommodate various weight capacity and sizes.

One advantage of the present torsion axle suspension system 8 is that having the resilient material 78 is configured asymmetrically, with a greater amount of resilient material 78 located at some points in the torsion axle suspension system 8, and lesser amount of resilient material 78 located at other points in the torsion axle suspension system 8, as illustrated and described herein, is more efficient than prior approaches, and provides a greater weight-bearing capacity for the same size and weight of torsion axle suspension system 8 than prior approaches that utilize uniform torsion cords. In particular, having a greater amount of resilient material 78 located below the inner member longitudinal axis 51 proximate the inward end 49 of the elongated inner member 48, and a lesser amount of resilient material 78 located above the inner member longitudinal axis 51 proximate the inward end 49 of the elongated inner member 48, and a lesser amount of resilient material 78 located below the inner member longitudinal axis 51 proximate the outward portion 50 of the elongated inner member 48, and a greater amount of resilient material 78 located above the inner member longitudinal axis 51 proximate the outward portion 50 of the elongated inner member 48, provides a cambered unloaded configuration, and a loaded configuration in which the inner member longitudinal axis 51 and the enclosure longitudinal axis 13 are approximately parallel, with the elongated inner member 48 aligned with the elongated enclosure 50; this configuration provides additional capacity for shock or overload situations by avoiding the inward end 49 of the elongated inner member 48 contacting the elongated enclosure, which could cause unwanted shocks or component damage. Various arrangements are anticipated, with a preferred configuration including conical torsion cords 82a, 82b, 82c, 82d as described herein. The present approach is a scaleable, with various dimensions of the elongated inner member 48, elongated enclosure 50, and resilient material 78 chosen to accommodate the anticipated vehicle body weight 3; some example dimensions are illustrated in FIG. 10A, which shows cross section views similar to views a, d, and h of FIG. 7B for each of Example A, Example B, Example C, Example D. The size of the elongated inner member 48 and elongated enclosure 50 can be chosen to be larger or smaller in order to achieve desired spring rate and loading characteristics; the configuration of the resilient material 78 can be chosen to achieve desired orientation of the elongated inner member 48, such as to achieve a particular loaded torsion angle T2 (FIG. 9). For example, inner member thickness t1 and elongated enclosure width w1 are illustrated in the Example A of FIG. 10A. Similarly, inner member thickness t2, t3, and t4 and elongated enclosure width w2, w3, and w4 are illustrated in Example B, C, and D, respectively. Similar sizing and geometry choices can be made for other configurations such as the various elongated enclosure shapes 20 and elongated inner member shapes 57, including those disclosed herein.

Figure 10B:
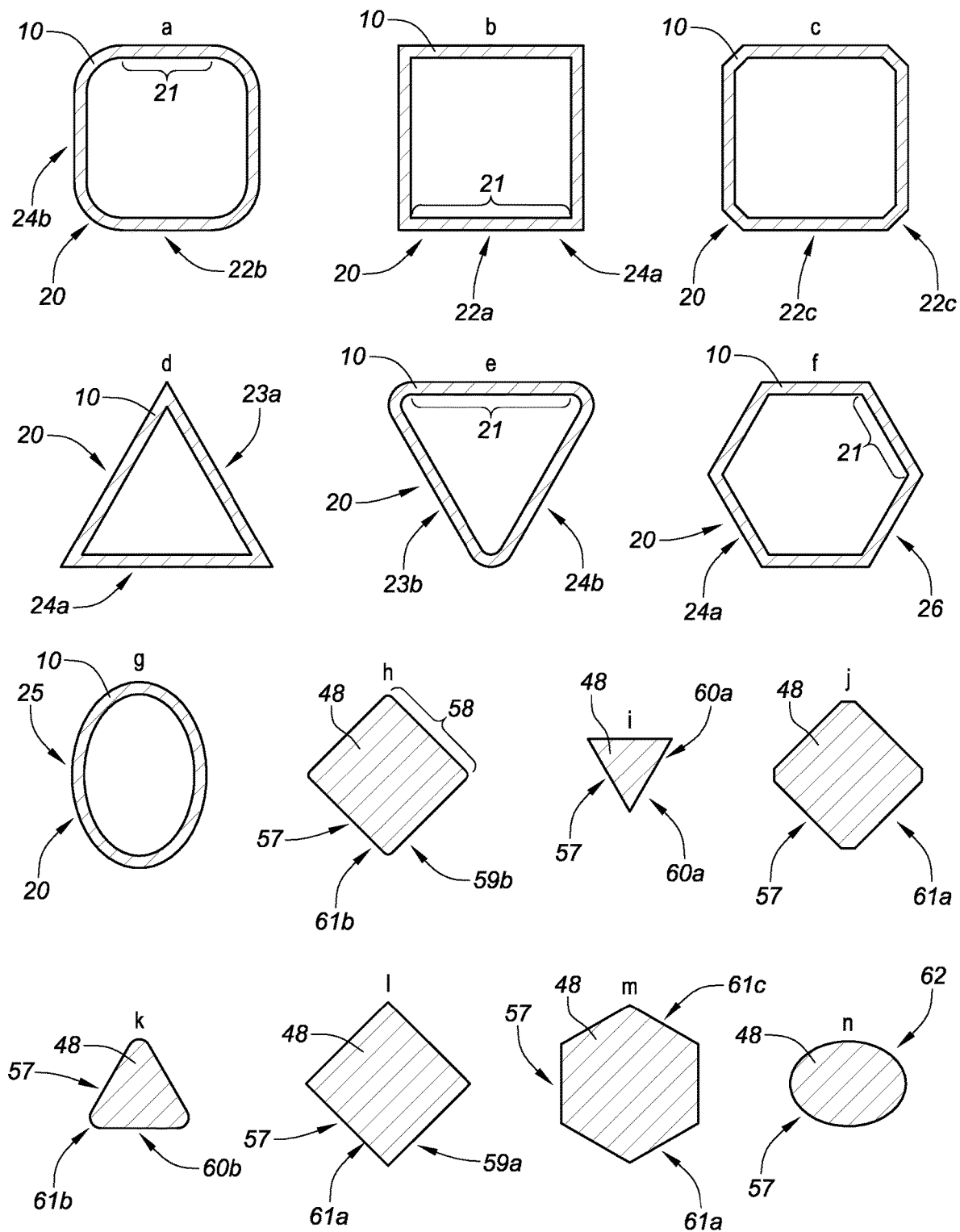
FIG. 10B is a schematic illustration showing section views showing examples of a variety of cross-sectional shapes of the elongated enclosure, the elongated inner member, and the resilient material.
Figures 10C, 10D:
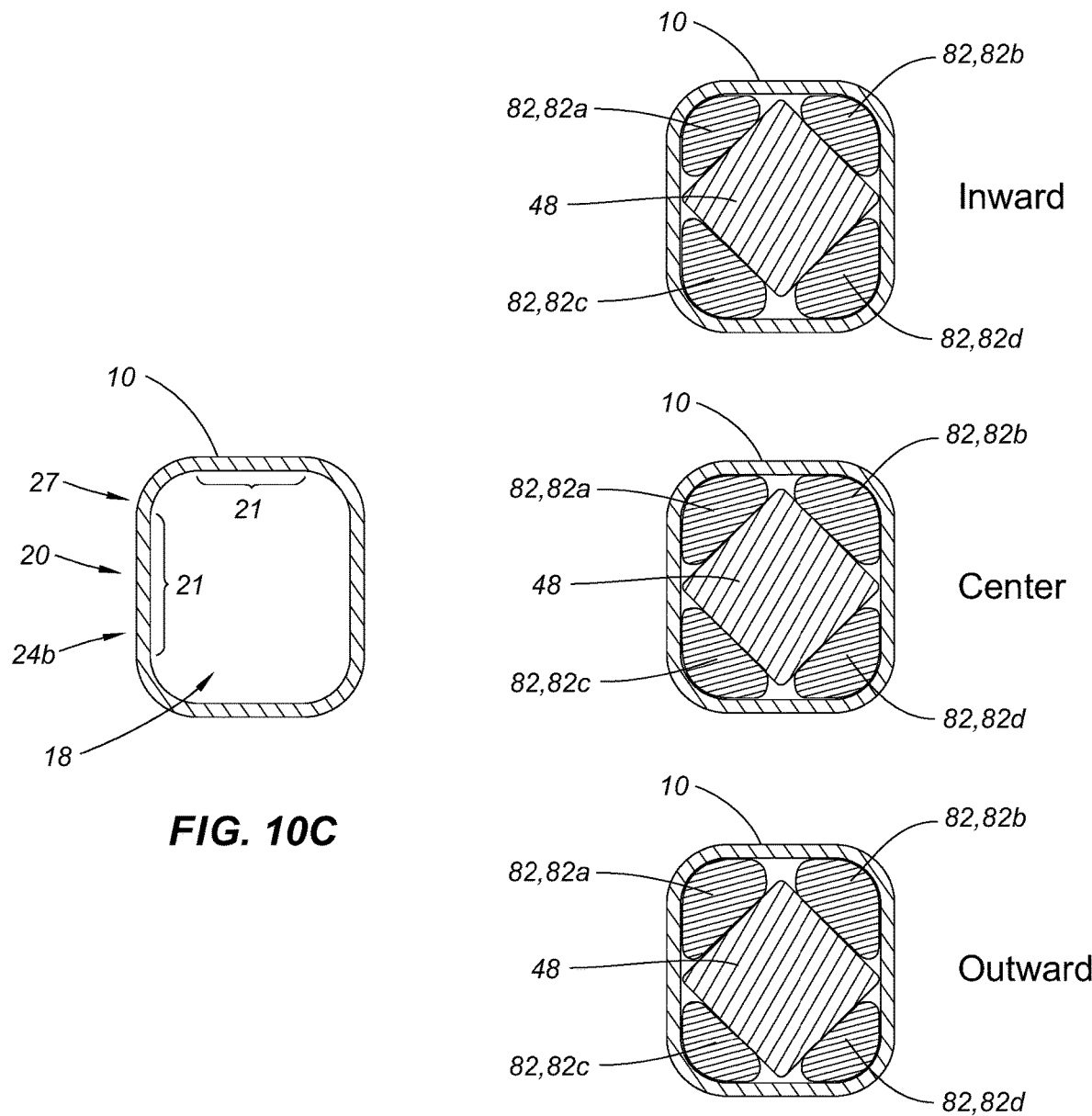
FIG. 10C is a schematic illustration showing a section view of an example of the elongated enclosure having a rounded rectangle cross-sectional shape.
FIG. 10D is a schematic illustration showing section views taken at inward, center, and outward portions of a torsion axle suspension system that includes a rounded rectangular outer tube such as that illustrated in FIG. 10C, showing the elongated inner member and the torsion cords.
Figure 11A:
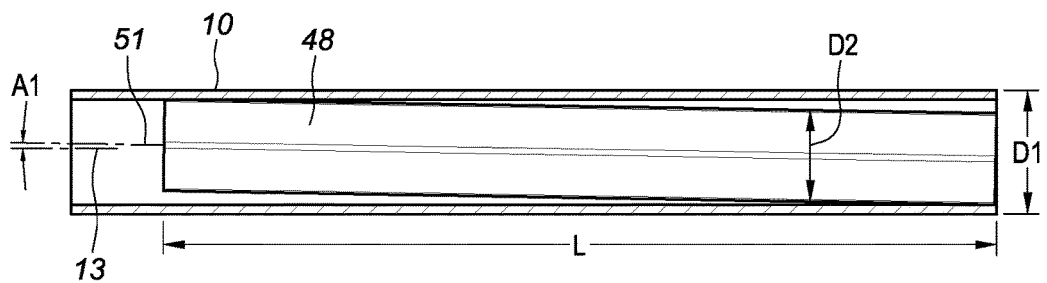
FIG. 11A is a schematic illustration showing a first example elongated enclosure and elongated inner member dimensions accommodating a first camber angle at a first length, with a portion of the elongated enclosure removed to show the inner bar.
Figure 11B:
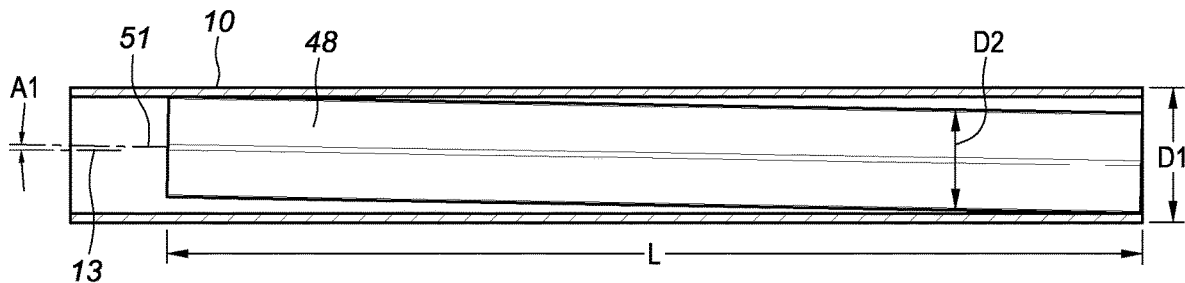
FIG. 11B is a schematic illustration showing a first example elongated enclosure and elongated inner member dimensions accommodating a second camber angle at a second length, with a portion of the elongated enclosure removed to show the inner bar.
Figure 11C:
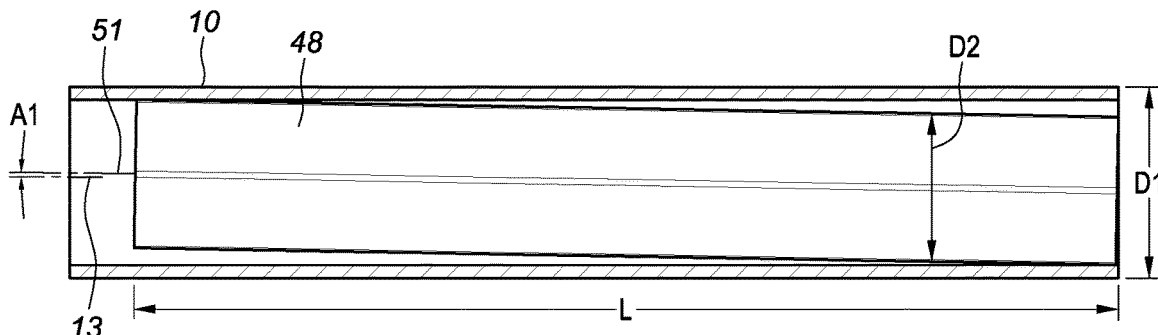
FIG. 11C is a schematic illustration showing a first example elongated enclosure and elongated inner member dimensions accommodating a third camber angle at a third length, with a portion of the elongated enclosure removed to show the inner bar.
Figure 11D:
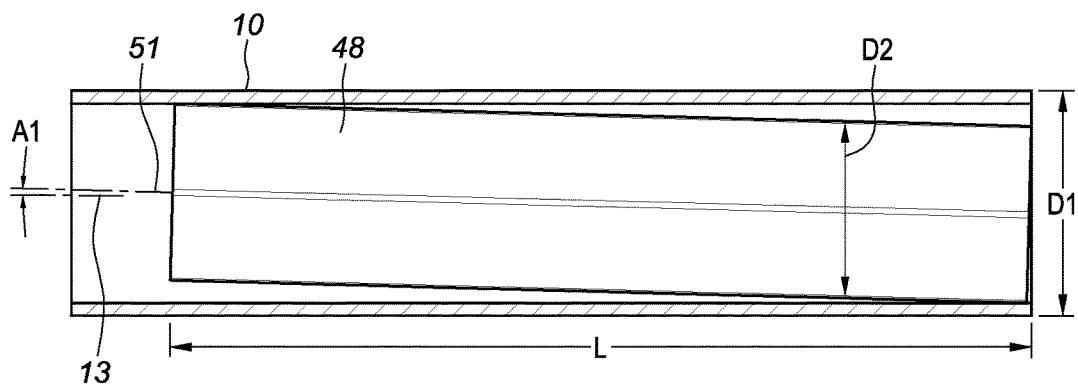
FIG. 11D is a schematic illustration showing a first example elongated enclosure and elongated inner member dimensions accommodating a fourth camber angle at a fourth length, with a portion of the elongated enclosure removed to show the inner bar.

The elongated enclosure 10 and the elongated inner member 48 and the resilient material 78 can have a variety of cross-sectional shapes, some of which are illustrated in FIG. 10B-10D as examples, as well as elsewhere herein. Non-limiting examples of the cross-sectional shape 20 of the elongated enclosure 10 are shown at a-h in FIG. 10B, and include square 22a (see b), rounded square 22b (see a), chamfered square 22c (c), triangle 23a (d), rounded triangle 23b (e), hexagon 26 (f), and curved 25 (d). Some cross-sectional shapes 20 of the elongated enclosure 10 include a flat portion 21 (a-f). Preferably, the elongated enclosure 10 includes a polygon cross-sectional shape 24a (for example, that of b, c, d or f of FIG. 10B); more preferably, the elongated enclosure 10 has a rounded polygon cross-sectional shape 24b (for example, that of a or e of FIG. 10B, or that of FIG. 10C). Still more preferably, the elongated enclosure 10 has a rounded square cross-sectional shape 22b (for example, that of a of FIG. 10B). Non-limiting examples of the cross-sectional shape 57 of the elongated inner member 48 are shown at i-n in FIG. 10B, and include square 59a (see I), rounded square 59b (h), chamfered square 59c (j), triangle 60a (i), rounded triangle 60b (k), hexagon 61c (m), and curved 62 (n). Some cross-sectional shapes 57 of the inner member 48 include a flat portion 58 (a-f). Preferably, the elongated inner member 48 includes a polygon cross-sectional shape 61a (for example, that of i, j, l, or m of FIG. 10B); more preferably, the elongated inner member 48 has a rounded polygon cross-sectional shape 61b (for example, that of h or k of FIG. 10B). Still more preferably, the elongated inner member 48 has a rounded square cross-sectional shape 59b (for example, that of h of FIG. 10B). Non-limiting examples of the cross-sectional shape of the resilient material 78 include those illustrated at h-n in FIG. 10B for the elongated inner member 48, and other shapes described elsewhere herein. As described herein, the amount of resilient material 78 preferably varies among different locations along the elongated inner member 48, and is also different between the resilient material 78 above the inner member longitudinal axis 51 and below the inner member longitudinal axis 51. The cross-sectional shapes and sizes of the elongated enclosure 10 and the elongated inner member 48 and the resilient material 78 can vary along the respective length of the elongated enclosure 10 and the elongated inner member 48 and the resilient material 78, such as is disclosed herein. Various combinations of cross-sectional shapes of the elongated enclosure 10 and the elongated inner member 48 and the resilient material 78 can be utilized. In another example, an elongated enclosure 10 having a cross-sectional shape 20 that is a rounded rectangular cross-sectional shape 27 is schematically illustrated in FIGS. 10C-10D. In this example, the cross-sectional shape 20 includes flat portions 21. Preferably, the elongated inner member 48 at least partially resides within the interior space 18, with the conical torsion cords 82 (82a, 82b, 82c, 82d) supporting the elongated inner member 48 within the interior space 18. In this example, the rounded rectangular cross-sectional shape 27 of the elongated enclosure 10 preferably provides for a greater unloaded camber angle A1 (FIG. 22A) for a particular elongated inner member 48. FIG. 10D schematically shows cross section views similar to views a, d, and h of FIG. 7B, taken near the inward end 49, a central portion 56, and the outward portion 50, respectively, of the elongated inner member 48 having rounded rectangular cross-sectional shape 27 of the elongated enclosure 10.

A particular camber may be chosen to accommodate loading from the vehicle body weight 3 and anticipated terrain, for example. FIGS. 11A-11D schematically illustrate smaller and larger elongated inner member 48 and elongated enclosure 50 examples, with smaller and larger camber; the unloaded camber angle A1 is indicated for each example in FIGS. 11A-11D. The geometry of the elongated inner member 48 can also be chosen to allow for greater or lesser camber, such as by utilizing a radiused or chambered inward end 49. For example, a length L from the open outward end of the elongated enclosure 10 to the inward end of the elongated inner member 48, the vertical dimension D1 of the elongated enclosure 10, and the vertical dimension D2 of the elongated inner member can be chosen.

In some embodiments, the engaging outer surface 52 of the elongated inner member 48 can include a flat portion 53 of engaging surface 52, a concave portion 54 of engaging surface 52, a convex portion 55 of engaging surface 52, or a combination. For example, FIG. 12 shows cross section views similar to views a, d, and h of FIG. 7B, taken near the inward end 49, a central portion 56, and the outward portion 50, respectively, of the elongated inner member 48, which illustrate an example of the engaging outer surface 52 of the elongated inner member 48 that includes concave portion 54, such as to accommodate and engage the resilient material 78 such as conical torsion cords 82a, 82b, 82c, 82d.

In some embodiments, a single contiguous piece of resilient material 78 extends from proximate the inward end 49 to the outward portion 50 of the elongated inner member 48, such as conical torsion cords 82a, 82b, 82c, 82d. In other embodiments, the resilient material 78 is configured as a plurality of discontinuous pieces of resilient material 78 arranged along the elongated inner member 48. For example, as schematically illustrated in FIGS. 13-14, inward torsion cord segments 86a-86d, are arranged proximate the inward end 49 of the elongated inner member 48, and outward torsion cord segments 86e-86h are arranged proximate the outward portion 50 of the elongated inner member 48. In the example of FIG. 13, the elongated inner member 48 includes concave engaging surface 54 to accommodate and engage the inward torsion cord segments 86a-86d and the outward torsion cord segments 86e-86h, with a separation between the inward torsion cord segments 86a-86d and the outward torsion cord segments 86e-86h located proximate the central portion 56 of the elongated inner member 48. In the example of FIG. 14, the elongated inner member 48 includes concave engaging surface 54 to accommodate and engage the inward torsion cord segments 86a-86d and the outward torsion cord segments 86e-86h, and also includes a central portion 56 which is enlarged and separates the inward torsion cord segments 86a-86d and the outward torsion cord segments 86e-86h. In the examples of FIG. 13-14, the inward torsion cord segments 86a-86d and the outward torsion cord segments 86e-86h are of different sizes, analogous to the larger end 83a having a greater amount of resilient material 78 and the smaller end 83b having a lesser amount of resilient material 78 described earlier herein, and configured so that when the torsion axle suspension system 8 is in an unloaded configuration in which the torsion axle suspension system 8 is not supporting the vehicle body weight 3 of the vehicle body 2, the inner member longitudinal axis 51 is cambered, and oriented at an unloaded camber angle A1 with respect to the enclosure longitudinal axis 13. The inward torsion cord segments 86a-86d and the outward torsion cord segments 86e-86h can be conical, similar to torsion cords 82a-82d. Alternatively, the inward torsion cord segments 86a-86d and the outward torsion cord segments 86e-86h can be generally cylindrical, with differing dimensions, to provide the desired cambered unloaded configuration. Tapered or non-tapered contiguous or segmented torsion cords can be used, with various shapes of elongated inner member 48, as long as the resilient material 78 includes a greater amount of resilient material 78 located below the inner member longitudinal axis 51 proximate the inward end 49 of the elongated inner member 48, and a lesser amount of resilient material 78 located above the inner member longitudinal axis 51 proximate the inward end 49 of the elongated inner member 48, and a lesser amount of resilient material 78 located below the inner member longitudinal axis 51 proximate the outward portion 50 of the elongated inner member 48, and a greater amount of resilient material 78 located above the inner member longitudinal axis 51 proximate the outward portion 50 of the elongated inner member 48, so that when the torsion axle suspension system 8 in an unloaded configuration in which the torsion axle suspension system 8 is not supporting the vehicle body weight 3 of the vehicle body 2, the inner member longitudinal axis 51 is cambered, and oriented at an unloaded camber angle A1 with respect to the enclosure longitudinal axis 13. Some embodiments include torsion cords 82 of differing sizes, so that, for example, torsion cords 82 located below the inner member longitudinal axis 51 may be generally larger than torsion cords 82 located above the inner member longitudinal axis 51. The torsion cords 82 preferably have generally circular cross sections, such as cylindrical or conical cross sections. In other preferred embodiments, the torsion cords 82 may have oval, elliptical, rounded triangular, polygonal, rounded polygonal, or other shape cross sections.

Figure 15:
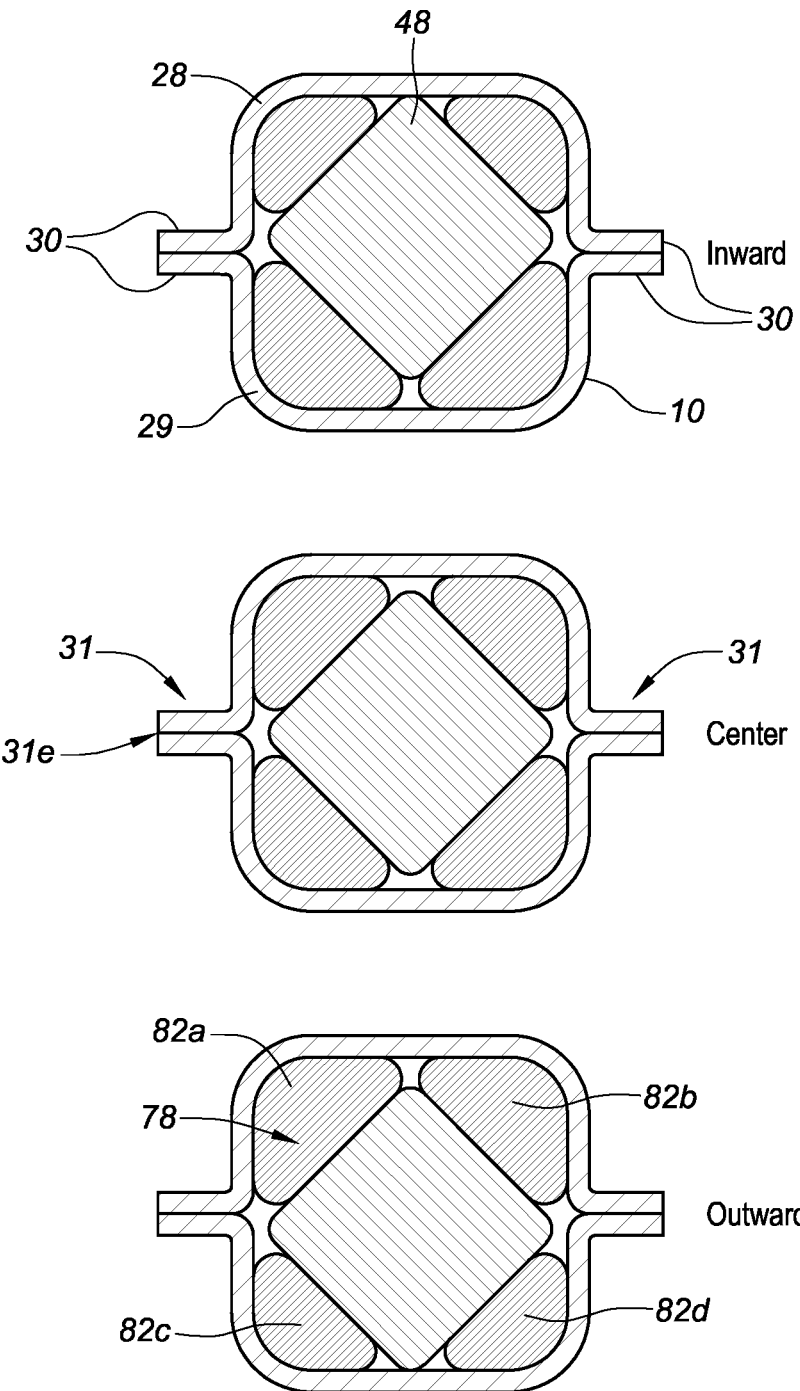
FIG. 15 is a schematic illustration showing section views taken at inward, center, and outward portions of an example configuration of the torsion axle suspension system that includes a multi-part elongated enclosure.
Figure 16A:
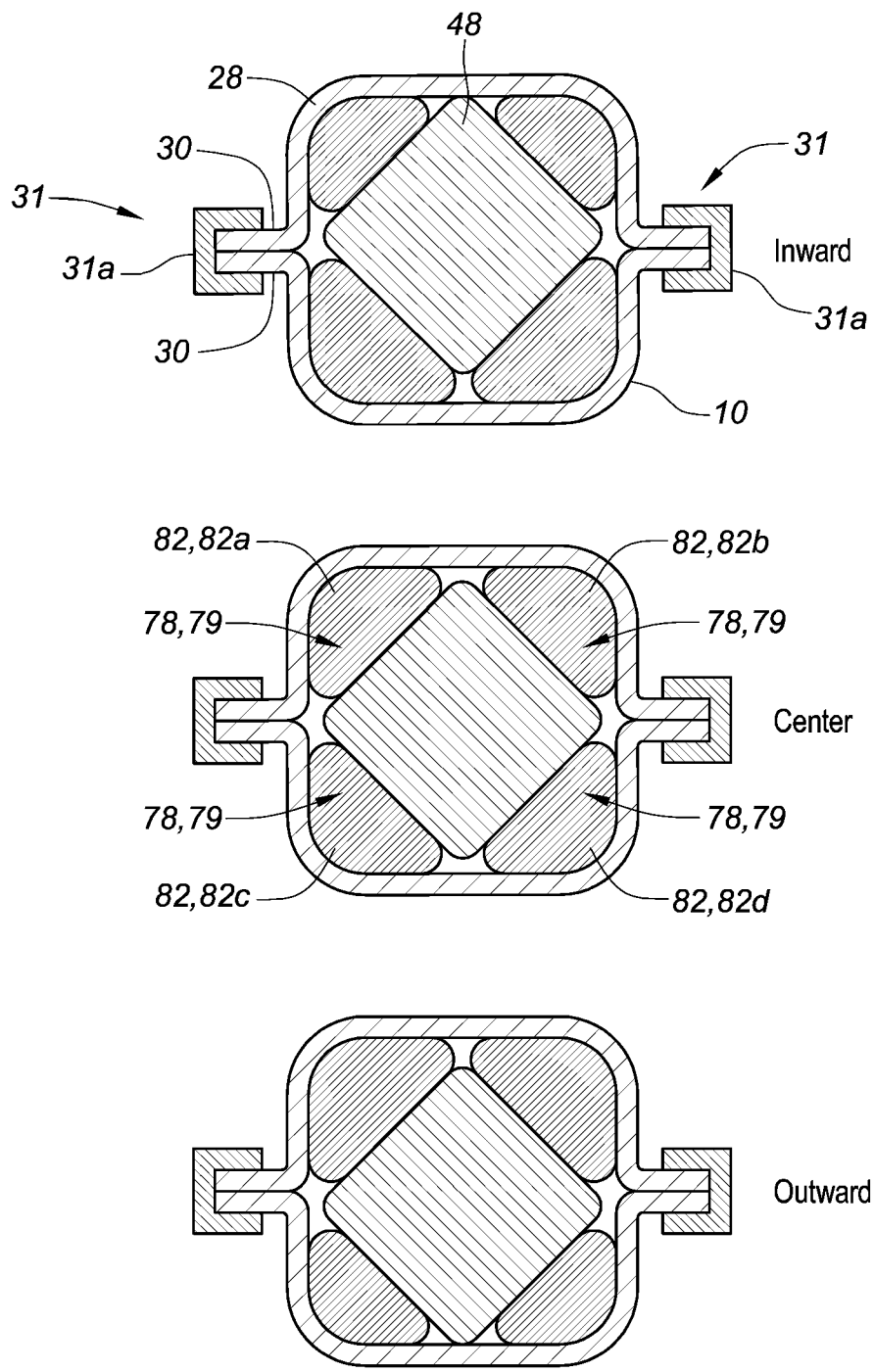
FIG. 16A is a schematic illustration showing section views taken at inward, center, and outward portions of an example configuration of the torsion axle suspension system that includes a multi-part elongated enclosure and mechanical couplers.
Figure 16B:
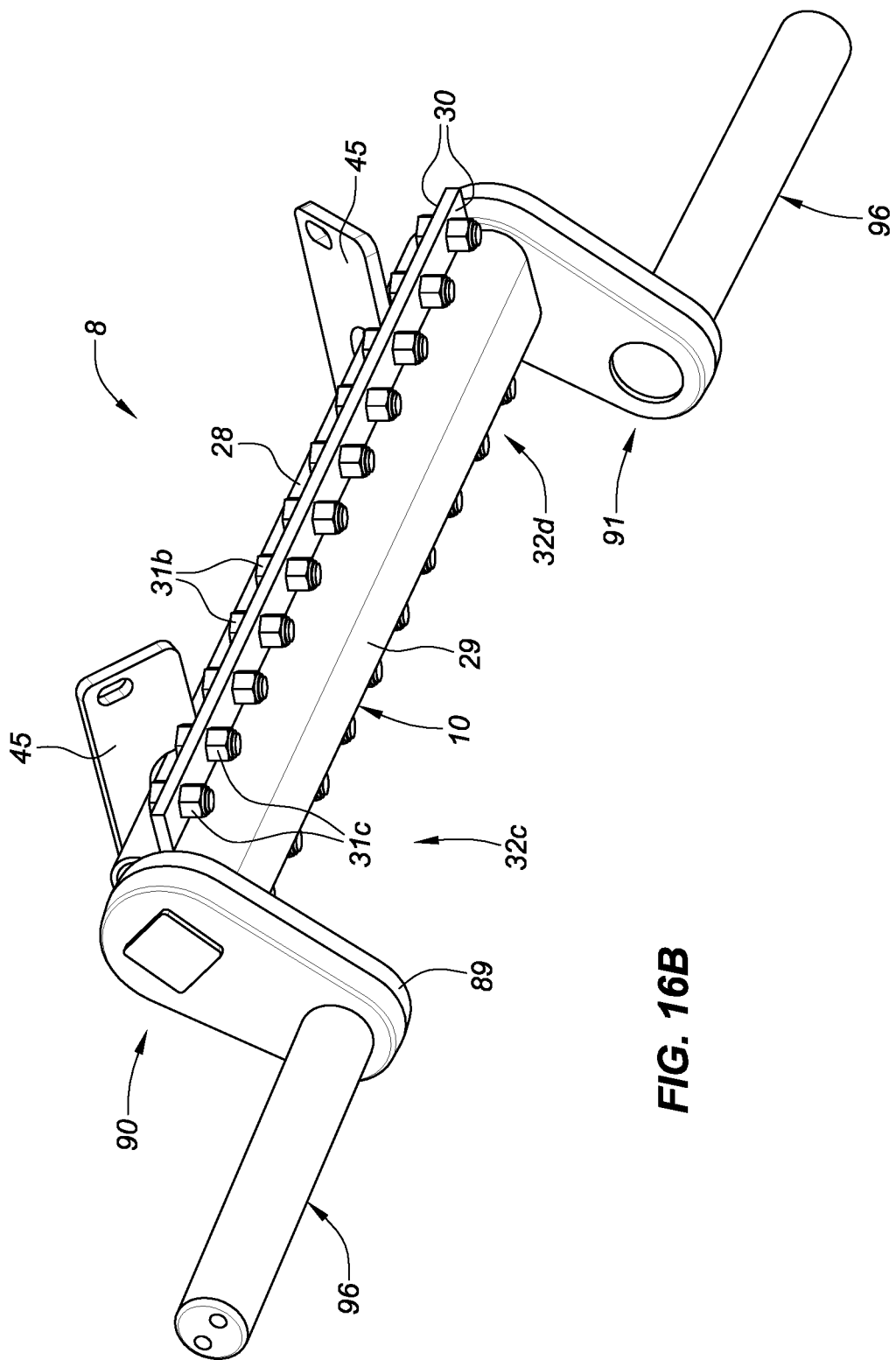
FIG. 16B is a schematic illustration showing a perspective view of a torsion axle suspension system having a multi-part elongated enclosure and alternative mechanical couplers.

In some preferred embodiments of torsion axle suspension system 8 schematically illustrated in FIGS. 15-16B, the elongated enclosure 10 includes an elongated enclosure upper part 28, an elongated enclosure lower part 29, and an elongated enclosure part attachment mechanism 31. Preferably, the elongated enclosure upper part 28, and the elongated enclosure lower part 29, include flanges 30. The attachment mechanism 31 can include a variety of attachment features or fasteners, such as retainer 31a, threaded fasteners such as bolt 31b, nut 31c, adhesive 31d, weld 31e, or a combination of fasteners; other known fastening mechanisms can be used. By incorporating multiple parts such as the elongated enclosure upper part 28, and the elongated enclosure lower part 29, and fasteners such as 31a-31e, the torsion axle suspension system can be assembled by inserting and aligning the resilient material 78, such as conical torsion cords 82, and the elongated inner member 48, between the elongated enclosure upper part 28, and the elongated enclosure lower part 29, and using the attachment mechanism 31 to secure the assembly. Similarly, by disengaging the attachment mechanism 31, one may access the resilient material 78 and the elongated inner member 48 for maintenance or repair. In these embodiments, for example, the torsion cords 82 can be replaced by torsion cords 82 having different geometries or elastic properties, allowing a user to adjust the suspension characteristics of the torsion axle suspension system 8 to suit the requirements of the particular application. These arrangements can also facilitate assembly of the torsion axle suspension system 8 by avoiding the need for freezing of the resilient material 78 for assembly into the elongated enclosure 10. In some embodiments, the elongated enclosure upper part 28 is attached to the vehicle 1, such as by adhesive attachment similar to adhesive 31d, or by weld similar to weld 31e, or preferably by fasteners similar to the bolt 31b, nut 31c, or the like. One example configuration is illustrated in FIG. 15, in which flanges 30 are incorporated; these flanges can be secured together using various fasteners or fastening such as 31a-31e, or other attachment mechanism 31. In the example configuration illustrated in FIG. 16A, attachment mechanism 31 includes retainers 31a, and the example configuration illustrated in FIG. 16B, attachment mechanism 31 includes bolts 31b and nuts 31c; the examples shown herein are not exhaustive, but simply illustrate some of the configurations and attachment mechanisms 31 that may be utilized.

The resilient material 78 can include various configurations such as those disclosed herein; preferably, the various configurations include with a greater amount of resilient material 78 located at some points in the torsion axle suspension system 8, and lesser amount of resilient material 78 located at other points in the torsion axle suspension system 8, so that when the torsion axle suspension system 8 in an unloaded configuration in which the torsion axle suspension system 8 is not supporting the vehicle body weight 3 of the vehicle body 2, the inner member longitudinal axis 51 is oriented at an unloaded camber angle A1 with respect to the enclosure longitudinal axis 13, with the inward end 49 of the elongated inner member 48 being higher than the outward portion 50 of the elongated inner member, and the elongated inner member 48 is "cambered". In various preferred embodiments, the torsion axle suspension system 8, when in an unloaded configuration in which the torsion axle suspension system 8 is not supporting the vehicle body weight 3 of the vehicle body 2, the inner member longitudinal axis 51 is oriented at an unloaded camber angle A1 with respect to the enclosure longitudinal axis 13 of from about 0.25 degrees to about 10 degrees.

In some preferred embodiments, the resilient material 78 is configured as multiple pieces, such as the conical torsion cords 82a, 82b, 82c, 82d described herein. In other preferred embodiments, the resilient material 78 is configured as a plurality of separate pieces 81 such as inward torsion cord segments 86a-86d and outward torsion cord segments 86e-86h illustrated in FIGS. 13, 14, 18A and 18B. The resilient material 78, whether configured as extending from proximate the inward end 49 to proximate the outer portion 50 of the elongated inner member 48, or configured as separate inner torsion cord segments 86a-86d and outward torsion cord segments 86e-86h, can be of similar or of differing sizes, and preferably vary in size along their respective lengths, with some portions being larger and other portions being smaller, such as being stepped or tapered, or conical, for example, similar to the conical torsion cords 82a, 82b, 82c, 82d. Alternatively, when the resilient material 78 is configured as a plurality of separate pieces such as inward torsion cord segments 86a-86d and outward torsion cord segments 86e-86h, the inward torsion cord segments 86a-86d and the outward torsion cord segments 86e-86h may be generally uniform size along their respective lengths, but the inward torsion cord segments 86a-86d are of different size that the outward torsion cord segments 86e-86h, to provide an unloaded "cambered" configuration such as described herein. In other preferred embodiments, the resilient material 78 is configured as a unitary or single piece 80 such as is illustrated in FIG. 17, that is wrapped around or formed around the elongated inner member 48, or into which the elongated inner member 48 is inserted.

Figure 18B:
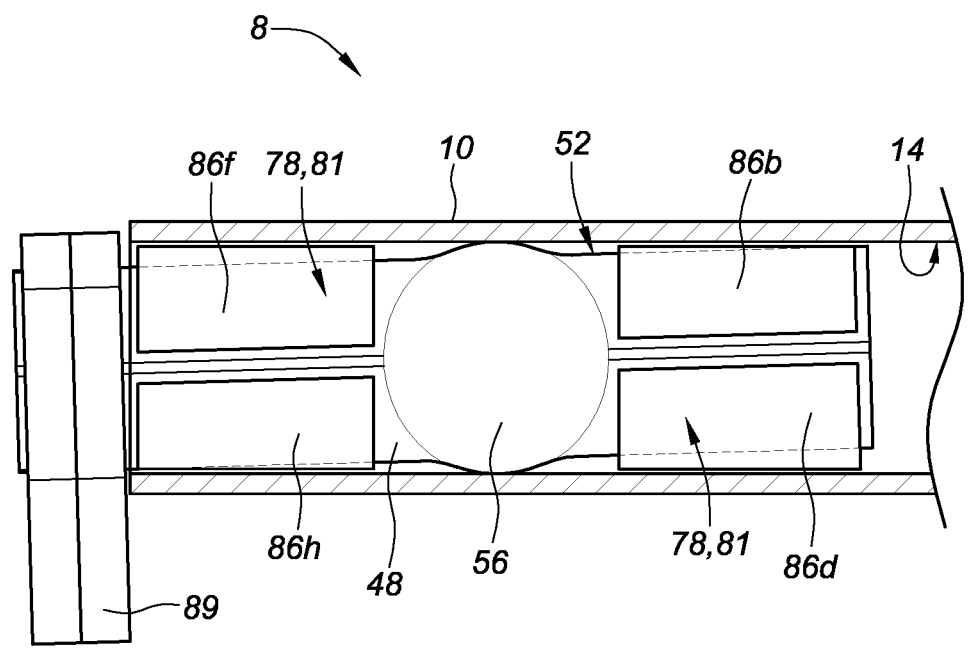
FIG. 18B is a schematic illustration showing a rear view of the torsion axle suspension system shown in FIG. 18A.

In the embodiment illustrated in FIGS. 18A-18B, the torsion axle suspension system 8 includes an elongated enclosure 10, separate inner torsion cord segments 86a-86d and outward torsion cord segments 86e-86h, and an elongated inner member 48 that preferably includes a central portion 56 having a central protrusion 63. In some preferred embodiments, the central protrusion 63 has a generally circular cross sectional shape that extends to engage the engaging inner surface 14 of the elongated enclosure 10, and can act as a fulcrum as the elongated inner member 48 pivots in response to different states of loading (wherein the inner member longitudinal axis 51 orientation varies from the unloaded camber angle A1, the loaded camber angle A2, the overloaded camber angle A3, etc., with respect to the enclosure longitudinal axis 13, for example), while also allowing rotation of the inner member 48 about the inner member longitudinal axis 51 so that the torsion arm 89 and corresponding torsion angle varies from the unloaded torsion angle T1, loaded torsion angle T2, overloaded torsion angle T3, etc.

Figure 19A:
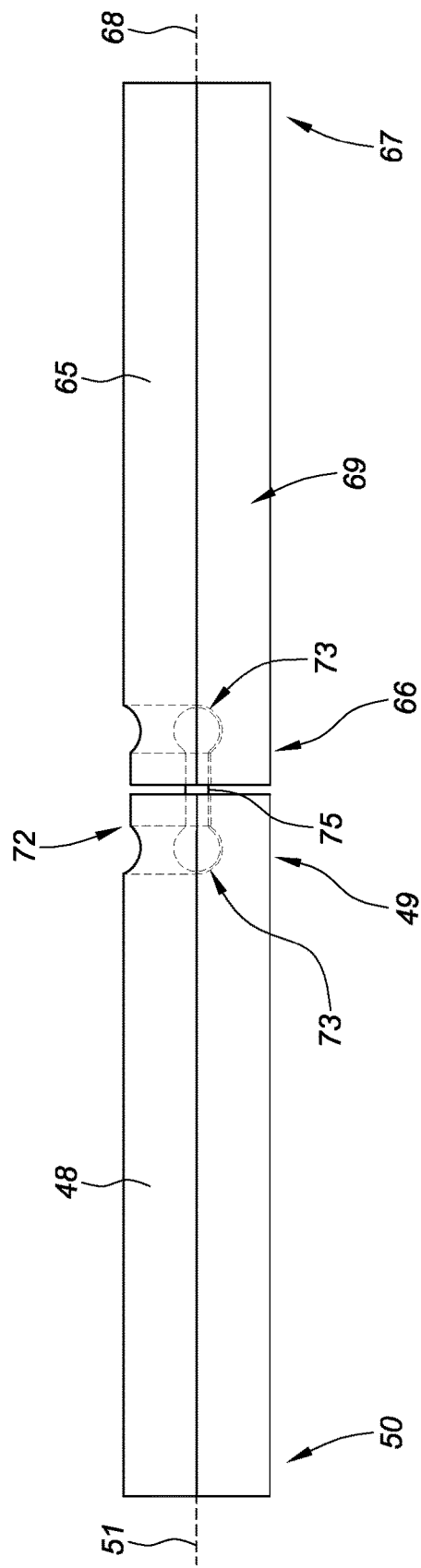
FIG. 19A is a schematic illustration showing an example torsion axle suspension system having a mechanical retainer engaging the inward ends of two elongated inner members to retain the elongated inner members in the elongated enclosure while allowing independent rotation of the two elongated inner members.
Figure 19B:
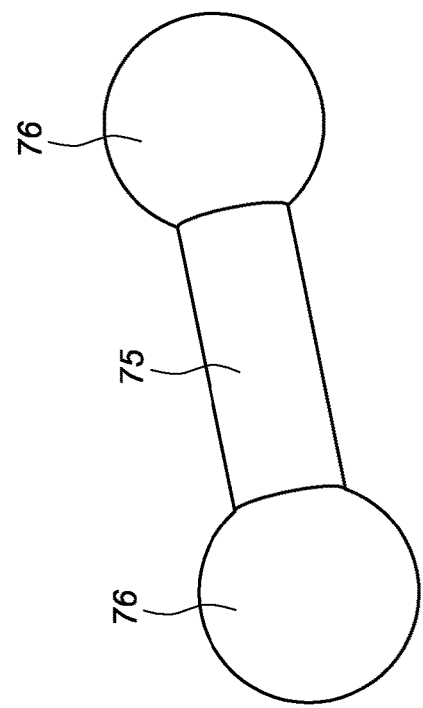
FIG. 19B is detail view of the mechanical retainer of FIG. 19A.

In some embodiments, the torsion axle suspension system 8 includes an elongated inner member 48 and a second elongated inner member 65 configured in a mirrored orientation proximate opposite sides of the vehicle 1 such as in the example illustrated in FIG. 19A. The second elongated inner member 65 preferably includes similar elements as the elongated inner member 48, including an inward end 66, an outward portion 67, an inner member longitudinal axis 68, and an engaging outer surface 69. Preferably, the inward end 49 of the elongated inner member 48 and the inner end 66 of the second elongated inner member 65 are located in close proximity to one another, and include connecting portions or securement features 73. In this embodiment, the torsion axle suspension system 8 preferably includes a mechanical retainer 75 (FIG. 19B) that has securement features 76 that are configured to engage the securement features 73 to secure the inward end 49 of the elongated inner member 48 and the inward end 66 of the second elongated inner member 65 to the mechanical retainer 75. The mechanical retainer 75 is preferably a dumbbell-shaped metal retainer, although other materials and configurations can be utilized. The respective inward ends 49, 66 of the elongated inner members 48, 65 in this configuration each preferably include a slot 72 configured so that the mechanical retainer 75 can be slipped into the slots 72 so that the securement features 76 of the mechanical retainer 75 engage the securement features 73 of the elongated inner members 48, 65. This arrangement can provide improved securement of the elongated inner member 48 and the second elongated inner member 65 within the elongated enclosure 10, reducing the likelihood of either the elongated inner member 48 and the second elongated inner member 65 migrating with respect to the elongated enclosure 10. Preferably, this arrangement allows each of the elongated inner members 48, 65 to pivot independently (i.e., varying "camber" angle) and to rotate independently (i.e., varying torsion angle) in response to varying terrain.

Figure 20:
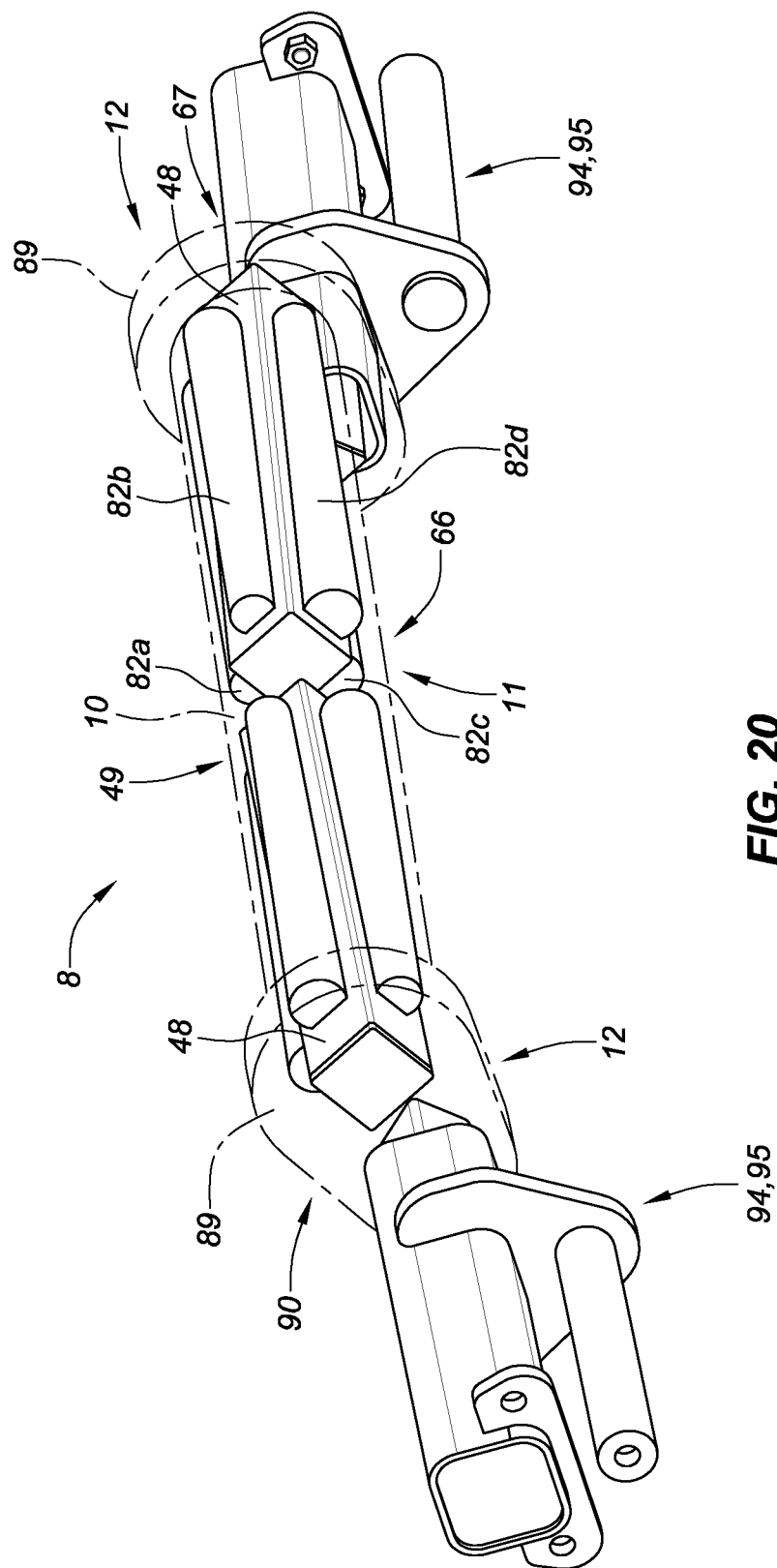
FIG. 20 is a schematic illustration showing a perspective view of portions of a torsion axle suspension system including a secondary torsion axle system to secure to an undercarriage, similar to that shown in FIG. 5C, illustrated in an "unloaded" configuration not supporting the weight of a vehicle body, and with the elongated enclosure and torsion arms shown in phantom to reveal underlying structures.

It is anticipated that the present invention may be utilized with a variety of machines or vehicles 1 and undercarriages 4, including powered vehicles and trailers with wheeled and tracked undercarriages. The torsion axle suspension system 8 of the present invention can, for example, be utilized to support a vehicle body 2 of a compact track loader on an undercarriage 4 having track undercarriage mechanisms 6, such as those illustrated and described in FIG. 5A and elsewhere herein. The torsion axle suspension system 8 can, for example be utilized to support a vehicle body 2 of a trailer on an undercarriage 4 having wheel undercarriage mechanisms 5, such as illustrated and described in FIG. 21 and elsewhere herein. The torsion axle suspension system 8 can be secured to the undercarriage 4 by various undercarriage attachment mechanisms 94. For example, the torsion axle suspension system 8 can be secured to the track undercarriage mechanisms 6 by a round beam mechanism 96 such as the arrangement illustrated in FIG. 5B. Similarly, the torsion axle suspension system 8 can be secured to the wheel undercarriage mechanisms 5 by the round beam mechanism 96 such as the arrangement illustrated in FIG. 21. Alternatively, the torsion axle suspension system 8 can be secured to the track undercarriage mechanisms 6 by the secondary torsion axle mechanism 95 such as the arrangement illustrated in FIG. 5C; the secondary torsion axle mechanism 95 can be a torsion axle mechanism having the conical torsion cords 82 described herein, or more conventional cylindrical torsion cords, or torsion cords of other shape. A further example of a torsion axle suspension system 8 configured to be secured to the track undercarriage mechanisms 6 by the secondary torsion axle mechanisms 95 is shown in FIG. 20, which is a schematic illustration showing a perspective view of portions of the torsion axle suspension system 8 including a secondary torsion axle system to secure to an undercarriage 4, similar to that shown in FIG. 5C, but illustrated in an "unloaded" configuration not supporting the weight of a vehicle body, and with the elongated enclosure and torsion arms shown in phantom to reveal underlying structures; conical torsion cords 82a, 82b, 82c, 82d are preferably configured and arranged to achieve a cambered unloaded configuration as previously described herein.

Figure 23A:
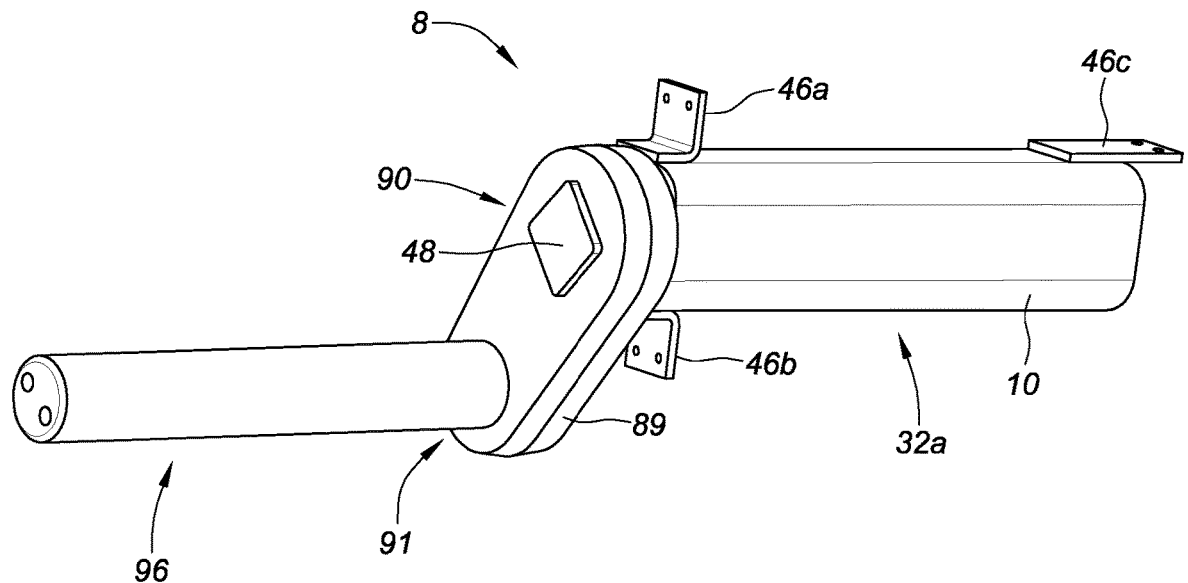
FIG. 23A is a schematic illustration showing elements of one of a pair of mirror-image torsion axle half axles, each half axle having a separate elongated enclosure.

In some embodiments, the torsion axle suspension system 8 includes an elongated enclosure 10 and an elongated inner member 48 similar to that previously described herein (for example, FIG. 5D), but includes a first half-axle 32a (FIG. 23A) and a second half-axle 32b (FIG. 23B) that is preferably a mirror-image of the half-axle 32a shown in FIG. 23A (see also FIG. 5A) with corresponding mirror-image second elongated enclosure 34 and second elongated inner member 65. In these embodiments, the vehicle body 2 is supported by the two mirror-image structures, with the elongated inner member 48 secured to a torsion arm 89 that is secured to the undercarriage 4 proximate one side of the vehicle 1, and the second elongated inner member 65 secured to a torsion arm 89 that is secured to the undercarriage 4 proximate the opposite side of the vehicle 1. The second elongated enclosure 34 includes an inward portion 35, an open outward end 36, an enclosure longitudinal axis 37, an engaging inner surface 38, which preferably includes a flat portion 39 of engaging inner surface 38 and a concave portion 40 of engaging inner surface 38, and interior space 42, analogous to similar elements of the elongated enclosure 10. Associated with the second elongated enclosure 34 and the second elongated inner member 65 is resilient material 78, which preferably includes conical torsion cords 82. Preferably, the enclosure longitudinal axis 37 of the second elongated enclosure 34 is parallel to, and more preferably colinear with, the enclosure longitudinal axis 13 of the elongated enclosure 10.

Figure 23B:
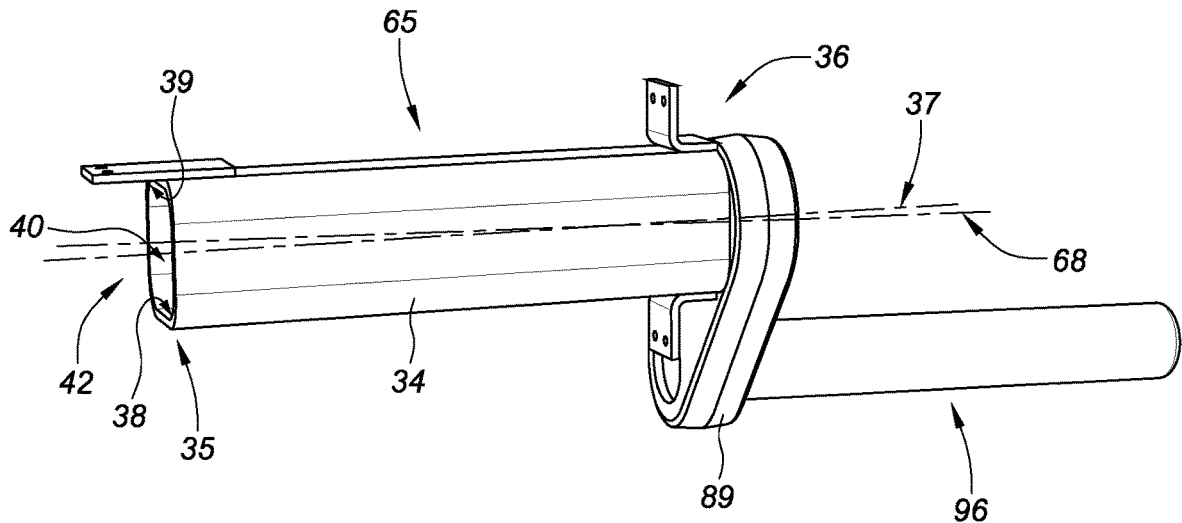
FIG. 23B is a schematic illustration showing elements of a torsion axle that is a mirror-image structure of the torsion axle of FIG. 23A.
Figure 24:
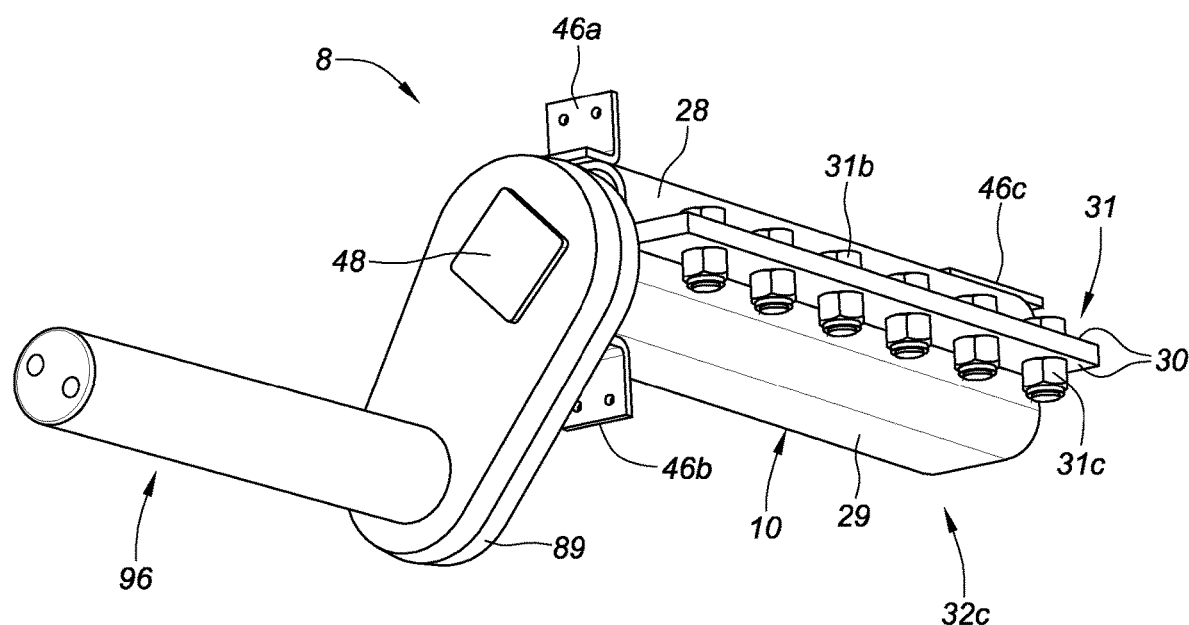
FIG. 24 is a schematic illustration showing key elements of the first of a pair of mirror-image torsion axle half axles similar to that of FIG. 24, but having a multi-part outer enclosure and mechanical couplers.

In some embodiments, the torsion axle suspension system 8 includes a multi-part elongated enclosure 10 such as that illustrated in FIGS. 15-16A, but includes a first half-axle 32c (FIG. 24) and a second half-axle 32d (not shown, but a mirror-image of the half-axle 32c shown in FIG. 24, similar to the second half-axle 32b of FIG. 23B that is a mirror-image of the half axle 32a). The first half-axle 32a includes elongated enclosure upper part 28 and an elongated enclosure lower part 29, elongated inner member 48, includes an inward portion 11, open outward end 12, enclosure longitudinal axis 13, an engaging inner surface 14, which preferably includes flat engaging inner surface portion 15, concave engaging inner surface portion 16, and interior space 18, and resilient material 78, which preferably includes conical torsion cords 82, as previously described herein. Similarly, the second multi-part half-axle 32b (FIG. 24) includes second elongated enclosure 34, including an elongated enclosure upper part 28 and an elongated enclosure lower part 29 and a second elongated inner member 65 as previously described herein. The second elongated enclosure 34 includes an inward portion 35, an open outward end 36, an enclosure longitudinal axis 37, an engaging inner surface 38, which preferably includes a flat portion 39 of engaging inner surface 38 and a concave portion 40 of engaging inner surface 38, and interior space 42, analogous to similar elements of the elongated enclosure 10. Associated with the second elongated enclosure 34 and the second elongated inner member 65 is resilient material 78, which preferably includes conical torsion cords 82. Preferably, the enclosure longitudinal axis 37 of the second elongated enclosure 34 is parallel to, and more preferably colinear with, the enclosure longitudinal axis 13 of the elongated enclosure 10.

Alternate mounting brackets 46a, 46b, 46c are illustrated in FIGS. 23-24, that can be used instead of or together with mounting brackets 45 illustrated elsewhere herein.

Figure 21:
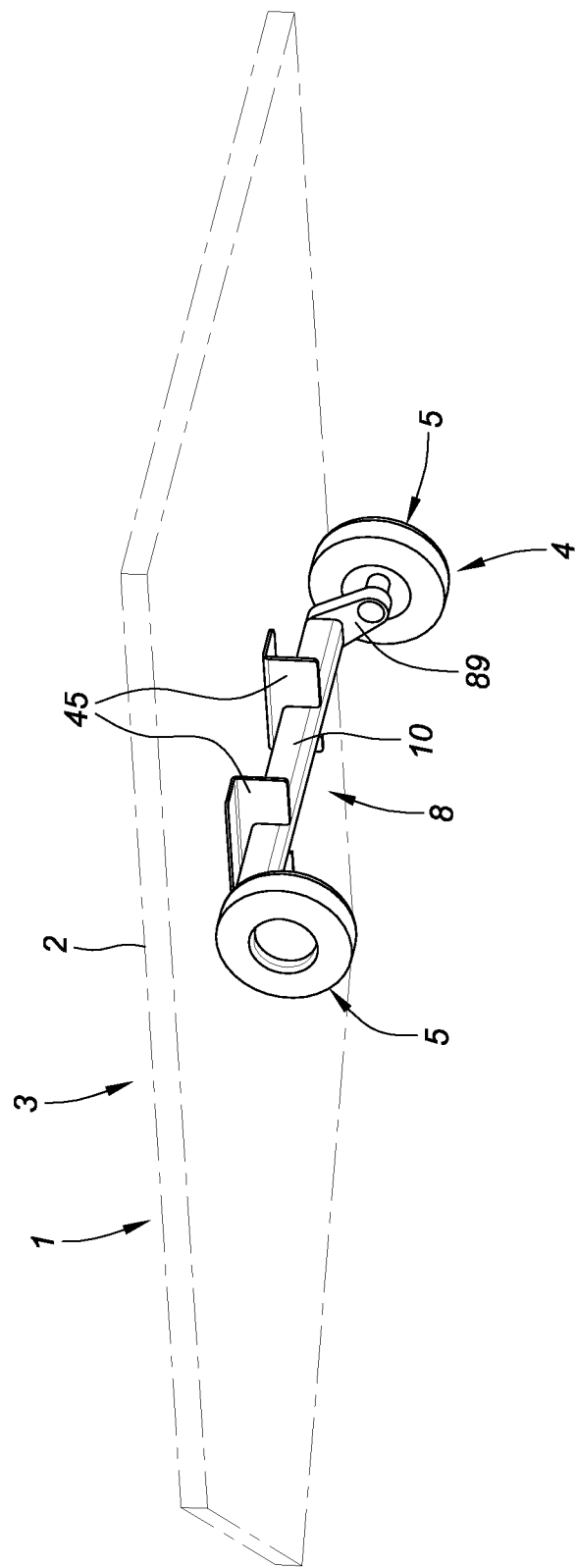
FIG. 21 is a schematic illustration showing a torsion axle suspension system installed on a trailer, with the undercarriage including a set of wheels, and secured to the undercarriage by a round axle mechanism.

Some key elements of the torsion axle suspension system 8 are schematically illustrated in FIGS. 22A-22B, which illustrate the torsion axle suspension system 8 with a vehicle body 2 and an undercarriage 4 that is on a horizontal surface 51. The torsion axle suspension system 8 is illustrated in an unloaded configuration with positive camber in FIG. 22A, showing the inner member longitudinal axis 51 higher proximate the inward end 49 of the elongated inner member 48 than proximate the outward portion 50 of the elongated inner member 48; the unloaded camber angle A1 is the angle between the inner member longitudinal axis 51 and the enclosure longitudinal axis 13 in this unloaded configuration. Similarly, the torsion axle suspension system 8 is illustrated in a shock or overload configuration in FIG. 22B, showing the inner member longitudinal axis 51 lower proximate the inward end 49 of the elongated inner member 48 than proximate the outward portion 50 of the elongated inner member 48; the overloaded camber angle A3 is the angle between the inner member longitudinal axis 51 and the enclosure longitudinal axis 13 in this shock or overload configuration, and is negative in this example. In a normally-loaded configuration, the inner member longitudinal axis 51 would be essentially coincident with the enclosure longitudinal axis 13, with similar height proximate the inward end 49 of the elongated inner member 48 and proximate the outward portion 50 of the elongated inner member 48, similar to the configuration illustrated in FIG. 8A, for example; the loaded camber angle A2 would be zero in this example. The resilient material 78 is not shown in FIGS. 22A-22B to show underlying elements; the resilient material 78, such as the torsion cords 82a-82d elastically deform in response to the varied load configurations such as vehicle weight, cargo, and varying terrain, and the elongated inner member 48 pivots, and the inner member longitudinal axis 51 pivots within the elongated enclosure 10, corresponding to varying among camber angles A1, A2, A3, etc. While specific examples of camber angles A1, A2, A3, and torsion angles T1, T2, T3, are illustrated herein, the torsion axle suspension system 8 can accommodate any intermediate camber angles A1 etc. and torsion angles T1 etc. between those illustrated herein. The camber angles A1 etc. for particular size and configuration of torsion axle suspension system 8 are generally limited by contact between the elongated inner member 48 and the elongated enclosure 10. FIGS. 22A-22B schematically illustrate the torsion axle suspension system 8 secured to the track undercarriage mechanism 6 of the undercarriage 4 proximate one side of the vehicle 1; preferably, a mirror-image torsion axle suspension system 8 would be secured to a second track undercarriage mechanism 6 of the undercarriage 4 proximate the opposite side of the vehicle 1. Preferably, such a pair of mirror-image torsion axle suspension systems 8 would support the vehicle body 2 proximate the front of the vehicle 1, and a second pair of mirror-image torsion axle suspension systems 8 would support the vehicle body 2 proximate the rear of the vehicle 1, such as is illustrated in FIG. 5A. In other preferred examples, such as illustrated in FIG. 21, a single pair of torsion axle suspension systems 8 would support the vehicle body. In still other examples, additional torsion axle suspension systems 8 can be provided to support a longer or heavier vehicle body 2.

The present invention provides a torsion axle assembly used to support a vehicle body on an undercarriage, the torsion axle assembly comprising: (a) an elongated inner member having an inward end, an outward portion and an outer engaging surface, the elongated inner member having an inner member longitudinal axis extending through the inward end and the outward portion; (b) a torsion arm having an axle attachment point for interconnecting with the elongated inner member and an undercarriage attachment point for interconnecting with the undercarriage; the torsion arm having a torsion arm longitudinal axis extending from the axle attachment point to the undercarriage attachment point; (c) an elongated enclosure for interconnection to the vehicle body, the elongated enclosure having an inward portion and an open outward end, the elongated enclosure having an inner engaging surface at least partially defining an interior space, the interior space extending from the open outward end to the inward portion, the elongated enclosure further including an enclosure longitudinal axis extending through the inward portion and the open outward end; and wherein the open outward end is configured to receive the elongated inner member so that the elongated inner member resides at least partially within the interior space; and (d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle. Preferably, the unloaded camber angle is from about 0.25 to about 10 degrees. Preferably, the elongated inner member is interconnected to the torsion arm at the axle attachment point such that the inner member longitudinal axis is generally perpendicular to the torsion arm longitudinal axis. When the weight of the vehicle body is borne by the torsion axle assembly, the inner member longitudinal axis will reside at a loaded camber angle to the enclosure longitudinal axis, and the unloaded camber angle is less than the loaded camber angle. Preferably, the resilient polymeric material includes a plurality of torsion cords each having a larger cross-sectional area proximate one end of the respective torsion cord and a smaller cross-sectional area proximate the other end of the respective torsion cord, wherein the plurality of torsion cords include at least one upper torsion cord positioned generally upward from the inner member longitudinal axis of the respective elongated inner member, the upper torsion cord having the larger cross-sectional area located proximate the outward portion, and at least one lower torsion cord positioned generally downward from the inner member longitudinal axis of the respective elongated inner member, the lower torsion cord having the larger cross-sectional area located proximate the inward end and the torsion cords are preferably conical.

In preferred embodiments of the present invention, the resilient polymeric material includes material selected from the group consisting of natural rubber, latex, synthetic rubber, fiber-reinforced rubber, elastomeric polymer, and rubber composite material. In some preferred embodiments, the resilient polymeric material is preferably a unitary member which is located around the elongated inner member within the interior space. In some further preferred embodiments, the resilient polymeric material preferably includes a plurality of separate segments, arranged along the elongated inner member so that at least one of the plurality of separate segments is located closer to the inward end, and at least one other of the plurality of separate segments is located closer to the outward portion.

In alternate embodiments of the present invention, the elongated enclosure preferably includes a portion having a cross-sectional shape selected from a group consisting of a square, a rounded square, a rectangle, a rounded rectangle, a triangle, a rounded triangular, a polygon, a rounded polygon and a chamfered polygon and the elongated inner member preferably includes a portion having a cross-sectional shape selected from a group consisting of a square, a rounded square, a rectangle, a rounded rectangle, a triangle, a rounded triangular, a polygon, a rounded polygon and a chamfered polygon. In further alternate embodiments of the present invention, the undercarriage is preferably selected from a group consisting of an undercarriage including wheels and an undercarriage including tracks and the vehicle body is preferably a part of a vehicle selected from a group consisting of a self-powered vehicle and a trailer. In further alternate embodiments, the torsion axle assembly further comprises an undercarriage attachment mechanism for attachment of the undercarriage to the torsion arm at the undercarriage attachment point, wherein the undercarriage attachment mechanism is selected from a group consisting of a beam mechanism and a torsion axle mechanism.

In some embodiments, the elongated enclosure preferably includes an elongated enclosure upper part and an elongated enclosure lower part that can be secured together to form the elongated enclosure, wherein the elongated enclosure upper part and the elongated enclosure lower part are secured together by a fastener selected from a group consisting of a retainer, a bolt, a nut, an adhesive and a weld. In further alternate embodiments, the elongated enclosure preferably includes a material selected from a group consisting of high-strength polymer, reinforced polymer, metal and steel and the elongated inner member preferably includes a material selected from the group consisting of high-strength polymer, reinforced polymer, metal and steel. In further alternate embodiments, the resilient elastic material will preferably vary in size along the length of the elongated inner member and have a cross-sectional shape that is selected from a group consisting of circular, elliptical, polygonal and rounded polygonal.

In a preferred embodiment of the present invention, a vehicle used for transporting cargo is provided, the vehicle comprising: a vehicle body, an undercarriage and a suspension system interconnecting the undercarriage to the vehicle body; wherein the suspension system includes a torsion axle assembly for supporting the vehicle body on the undercarriage, wherein the vehicle body has a measurable weight; and wherein the torsion axle assembly includes: (a) an elongated inner member having an inward end, an outward portion, and an outer engaging surface, the elongated inner member also having an inner member longitudinal axis extending from the inward end to the outward portion; (b) a torsion arm having an axle attachment point for interconnecting with the elongated inner member and an undercarriage attachment point for interconnecting with an undercarriage attachment mechanism for attachment to the undercarriage; the torsion arm having a torsion arm longitudinal axis extending from the axle attachment point to the undercarriage attachment point; (c) an elongated enclosure for interconnection to the vehicle body, the elongated enclosure having an inward portion and an open outward end, the elongated enclosure having an inner engaging surface at least partially defining an interior space, the interior space extending from the open outward end to the inward portion, the elongated enclosure further including an enclosure longitudinal axis extending through the inward portion and the open outward end; and wherein the open outward end is configured to receive the elongated inner member so that the elongated inner member resides at least partially within the interior space; and (d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle; wherein the unloaded camber angle is preferably from about 0.25 to about 10 degrees, wherein the torsion axle assembly is preferably a first torsion axle assembly, and wherein the suspension system preferably further includes a second torsion axle assembly; and wherein the second torsion axle assembly is preferably a mirror image of the first torsion axle assembly. In this preferred embodiment, the second torsion axle assembly will include: (a) a second elongated inner member having a second inward end, a second outward portion and a second outer engaging surface, the second elongated inner member also having a second inner member longitudinal axis extending from the second inward end to the second outward portion; (b) a second torsion arm having a second axle attachment point for interconnecting with the second elongated inner member and a second undercarriage attachment point for interconnecting with a second undercarriage attachment mechanism for attachment to the undercarriage; the second torsion arm having a second torsion arm longitudinal axis extending from the second axle attachment point to the second undercarriage attachment point; (c) a second elongated enclosure for interconnection to the vehicle body, the second elongated enclosure having a second inward portion and a second open outward end, the second elongated enclosure having a second inner engaging surface at least partially defining a second interior space, the second interior space extending from the second open outward end to the second inward portion, the second elongated enclosure further including a second enclosure longitudinal axis extending through the second inward portion and the second open outward end; and wherein the second open outward end is configured to receive the second elongated inner member so that the second elongated inner member resides at least partially within the second interior space; and d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle; and wherein the undercarriage includes moving parts selected from the group consisting of wheels and tracks.

In a further preferred embodiment of the present invention, each of the elongated inner members of the respective first and second torsion axle assemblies are interconnected to the respective torsion arms at the respective axle attachment points of the respective torsion arms such that the inner member longitudinal axis of each of the respective elongated inner members is generally perpendicular to the torsion arm longitudinal axis of each of the respective torsion arms. In a further preferred embodiment of the present invention, the elongated enclosure of the first torsion axle assembly is contiguous with the elongated enclosure of the second torsion axle assembly; and in another, the vehicle further comprising a mechanical retainer interconnected with connecting portions of each of the respective elongated inner members proximate the respective inward ends of each of the respective elongated inner members. In a further preferred embodiment, the unloaded camber angle of the vehicle will be from about 0.25 to about 10 degrees.

In a further preferred embodiment, the resilient polymeric material in each of the respective torsion axle assemblies includes a plurality of torsion cords each having a larger cross-sectional area proximate one end of the respective torsion cord and a smaller cross-sectional area proximate the other end of the respective torsion cord, wherein the plurality of torsion cords include at least one upper torsion cord, positioned generally upward from the inner member longitudinal axis of the respective elongated inner member, the upper torsion cord having a larger cross-sectional area located proximate the outward portion, and at least one lower torsion cord positioned generally downward from the inner member longitudinal axis of the respective elongated inner member, the lower torsion cord having the larger cross-sectional area located proximate the inward end, wherein the torsion cords are preferably conical.

In further preferred embodiments of the present invention, the resilient polymeric material preferably includes material selected from the group consisting of natural rubber, latex, synthetic rubber, fiber-reinforced rubber, elastomeric polymer, and rubber composite material and the respective resilient polymeric material of each of the first torsion axle assembly and the second torsion axle assembly is preferably a unitary member that is located around the respective elongated inner member within the interior space of each torsion axle assembly.

In a further preferred embodiment, the respective resilient polymeric material preferably includes a plurality of separate segments, arranged along the respective inner member longitudinal axis of each torsion axle assembly so that at least one of the plurality of separate segments are located closer to the respective inward end, and at least one other of the plurality of separate segments is located closer to the respective outward portion.

In a further preferred embodiment, the respective elongated enclosures preferably include a portion having a cross-sectional shape selected from the group consisting of a square, a rounded square, a triangle, a rounded triangular, a polygon, a rounded polygon and a chamfered polygon. In a further preferred embodiment, the respective elongated inner members preferably include a portion having a cross-sectional shape selected from the group consisting of a square, a rounded square, a triangle, a rounded triangular, a polygon, a rounded polygon and a chamfered polygon.

In a further preferred embodiment, the undercarriage will preferably be selected from the group consisting of an undercarriage including wheels and an undercarriage including tracks and the vehicle will preferably be selected from the group consisting of a self-powered vehicle and a trailer. The undercarriage attachment mechanism for attachment of the suspension system to the undercarriage is preferably selected from the group consisting of a beam mechanism and a torsion axle mechanism and the resilient material residing within the interior space preferably includes a greater amount of resilient material located below the inner member longitudinal axis proximate the inward end of the elongated inner member, and a lesser amount of resilient material located above the inner member longitudinal axis proximate the inward end of the elongated inner member, and a lesser amount of resilient material located below the inner member longitudinal axis proximate the outward portion of the elongated inner member, and a greater amount of resilient material located above the inner member longitudinal axis proximate the outward portion of the elongated inner member.

In a further preferred embodiment, the torsion axle assembly is a first torsion axle assembly, and the suspension system will further includes a second torsion axle assembly having the same elements as does the first torsion axle assembly, and wherein the each of the first and second torsion axle assemblies are attached to the undercarriage by the respective undercarriage attachment mechanisms and the elongated enclosure of the first torsion axle assembly will preferably be contiguous with the elongated enclosure of the second torsion axle assembly.

In another preferred embodiment of the present invention, a method of supporting a vehicle body on an undercarriage is provided, wherein the vehicle body has a measurable weight, the method comprising the step of: providing a vehicle body, an undercarriage and a suspension system interconnecting the undercarriage to the vehicle body; wherein the suspension system includes a torsion axle assembly for supporting the vehicle body on the undercarriage, and wherein the torsion axle assembly includes: an elongated inner member having an inward end, an outward portion and an outer engaging surface, the elongated inner member also having an inner member longitudinal axis extending from the inward end to the outward portion; a torsion arm having an axle attachment point for interconnecting with the elongated inner member and an undercarriage attachment point for interconnecting with an undercarriage attachment mechanism for attachment to the undercarriage; the torsion arm having a torsion arm longitudinal axis extending from the axle attachment point to the undercarriage attachment point; an elongated enclosure for interconnection to the vehicle body, the elongated enclosure having an inward portion and an open outward end, the elongated enclosure having an inner engaging surface at least partially defining an interior space, the interior space extending from the open outward end to the inward portion, the elongated enclosure further including an enclosure longitudinal axis extending through the inward portion and the open outward end; and wherein the open outward end is configured to receive the elongated inner member so that the elongated inner member resides at least partially within the interior space; and resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle. Preferably, the unloaded camber angle is from about 0.25 to about 10 degrees. The torsion axle assembly is preferably a first torsion axle assembly, and wherein the suspension system further includes a second torsion axle assembly; and wherein the second torsion axle assembly is a mirror image of the first torsion axle assembly, and wherein the second torsion axle assembly preferably includes: (a) a second elongated inner member having a second inward end, a second outward portion and a second outer engaging surface, the second elongated inner member also having a second inner member longitudinal axis extending from the second inward end to the second outward portion; (b) a second torsion arm having a second axle attachment point for interconnecting with the second elongated inner member and a second undercarriage attachment point for interconnecting with a second undercarriage attachment mechanism for attachment to the undercarriage; the second torsion arm having a second torsion arm longitudinal axis extending from the second axle attachment point to the second undercarriage attachment point; (c) a second elongated enclosure for interconnection to the vehicle body, the second elongated enclosure having a second inward portion and a second open outward end, the second elongated enclosure having a second inner engaging surface at least partially defining a second interior space, the second interior space extending from the second open outward end to the second inward portion, the second elongated enclosure further including a second enclosure longitudinal axis extending through the second inward portion and the second open outward end; and wherein the second open outward end is configured to receive the second elongated inner member so that the second elongated inner member resides at least partially within the second interior space; and (d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle; wherein the undercarriage attachment mechanism and the undercarriage second undercarriage attachment mechanism are preferably constructed and arranged to interconnect with both of the respective first and second torsion axle assemblies; and wherein the undercarriage preferably includes moving parts selected from the group consisting of wheels and tracks. In a preferred embodiment, each of the elongated inner members of the respective first and second torsion axle assemblies are interconnected to the respective torsion arms at the respective axle attachment points of the respective torsion arms such that the respective inner member longitudinal axis of each of the respective inner members is generally perpendicular to the respective torsion arm longitudinal axis of each of the respective torsion arms; and wherein the elongated enclosure of the first torsion axle assembly is preferably contiguous with the elongated enclosure of the second torsion axle assembly. In a further embodiment, the suspension system preferably includes a mechanical retainer interconnected with connecting portions of each of the respective elongated inner members proximate the respective inward ends of each of the respective elongated inner members. In preferred embodiments, the unloaded camber angle is from about 0.25 to about 10 degrees and the resilient polymeric material in each of the respective torsion axle assemblies preferably includes a plurality of torsion cords each having a larger cross-sectional area proximate one end of the respective torsion cord and a smaller cross-sectional area proximate the other end of the respective torsion cord, wherein the plurality of torsion cords in each of the respective torsion axle assemblies includes at least one upper torsion cord, positioned generally upward from the inner member longitudinal axis of the respective elongated inner member, the upper torsion cord having a larger cross-sectional area located proximate the outward portion, and at least one lower torsion cord positioned generally downward from the inner member longitudinal axis of the respective elongated inner member, the lower torsion cord having the larger cross-sectional area located proximate the inward end. In preferred embodiments, the undercarriage attachment mechanism for attachment to the undercarriage is selected from the group consisting of a beam mechanism and a torsion axle mechanism. In further embodiments, the method will preferably include the step of using the suspension system to support the measurable weight of the vehicle body on the undercarriage, where the inner member longitudinal axis resides at a loaded camber angle to the enclosure longitudinal axis, where the loaded camber angle is less than the unloaded camber angle.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A torsion axle assembly used to support a vehicle body on an undercarriage, the torsion axle assembly comprising:
   a) an elongated inner member having an inward end, an outward portion and an outer engaging surface, the elongated inner member having an inner member longitudinal axis extending through the inward end and the outward portion;
   b) a torsion arm having an axle attachment point for interconnecting with the elongated inner member and an undercarriage attachment point for interconnecting with the undercarriage; the torsion arm having a torsion arm longitudinal axis extending from the axle attachment point to the undercarriage attachment point;
   c) an elongated enclosure for interconnection to the vehicle body, the elongated enclosure having an inward portion and an open outward end, the elongated enclosure having an inner engaging surface at least partially defining an interior space, the interior space extending from the open outward end to the inward portion, the elongated enclosure further including an enclosure longitudinal axis extending through the inward portion and the open outward end; and wherein the open outward end is configured to receive the elongated inner member so that the elongated inner member resides at least partially within the interior space; and
   d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle;
   e) wherein the resilient polymeric material includes a plurality of torsion cords each having a larger cross-sectional area proximate one end of the respective torsion cord and a smaller cross-sectional area proximate the other end of the respective torsion cord, wherein the plurality of torsion cords include at least one upper torsion cord positioned generally upward from the inner member longitudinal axis of the respective elongated inner member, the upper torsion cord having the larger cross-sectional area located proximate the outward portion, and at least one lower torsion cord positioned generally downward from the inner member longitudinal axis of the respective elongated inner member, the lower torsion cord having the larger cross-sectional area located proximate the inward end.

2. The torsion axle assembly of claim 1, wherein the elongated inner member is interconnected to the torsion arm at the axle attachment point such that the inner member longitudinal axis is generally perpendicular to the torsion arm longitudinal axis.

3. The torsion axle assembly of claim 1, wherein the unloaded camber angle is from about 0.25 degrees to about 10 degrees.

4. The torsion axle assembly of claim 1, wherein the torsion cords are conical.

5. The torsion axle assembly of claim 1, wherein the resilient polymeric material includes material selected from a group consisting of natural rubber, latex, synthetic rubber, fiber-reinforced rubber, elastomeric polymer and rubber composite material.

6. The torsion axle assembly of claim 1, wherein the resilient polymeric material is a unitary member which is located around the elongated inner member within the interior space.

7. The torsion axle assembly of claim 1, wherein the resilient polymeric material includes a plurality of separate segments, arranged along the elongated inner member so that at least one of the plurality of separate segments is located closer to the inward end, and at least one other of the plurality of separate segments is located closer to the outward portion.

8. The torsion axle assembly of claim 1, wherein the elongated enclosure includes a portion having a cross-sectional shape selected from a group consisting of a square, a rounded square, a triangle, a rounded triangle, a polygon, a rounded polygon and a chamfered polygon.

9. The torsion axle assembly of claim 1, wherein the elongated inner member includes a portion having a cross-sectional shape selected from a group consisting of a square, a rounded square, a triangle, a rounded triangle, a polygon, a rounded polygon and a chamfered polygon.

10. The torsion axle assembly of claim 1, wherein the undercarriage is selected from a group consisting of an undercarriage including wheels and an undercarriage including tracks.

11. The torsion axle assembly of claim 1, wherein the vehicle body is a part of a vehicle selected from a group consisting of a self-powered vehicle and a trailer.

12. The torsion axle assembly of claim 1, further comprising an undercarriage attachment mechanism for attachment of the undercarriage to the torsion arm at the undercarriage attachment point, wherein the undercarriage attachment mechanism is selected from a group consisting of a beam mechanism and a torsion axle mechanism.

13. The torsion axle assembly of claim 1, wherein the elongated enclosure includes an elongated enclosure upper part and an elongated enclosure lower part that can be secured together to form the elongated enclosure.

14. The torsion axle assembly of claim 13, wherein the elongated enclosure upper part and the elongated enclosure lower part are secured together by a fastener selected from a group consisting of a retainer, a bolt, a nut, an adhesive and a weld.

15. The torsion axle assembly of claim 1, wherein the elongated enclosure includes a material selected from the group consisting of high-strength polymer, reinforced polymer, metal and steel.

16. The torsion axle assembly of claim 1, wherein the elongated inner member includes a material selected from a group consisting of high-strength polymer, reinforced polymer, metal and steel.

17. The torsion axle assembly of claim 1, wherein the resilient polymeric material varies in size along the length of the elongated inner member and has a cross-sectional shape that is selected from a group consisting of circular, elliptical, polygonal and rounded polygonal.

18. A vehicle used for transporting cargo, the vehicle comprising:
a vehicle body, an undercarriage and a suspension system interconnecting the undercarriage to the vehicle body; wherein the suspension system includes a torsion axle assembly for supporting the vehicle body on the undercarriage, wherein the vehicle body has a measurable weight; and wherein the torsion axle assembly includes:
a) an elongated inner member having an inward end, an outward portion, and an outer engaging surface, the elongated inner member also having an inner member longitudinal axis extending from the inward end to the outward portion;
b) a torsion arm having an axle attachment point for interconnecting with the elongated inner member and an undercarriage attachment point for interconnecting with an undercarriage attachment mechanism for attachment to the undercarriage; the torsion arm having a torsion arm longitudinal axis extending from the axle attachment point to the undercarriage attachment point;
c) an elongated enclosure for interconnection to the vehicle body, the elongated enclosure having an inward portion and an open outward end, the elongated enclosure having an inner engaging surface at least partially defining an interior space, the interior space extending from the open outward end to the inward portion, the elongated enclosure further including an enclosure longitudinal axis extending through the inward portion and the open outward end; and wherein the open outward end is configured to receive the elongated inner member so that the elongated inner member resides at least partially within the interior space; and
d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle;
e) wherein the resilient polymeric material residing within the interior space includes a greater amount of the resilient polymeric material located below the inner member longitudinal axis proximate the inward end of the elongated inner member, and a lesser amount of the resilient polymeric material located above the inner member longitudinal axis proximate the inward end of the elongated inner member, and a lesser amount of the resilient polymeric material located below the inner member longitudinal axis proximate the outward portion of the elongated inner member, and a greater amount of the resilient polymeric material located above the inner member longitudinal axis proximate the outward portion of the elongated inner member.

19. The vehicle of claim 18, wherein the torsion axle assembly is a first torsion axle assembly, and wherein the suspension system further includes a second torsion axle assembly; and wherein the second torsion axle assembly is a mirror image of the first torsion axle assembly.

20. The vehicle of claim 19, wherein the second torsion axle assembly includes:
a) a second elongated inner member having a second inward end, a second outward portion and a second outer engaging surface, the second elongated inner member also having a second inner member longitudinal axis extending from the second inward end to the second outward portion;
b) a second torsion arm having a second axle attachment point for interconnecting with the second elongated inner member and a second undercarriage attachment point for interconnecting with a second undercarriage attachment mechanism for attachment to the undercarriage; the second torsion arm having a second torsion arm longitudinal axis extending from the second axle attachment point to the second undercarriage attachment point;
c) a second elongated enclosure for interconnection to the vehicle body, the second elongated enclosure having a second inward portion and a second open outward end, the second elongated enclosure having a second inner engaging surface at least partially defining a second interior space, the second interior space extending from the second open outward end to the second inward portion, the second elongated enclosure further including a second enclosure longitudinal axis extending through the second inward portion and the second open outward end; and wherein the second open outward end is configured to receive the second elongated inner member so that the second elongated inner member resides at least partially within the second interior space; and d) second resilient polymeric material residing within the second interior space to engage and support the second elongated inner member within the second interior space such that the second inner member longitudinal axis resides at a second unloaded camber angle to the second enclosure longitudinal axis when none of the measurable weight of the vehicle body is borne by the second torsion axle assembly; and wherein the undercarriage includes moving parts selected from the group consisting of wheels and tracks.

21. The vehicle of claim 19, wherein each of the elongated inner members of the respective first and second torsion axle assemblies are interconnected to the respective torsion arms at the respective axle attachment points of the respective torsion arms such that the inner member longitudinal axis of each of the respective elongated inner members is generally perpendicular to the torsion arm longitudinal axis of each of the respective torsion arms.

22. The vehicle of claim 19, wherein the elongated enclosure of the first torsion axle assembly is contiguous with the elongated enclosure of the second torsion axle assembly.

23. The vehicle of claim 19, further comprising a mechanical retainer interconnected with connecting portions of each of the respective elongated inner members proximate the respective inward ends of each of the respective elongated inner members.

24. The vehicle of claim 19; wherein the unloaded camber angle is from about 0.25 degrees to about 10 degrees.

25. The vehicle of claim 19, wherein the resilient polymeric material in each of the respective torsion axle assemblies includes a plurality of torsion cords each having a larger cross-sectional area proximate one end of the respective torsion cord and a smaller cross-sectional area proximate the other end of the respective torsion cord, wherein the plurality of torsion cords include at least one upper torsion cord, positioned generally upward from the inner member longitudinal axis of the respective elongated inner member, the upper torsion cord having a larger cross-sectional area located proximate the outward portion, and at least one lower torsion cord positioned generally downward from the inner member longitudinal axis of the respective elongated inner member, the lower torsion cord having the larger cross-sectional area located proximate the inward end.

26. The vehicle of claim 25, wherein the torsion cords are conical.

27. The vehicle of claim 19, wherein the resilient polymeric material includes material selected from the group consisting of natural rubber, latex, synthetic rubber, fiber-reinforced rubber, elastomeric polymer and rubber composite material.

28. The vehicle of claim 19, wherein the respective resilient polymeric material of each of the first torsion axle assembly and the second torsion axle assembly is a unitary member that is located around the respective elongated inner member within the interior space of each torsion axle assembly.

29. The vehicle of claim 19, wherein the respective resilient polymeric material includes a plurality of separate segments, arranged along the respective inner member longitudinal axis of each torsion axle assembly so that at least one of the plurality of separate segments is located closer to the respective inward end, and at least one other of the plurality of separate segments is located closer to the respective outward portion.

30. The vehicle of claim 19, wherein the respective elongated enclosures include a portion having a cross-sectional shape selected from a group consisting of a square, a rounded square, a triangle, a rounded triangle, a polygon, a rounded polygon and a chamfered polygon.

31. The vehicle of claim 19, wherein the respective elongated inner members include a portion having a cross-sectional shape selected from a group consisting of a square, a rounded square, a triangle, a rounded triangle, a polygon, a rounded polygon and a chamfered polygon.

32. The vehicle of claim 19, wherein the undercarriage is selected from a group consisting of an undercarriage including wheels and an undercarriage including tracks.

33. The vehicle of claim 19, wherein the vehicle is selected from a group consisting of a self-powered vehicle and a trailer.

34. The vehicle of claim 18, wherein the undercarriage attachment mechanism for attachment of the suspension system to the undercarriage is selected from a group consisting of a beam mechanism and a torsion axle mechanism.

35. The vehicle of claim 18, wherein the torsion axle assembly is a first torsion axle assembly, and the suspension system further includes a second torsion axle assembly having the same elements as does the first torsion axle assembly, and wherein the each of the first and second torsion axle assemblies are attached to the undercarriage by the respective undercarriage attachment mechanisms.

36. The vehicle of claim 35, wherein the elongated enclosure of the first torsion axle assembly is contiguous with the elongated enclosure of the second torsion axle assembly.

37. A method of supporting a vehicle body on an undercarriage, wherein the vehicle body has a measurable weight, the method comprising the step of:

A) providing a vehicle body, an undercarriage and a suspension system interconnecting the undercarriage to the vehicle body; wherein the suspension system includes a torsion axle assembly for supporting the vehicle body on the undercarriage, and wherein the torsion axle assembly includes:

a) an elongated inner member having an inward end, an outward portion and an outer engaging surface, the elongated inner member also having an inner member longitudinal axis extending from the inward end to the outward portion;

b) a torsion arm having an axle attachment point for interconnecting with the elongated inner member and an undercarriage attachment point for interconnecting with an undercarriage attachment mechanism for attachment to the undercarriage; the torsion arm having a torsion arm longitudinal axis extending from the axle attachment point to the undercarriage attachment point;

c) an elongated enclosure for interconnection to the vehicle body, the elongated enclosure having an inward portion and an open outward end, the elongated enclosure having an inner engaging surface at least partially defining an interior space, the interior space extending from the open outward end to the inward portion, the elongated enclosure further including an enclosure longitudinal axis extending through the inward portion and the open outward end; and wherein the open outward end is configured to receive the elongated inner member so that the elongated inner member resides at least partially within the interior space; and d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle;

e) wherein the resilient polymeric material residing within the interior space includes a greater amount of the resilient polymeric material located below the inner member longitudinal axis proximate the inward end of the elongated inner member, and a lesser amount of the resilient polymeric material located above the inner member longitudinal axis proximate the inward end of the elongated inner member, and a lesser amount of the resilient polymeric material located below the inner member longitudinal axis proximate the outward portion of the elongated inner member, and a greater amount of the resilient polymeric material located above the inner member longitudinal axis proximate the outward portion of the elongated inner member.

38. The method of claim 37, wherein the torsion axle assembly is a first torsion axle assembly, and wherein the suspension system further includes a second torsion axle assembly; and wherein the second torsion axle assembly is a mirror image of the first torsion axle assembly.

39. The method of claim 38, wherein the second torsion axle assembly includes:

a) a second elongated inner member having a second inward end, a second outward portion and a second outer engaging surface, the second elongated inner member also having a second inner member longitudinal axis extending from the second inward end to the second outward portion;

b) a second torsion arm having a second axle attachment point for interconnecting with the second elongated inner member and a second undercarriage attachment point for interconnecting with a second undercarriage attachment mechanism for attachment to the undercarriage; the second torsion arm having a second torsion arm longitudinal axis extending from the second axle attachment point to the second undercarriage attachment point;

c) a second elongated enclosure for interconnection to the vehicle body, the second elongated enclosure having a second inward portion and a second open outward end, the second elongated enclosure having a second inner engaging surface at least partially defining a second interior space, the second interior space extending from the second open outward end to the second inward portion, the second elongated enclosure further including a second enclosure longitudinal axis extending through the second inward portion and the second open outward end; and wherein the second open outward end is configured to receive the second elongated inner member so that the second elongated inner member resides at least partially within the second interior space; and d) second resilient polymeric material residing within the second interior space to engage and support the second elongated inner member within the second interior space such that the second inner member longitudinal axis resides at a second unloaded camber angle to the second enclosure longitudinal axis when none of the measurable weight of the vehicle body is borne by the second torsion axle assembly; wherein the undercarriage attachment mechanism and the undercarriage second undercarriage attachment mechanism are constructed and arranged to interconnect with both of the respective first and second torsion axle assemblies; and wherein the undercarriage includes moving parts selected from the group consisting of wheels and tracks.

40. The method of claim 39, wherein each of the elongated inner members of the respective first and second torsion axle assemblies are interconnected to the respective torsion arms at the respective axle attachment points of the respective torsion arms such that the respective inner member longitudinal axis of each of the respective inner members is generally perpendicular to the respective torsion arm longitudinal axis of each of the respective torsion arms.

41. The method of claim 39, wherein the elongated enclosure of the first torsion axle assembly is contiguous with the elongated enclosure of the second torsion axle assembly.

42. The method of claim 39, wherein the suspension system further includes a mechanical retainer interconnected with connecting portions of each of the respective elongated inner members proximate the respective inward ends of each of the respective elongated inner members.

43. The method of claim 39, wherein the unloaded camber angle is from about 0.25 degrees to about 10 degrees.

44. The method of claim 39, wherein the resilient polymeric material in each of the respective torsion axle assemblies includes a plurality of torsion cords each having a larger cross-sectional area proximate one end of the respective torsion cord and a smaller cross-sectional area proximate the other end of the respective torsion cord, wherein the plurality of torsion cords in each of the respective torsion axle assemblies includes at least one upper torsion cord, positioned generally upward from the inner member longitudinal axis of the respective elongated inner member, the upper torsion cord having a larger cross-sectional area located proximate the outward portion, and at least one lower torsion cord positioned generally downward from the inner member longitudinal axis of the respective elongated inner member, the lower torsion cord having the larger cross-sectional area located proximate the inward end.

45. The method of claim 37, wherein the undercarriage attachment mechanism for attachment to the undercarriage is selected from a group consisting of a beam mechanism and a torsion axle mechanism.

46. The method of claim 37, further including the step of using the suspension system to support the measurable weight of the vehicle body on the undercarriage.

47. A torsion axle assembly used to support a vehicle body on an undercarriage, the torsion axle assembly comprising:

a) an elongated inner member having an inward end, an outward portion and an outer engaging surface, the elongated inner member having an inner member longitudinal axis extending through the inward end and the outward portion;

b) a torsion arm having an axle attachment point for interconnecting with the elongated inner member and an undercarriage attachment point for interconnecting with the undercarriage; the torsion arm having a torsion arm longitudinal axis extending from the axle attachment point to the undercarriage attachment point;

c) an elongated enclosure for interconnection to the vehicle body, the elongated enclosure having an inward portion and an open outward end, the elongated enclosure having an inner engaging surface at least partially defining an interior space, the interior space extending from the open outward end to the inward portion, the elongated enclosure further including an enclosure longitudinal axis extending through the inward portion and the open outward end; and wherein the open outward end is configured to receive the elongated inner member so that the elongated inner member resides at least partially within the interior space;

d) resilient polymeric material residing within the interior space to engage and support the elongated inner member when the elongated inner member resides within the interior space, such that the inner member longitudinal axis resides at an unloaded camber angle to the enclosure longitudinal axis when none of the weight of the vehicle body is borne by the torsion axle assembly; and wherein the inner member longitudinal axis resides at a loaded camber angle to the enclosure longitudinal axis when the weight of the vehicle body is borne by the torsion axle assembly, such that the unloaded camber angle is greater than the loaded camber angle; and e) wherein the resilient polymeric material residing within the interior space includes a greater amount of the resilient polymeric material located below the inner member longitudinal axis proximate the inward end of the elongated inner member, and a lesser amount of the resilient polymeric material located above the inner member longitudinal axis proximate the inward end of the elongated inner member, and a lesser amount of the resilient polymeric material located below the inner member longitudinal axis proximate the outward portion of the elongated inner member, and a greater amount of the resilient polymeric material located above the inner member longitudinal axis proximate the outward portion of the elongated inner member.

* * * * *